US012448510B2

(12) United States Patent
Kobayashi et al.

(10) Patent No.: US 12,448,510 B2
(45) Date of Patent: Oct. 21, 2025

(54) PREPREG, METHOD FOR PRODUCING SAME, AND SLIT TAPE PREPREG

(71) Applicant: Toray Industries, Inc., Tokyo (JP)

(72) Inventors: Hiroshi Kobayashi, Tacoma, WA (US); Taiki Maeyama, Ehime (JP); Hiroaki Sakata, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 18/206,386

(22) Filed: Jun. 6, 2023

(65) Prior Publication Data

US 2023/0357561 A1 Nov. 9, 2023

Related U.S. Application Data

(63) Continuation of application No. 16/475,518, filed as application No. PCT/JP2018/001443 on Jan. 18, 2018, now Pat. No. 11,708,487.

(30) Foreign Application Priority Data

Jan. 19, 2017 (JP) ................................ 2017-007304
Jan. 19, 2017 (JP) ................................ 2017-007305
Oct. 18, 2017 (JP) ................................ 2017-201581

(51) Int. Cl.
*C08L 63/00* (2006.01)
*C08J 5/24* (2006.01)

(52) U.S. Cl.
CPC .............. *C08L 63/00* (2013.01); *C08J 5/243* (2021.05); *C08J 2363/00* (2013.01); *C08J 2363/02* (2013.01); *C08J 2463/00* (2013.01); *C08J 2463/02* (2013.01); *C08J 2481/06* (2013.01); *C08L 2205/025* (2013.01); *C08L 2205/03* (2013.01); *C08L 2205/035* (2013.01)

(58) Field of Classification Search
CPC .............. C08L 63/00; C08L 2205/025; C08L 2205/03; C08L 2205/035; C08J 5/243; C08J 2363/00; C08J 2363/02; C08J 2463/00; C08J 2463/02; C08J 2481/06
USPC ...................................................... 524/609
See application file for complete search history.

(56) References Cited

U.S. PATENT DOCUMENTS

| 7,084,213 B2 | 8/2006 | McGrail et al. |
| 7,611,601 B2 | 11/2009 | Nelson et al. |
| 2013/0202873 A1 | 8/2013 | Mizuki et al. |
| 2014/0342144 A1 | 11/2014 | Nakayama et al. |
| 2015/0344649 A1 | 12/2015 | Sequeira |
| 2016/0083543 A1 | 3/2016 | Spencer et al. |
| 2016/0130431 A1* | 5/2016 | Nagano ............... C08G 59/502 523/427 |

FOREIGN PATENT DOCUMENTS

| JP | 01104624 A | 4/1989 |
| JP | 2003002990 A | 1/2003 |
| JP | 2003183476 A | 7/2003 |
| JP | 2003277532 A | 10/2003 |
| JP | 2004506789 A | 3/2004 |
| JP | 2008030296 A | 2/2008 |
| JP | 2008517810 A | 5/2008 |
| JP | 2010229211 A * | 10/2010 ............... C08J 5/24 |
| JP | 2016510077 A | 4/2016 |
| JP | 2016155915 A | 9/2016 |
| WO | WO-2015012348 A1 * | 1/2015 ........... C08G 59/245 |

OTHER PUBLICATIONS

Takabe et al., JP 2010-229211 A machine translation in English, Oct. 14, 2010. (Year: 2010).*
International Search Report and Written Opinion for International Application No. PCT/JP2018/001443, dated Mar. 27, 2018, 5 pages.
Entire patent prosecution history of U.S. Appl. No. 16/475,518, filed Jul. 2, 2019, entitled, "Prepreg, Method for Producing Same, and Slit Tape Prepreg."

* cited by examiner

*Primary Examiner* — David T Karst
(74) *Attorney, Agent, or Firm* — Buchanan Ingersoll & Rooney PC

(57) ABSTRACT

A prepreg having excellent processability and handleability and that can be processed into a cured product with high heat resistance is described along with a method to produce such a prepreg without being restricted by the types and contents of the matrix resin components used, where the prepreg includes at least components [A] to [D] as defined below and a preliminary reaction product that is a reaction product of the component [B] and the component [C]: [A] carbon fiber, [B] epoxy resin comprising a m- or p-aminophenol epoxy resin [b1] and either a glycidyl ether epoxy resin or a glycidyl amine epoxy resin [b2] that has two or more glycidyl groups in a molecule, [C] curing agent, and [D] thermoplastic resin.

13 Claims, No Drawings

PREPREG, METHOD FOR PRODUCING SAME, AND SLIT TAPE PREPREG

CROSS REFERENCE TO RELATED APPLICATIONS

This is the continuation application of U.S. application Ser. No. 16/475,518, filed Jul. 2, 2019, which is the U.S. National Phase application of PCT/JP2018/001443, filed Jan. 18, 2018, which claims priority to Japanese Patent Application No. 2017-007304, filed Jan. 19, 2017, Japanese Patent Application No. 2017-007305, filed Jan. 19, 2017 and Japanese Patent Application No. 2017-201581, filed Oct. 18, 2017, the disclosures of each of these applications being incorporated herein by reference in their entireties for all purposes.

FIELD OF THE INVENTION

The present invention relates to a prepreg that has excellent processability and handleability and provides a cured product with high heat resistance, and a method for the production thereof.

BACKGROUND OF THE INVENTION

Fiber reinforced composite materials consisting of reinforcing fiber such as glass fiber, carbon fiber, and aramid fiber combined with a matrix resin are lighter in weight compared with competing metallic materials or the like, and at the same time excellent in mechanical property such as strength and elastic modulus, and accordingly, they are currently used in many fields such as aircraft members, spacecraft members, automobile members, ship members, civil engineering and construction materials, and sporting goods. In particular, carbon fibers excellent in specific strength and specific elastic modulus are widely used as reinforcing fibers in application fields where high mechanical property is required. In addition, thermosetting resins such as unsaturated polyester resin, vinyl ester resin, epoxy resin, phenol resin, cyanate ester resin, and bismaleimide resin are often used as matrix resins, and in particular, epoxy resins are in wide use because of their high adhesiveness to carbon fibers. In applications requiring high performance, fiber reinforced composite materials containing continuous fibers are used, and in particular, they are generally manufactured by methods that use prepregs, which are sheet-like intermediate substrates consisting mainly of reinforcing fibers impregnated with uncured thermosetting resin compositions. In such methods, prepreg sheets are stacked and cured by heating to provide a molded product of a fiber reinforced composite material. Fiber reinforced composite materials manufactured in this way have been used for various general industrial applications such as tennis rackets, golf shafts, and fishing poles, but they are now attracting attention as structural materials for aircraft, which are required to be light in weight, because they have high specific strength and specific stiffness.

Available methods for laminating prepreg sheets include the hand layup method, ATL (automated tape layup) method, and AFP (automated fiber placement) method, but when producing a large composite material such as for aircraft, automated lay-up methods such as the ATL method and the AFP method, which are higher in productivity than the hand layup method, are used (see, for example, Patent document 1). Among others, the AFP method, which is designed to laminate slit tape prepregs (hereinafter, simply referred to as slit tapes) prepared by cutting a prepreg in the fiber direction to produce tape-like sheets, are suitable for producing parts containing a relatively large number of curved surfaces such as aircraft fuselage, and also can be produced with a high material yield, and accordingly, this method has been frequently adopted in recent years.

In the AFP method, about ten to several tens of narrow slit tapes with widths of 3 to 13 mm are passed through guide rolls, collected on a machine head, and laid up on a substrate in order to improve the lamination efficiency. In this step, as the guide roll and the slit tape rub each other, the epoxy resin composition contained in the slit tape comes out and adheres to the guide roll, leading to the problem of a subsequent decrease in the processability of the slit tape. In the above process, the unwinding of the slit tapes and their collection on the machine head are performed under low temperature conditions, for example 20° C., where the storage elastic modulus (hereinafter referred to as G') of the epoxy resin composition becomes higher in order to prevent the adhesion of the epoxy resin composition to the guide rolls. In order to secure sufficient adhesion between the substrate and slit tapes and between slit tapes and other slit tapes during the lamination step, the slit tapes are often heated by an infrared heater or the like to raise the temperature as they are adhered.

In Patent document 2, unidirectional prepregs in which reinforcing fiber bundles are not twisted are cured to a degree where the resin conversion of the matrix resin composition reaches 20% to 70% to provide semi-cured prepregs, and subsequently they are cut in the fiber direction of the reinforcing fibers to produce slit tapes. It is described that they are high in reinforcing fiber straightness and resistant to twisting and they are also low in tape face tackiness (hereinafter referred to as tack) and high in handleability.

Patent document 3 discloses a slit tape in which an epoxy resin composition having a viscosity of $1.0 \times 10^5$ to $1.0 \times 10^9$ Pas at 25° C. and a glass transition temperature of 7° C. to 15° C. is located near both of the thickness-directional surfaces of the prepreg while an epoxy resin composition having a viscosity of $5.0 \times 10^2$ to $1.0 \times 10^5$ Pas at 25° C. is located in the thickness-directional central portion and it is described that the aforementioned adhesion of the epoxy resin composition to guide rolls is reduced and that the composition has excellent drapability.

Patent document 1: Published Japanese Translation of PCT International Publication JP 2008-517810
Patent document 2: Japanese Unexamined Patent Publication (Kokai) No. 2016-155915
Patent document 3: Japanese Unexamined Patent Publication (Kokai) No. 2010-229211

SUMMARY OF THE INVENTION

The slit tape obtained by the production method described in Patent document 2 is already in such a highly cured state that it cannot undergo significant twisting and accordingly, it lacks in drapability and fails to have sufficient steering ability for the curved surfaces of the guide rolls. Therefore, it is difficult to apply the tape to the AFP method.

The slit tape described in Patent document 3 is still so high in tackiness that prepreg sheets adhere easily to each other at room temperature, indicating that the tackiness is not sufficiently low and the molecular weight is relatively high. Since epoxy resin that is solid at room temperature is used for viscosity adjustment, it is difficult to reduce the tackiness largely while allowing a cured product with high heat resistance to be obtained.

In view of the above situation, an object of the present invention is to provide a prepreg having high drapability, serving to produce a slit tape prepreg that suffers a lower degree of adhesion of the epoxy resin composition contained in the slit tape prepreg to the guide rolls when processed by the AFP method to ensure an increased productivity of carbon fiber reinforced composite material and also serving to provide a cured product (carbon fiber reinforced material) having high heat resistance, and also provide a method for the production thereof.

The present inventors conducted intensive research to solve the above problem, and arrived at the invention described below. Specifically, the present invention provides a prepreg including at least the components [A] to [D] given below and a preliminary reaction product that is a reaction product of the component [B] and the component [C], at least one surface resin in the prepreg having a storage elastic modulus G' in the range of $1.0 \times 10^3$ to $2.0 \times 10^8$ Pa as measured at a temperature of 40° C. and an angular frequency in the range of 0.06 to 314 rad/s.

[A] carbon fiber,

[B] epoxy resin,

[C] curing agent, and

[D] thermoplastic resin.

Furthermore, the slit tape prepreg according to the present invention is produced by slitting the aforementioned prepreg.

In addition, the present invention provides a prepreg production method including a step for performing heat-treatment or energy irradiation of a prepreg precursor containing at least the components [A] to [D] given below to provide a prepreg containing at least one surface resin having a storage elastic modulus G' in the range of $1.0 \times 10^3$ to $2.0 \times 10^8$ Pa as measured at a temperature of 40° C. and an angular frequency in the range of 0.06 to 314 rad/s.

[A] carbon fiber,

[B] epoxy resin,

[C] curing agent, and

[D] thermoplastic resin.

Furthermore, the present invention provides another prepreg production method including a step for performing heat-treatment or energy irradiation of an epoxy resin composition containing at least the components [B] and [C] given above and a subsequent step for impregnating the component [A] given below therewith, to provide a prepreg containing at least one surface resin having a storage elastic modulus G' in the range of $1.0 \times 10^3$ to $2.0 \times 10^8$ Pa as measured at a temperature of 40° C. and an angular frequency in the range of 0.06 to 314 rad/s.

The present invention can provide a prepreg having high drapability, serving to produce a slit tape prepreg that suffers a lower degree of adhesion of the epoxy resin composition contained in the slit tape prepreg to the guide rolls when processed by the AFP method to ensure an increased productivity of carbon fiber reinforced material and also serving to provide a cured product (carbon fiber reinforced material) having high heat resistance, and also provide a method for the production thereof.

DETAILED DESCRIPTION OF CERTAIN EMBODIMENTS OF THE INVENTION

The present invention will be described more in detail below.

The prepreg according to the present invention is a prepreg including at least the components [A] to [D] given below and a preliminary reaction product that is a reaction product of the component [B] and the component [C], at least one surface resin in the prepreg having a storage elastic modulus G' in the range of $1.0 \times 10^3$ to $2.0 \times 10^8$ Pa as measured at a temperature of 40° C. and an angular frequency in the range of 0.06 to 314 rad/s.

[A] carbon fiber,

[B] epoxy resin,

[C] curing agent, and

[D] thermoplastic resin.

As a result of adopting this constitution, at least one surface resin in the prepreg has a moderately high G' of $1.0 \times 10^3$ to $2.0 \times 10^8$ Pa in the wide measuring angular frequency of 0.06 to 314 rad/s, thus allowing the production of a slit tape prepreg that suffers a lower degree of adhesion of the epoxy resin composition contained in the slit tape prepreg to the guide rolls when processed by the AFP method to ensure an increased productivity of carbon fiber reinforced material. Furthermore, the G' value of the surface resin is not too high and therefore, a high drapability is maintained. Then, these characteristics are adjusted properly by combining a preliminary reaction product, i.e. the reaction product of the component [B] and the component [C], and a thermoplastic resin, i.e. the component [D], to allow the prepreg to serve also to produce a cured product (carbon fiber reinforced material) having heat resistance.

The prepreg according to the present invention includes the components [A] to [D] and further includes a preliminary reaction product, which is the reaction product of the component [B] and the component [C] as described above, and takes the form of any one of the first to third preferred embodiments.

According to the first preferred embodiment, the component [B] includes a m- or p-aminophenol epoxy resin [b1] and either a glycidyl ether epoxy resin or a glycidyl amine epoxy resin [b2] that has two or more glycidyl groups in a molecule, and the component [b1] in the prepreg including the preliminary reaction product accounts for 10 to 60 parts by mass while the component [b2] in the prepreg including the preliminary reaction product accounts for 40 to 90 parts by mass relative to the total quantity, which accounts for 100 parts by mass, of the component [B] in the prepreg including the preliminary reaction product. The adoption of such a constitution serves to provide a prepreg that gives a carbon fiber reinforced material having heat resistance and mechanical property in a good balance.

According to the second preferred embodiment, the prepreg gives a cured product having a phase-separated structure in which there is phase separation between a phase containing the reaction product of the component [B] and the component [C] as main component and a phase containing the component [D] as main component. The adoption of such a constitution serves to provide a prepreg that gives a carbon fiber reinforced material having a higher impact resistance compared with the case where the cured matrix resin forms a homogeneous structure.

According to the third preferred embodiment, the component [B] includes an epoxy resin [b5] that contains one or more ring structures having four- or more-membered ring and at the same time containing at least one amine type glycidyl group or ether type glycidyl group directly connected to a ring structure, and an epoxy resin [b6] which is tri- or more-functional, and the component [B] in the prepreg including the preliminary reaction product accounts for 5 to 60 parts by mass while the component [C] in the prepreg including the preliminary reaction product accounts for 40 to 80 parts by mass relative to the total quantity, which accounts for 100 parts by mass, of the component [B] in the prepreg including the preliminary reaction product. The adoption of such a constitution serves to provide a prepreg that gives a carbon fiber reinforced material having good mechanical property (tensile strength) at low temperatures.

Each of the components is described in detail below.

The carbon fiber used as the component [A] for the present invention is high in specific strength and specific elastic modulus and also high in conductivity, and therefore, used suitably in applications where good mechanical property and high conductivity are required.

Specific preferred examples of carbon fiber used as the component [A] include acrylic, pitch based, and rayon based carbon fibers, of which acrylic carbon fiber is particularly preferred because it is high in tensile strength.

Acrylic carbon fiber can be produced through, for example, a process as described below.

First, a spinning solution that contains polyacrylonitrile produced from monomers formed of acrylonitrile as main component is spun by wet spinning, dry-wet spinning, dry spinning, or melt spinning to provide a coagulated thread. Then, the coagulated thread is processed in a yarn-making step to provide a precursor. Then, the precursor is subjected to steps for flameproofing treatment, carbonization, etc., for conversion into carbon fiber, thus providing acrylic carbon fiber. Here, the main component as referred to herein is the monomer component that is the highest in mass content.

The carbon fiber of the component [A] may be in the form of twisted yarns, untwisted yarns, or twistless yarns. In a twisted yarn, filaments constituting the carbon fiber bundles are not oriented in parallel, and fiber reinforced composite material produced therefrom can suffer from deterioration in mechanical property, and therefore, untwisted yarns and non-twisted yarns are preferred because they give fiber reinforced composite materials having moldability and strength characteristics in a good balance.

The carbon fiber of the component [A] preferably has a tensile modulus of 200 to 440 GPa. The tensile modulus of carbon fiber depends on the degree of crystallinity of the graphite structure formed in the carbon fiber, and the elastic modulus increases with an increasing degree of crystallinity. Furthermore, the conductivity also increases with an increasing degree of crystallinity. If the carbon fiber of the component [A] has a tensile modulus in this range, it is preferable because it gives a fiber reinforced composite material having conductivity, stiffness, and strength all in a good balance at a high level. It is more preferable for the carbon fiber to have a tensile modulus of 230 to 400 GPa, and it is still more preferable for the carbon fiber to have a tensile modulus of 260 to 370 GPa. Here, the tensile modulus of carbon fiber is measured according to JIS R7601-2006.

Commercial products of carbon fiber that can be used as the component [A] include Torayca (registered trademark) T800G-24K, Torayca (registered trademark) T800S-24K, Torayca (registered trademark) T810G-24K, Torayca (registered trademark) T700G-24K, Torayca (registered trademark) T300-3K, and Torayca (registered trademark) T700S-12K (all manufactured by Toray Industries, Inc.).

The epoxy resin [B] to use for the present invention is a compound having one or more epoxy groups in one molecule.

Specific examples of the epoxy resin [B] to use for the present invention include aromatic glycidyl ethers produced from a phenol having a plurality of hydroxyl groups, aliphatic glycidyl ethers produced from an alcohol having a plurality of hydroxyl groups, glycidyl amines produced from an amine, glycidyl esters produced from a carboxylic acid having a plurality of carboxyl groups, and epoxy resins having an oxirane ring.

For the first preferred embodiment of the present invention, a m- or p-aminophenol epoxy resin [b1] and either a glycidyl ether epoxy resin or a glycidyl amine epoxy resin [b2] that has two or more glycidyl groups in a molecule are used as the epoxy resin [B]. This serves to provide a prepreg that has high processability and handleability and gives a cured product with high heat resistance and mechanical property.

From the viewpoint of containing a cured resin simultaneously high in toughness, elongation percentage, and heat resistance, it is preferable for the component [b1] to account for 10 to 60 parts by mass, more preferably 15 to 55 parts by mass, and still more preferably 20 to 50 parts by mass, relative to the total quantity, which accounts for 100 parts by mass, of the component [B].

The component [b1] is preferably at least one selected from the group consisting of epoxy resins having structures as represented by the formula (2) given below, and derivatives thereof.

[Chemical formula 1]

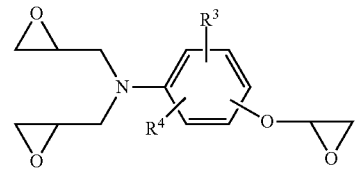

(2)

wherein $R^3$ and $R^4$ in formula (2) represent at least one selected from the group consisting of a hydrogen atom, aliphatic hydrocarbon group containing 1 to 4 carbon atoms, alicyclic hydrocarbon group containing 4 or less carbon atoms, and halogen atom.

If the structures of $R^3$ and $R^4$ in formula (2) are too large, the epoxy resin composition can be too high in viscosity to cause a decrease in handling ability, and the compatibility between the m- or p-aminophenol epoxy resin and other components of the epoxy resin composition can decrease, resulting in deterioration in the effect of giving a carbon fiber reinforced material with improved mechanical property.

Specific examples of the component [b1] include, for example, triglycidyl-p-aminophenol, triglycidyl-m-aminophenol, and derivatives and isomers thereof.

In particular, $R^3$ and $R^4$ are each preferably a hydrogen atom from the viewpoint of compatibility with other epoxy resins, and more preferably triglycidyl-p-aminophenol or triglycidyl-m-aminophenol from the viewpoint of heat resistance. From the viewpoint of fire retardance, $R^3$ and/or $R^4$ may be substituted by halogen atoms such as Cl and Br as a preferred embodiment.

Commercially available products of m- or p-aminophenol epoxy resin [b1] are listed below.

Commercial products of aminophenol epoxy resin include Sumiepoxy (registered trademark) ELM120 and ELM100 (both manufactured by Sumitomo Chemical Co., Ltd.), jER (registered trademark) 630 (manufactured by Mitsubishi Chemical Corporation), and Araldite (registered trademark) MY0500, MY0510 and MY0600 (all manufactured by Huntsman Advanced Materials Gmbh).

The component [b2], which is used in combination with the component [b1], is either a glycidyl ether epoxy resin or a glycidyl amine epoxy resin that has two or more glycidyl groups in a molecule, and it is an important component from the viewpoint of heat resistance represented by glass transition temperature of cured products and the viscosity of the preliminary reaction product described later. It should be noted that aminophenol epoxy resin is not a glycidyl ether epoxy resin or a glycidyl amine epoxy resin. If an epoxy resin having less than two glycidyl groups in a molecule is used, a cured product produced by heating and curing its mixture with a curing agent as described later will be low in glass transition temperature in some cases. Preferred examples of such an epoxy resin include, for example, bisphenol epoxy resins such as bisphenol A epoxy resin, bisphenol F epoxy resin, bisphenol AD epoxy resin, and bisphenol S epoxy resin; brominated epoxy resins such as tetrabromobisphenol A diglycidyl ether; and others such as alicyclic epoxy resin, diaminodiphenylmethane, diaminodiphenyl sulfone, diaminodiphenyl ether, xylene diamine, constitutional isomers thereof, and substances produced by converting a derivative having a halogen atom or an alkyl substituent containing three or less carbon atoms, used as precursor, into a glycidyl compound. More specifically, they include glycidyl amine epoxy resins such as tetraglycidyl diaminodiphenylmethane, glycidyl compounds of xylene diamine, tetraglycidyl diaminodiphenyl sulfone, and tetraglycidyl diaminodiphenyl ether.

These epoxy resins may be used singly or as an appropriate mixture in order to give a carbon fiber reinforced material, which is produced by curing a prepreg according to the present invention, having intended mechanical property and heat resistance.

In order to obtain a carbon fiber reinforced material having improved toughness, it is preferable to contain a bisphenol epoxy resin as the component [b2], whereas in order to obtain a carbon fiber reinforced material having improved heat resistance and elastic modulus, it is preferable to contain a glycidyl amine epoxy resin as the component [b2].

Furthermore, the inclusion of a plurality of epoxy resins having different flow characteristics is effective for fluidity control of the matrix resin when heat-curing the prepreg obtained. For example, if the matrix resin is high in fluidity before its gelation in the heat curing step, disturbance in the orientation of carbon fibers can occur, or the matrix resin can flow out of the system to alter the fiber volume content out of the predetermined range, possibly resulting in a carbon fiber reinforced material having deteriorated mechanical property.

In the case where the component [b1] and the component [b2] are used in combination, if the content of the component [b2] is small, it contributes little to the mechanical property of the carbon fiber reinforced material whereas if the content is too large, the heat resistance can decrease in some cases when the component [b2] is a bisphenol epoxy resin or the toughness can decrease in some cases when the component [b2] is a glycidyl amine epoxy resin. Therefore, from the viewpoint of control of the heat resistance and resin viscosity and also from the viewpoint of the elongation percentage and toughness of the resin, it is preferable for the component [b2] to account for 40 to 90 parts by mass, more preferably 45 to 85 parts by mass, and still more preferably 50 to 80 parts by mass, relative to the total quantity, which accounts for 100 parts by mass, of the component [B].

According to the second preferred embodiment of the present invention, the prepreg gives a cured matrix resin having a phase-separated structure in which there is phase separation between a phase containing the component [B], the component [C], and the reaction product of the component [B] and the component [C] as main components and a phase containing the thermoplastic resin of the component [D] as main component. This serves to provide a carbon fiber reinforced material having a higher impact resistance compared with the case where the cured matrix resin forms a homogeneous structure. The main component as referred to herein is the component of each phase that is the highest in mass percentage.

The phase-separated structure in which there is phase separation between a phase containing the component [B], the component [C], and the reaction product of the component [B] and the component [C] as main component and a phase containing the component [D] as main component as referred to herein is a structure in which there are two separated phases, namely, a phase containing the reaction product of the component [B] and the component [C] as main component and a phase containing the component [D] as main component, with the structural period being in the range described later. Unless there occurs a decrease in the interface strength between the two separated phases, the phase-separated structure has a larger impact resistance improving effect with an increasing mass percentage of the main component, and therefore, the mass percentage of the main component is preferably 80 mass % or more, more preferably 90 mass % or more, and still more preferably 95 mass % or more.

Such a phase-separated structure is preferably a sea-island structure or a bicontinuous structure from the viewpoint of isotropy of material characteristics, and particularly preferably a sea-island structure from the viewpoint of solvent resistance. Here, a sea-island structure is a dispersed structure in which a plurality of particle-like domains that contain the island component as main component are dispersed in a matrix that contains the sea component as main component.

Here, the term "particle-like" means a spherical, ellipsoidal, or red blood cell-like shape, a shape of granulated material formed of coagulated spherical or ellipsoidal particles, or a shape of amorphous granular matter or granulated material thereof.

Here, the matters to be noted include the average particle diameter of the domains in the sea-island structure, and the structural period and uniformity of the bicontinuous structure. If the size is below a certain limit, the structure can exhibit physical properties better than the physical properties of each resin component, and the resin components can make up for each other's disadvantages. If the size is above a certain limit, each resin component can exhibit its own good characteristics. After curing the epoxy resin composition according to the present invention, therefore, the phase-separated structure preferably has a structural period of 0.01 µm to 50 µm, more preferably 0.03 to 10 µm, and still more preferably 0.05 to 5 µm.

Here, the structural period of phase separation is defined as follows. In the case of a sea-island structure, it is the average particle diameter of the domains.

The existence of a sea-island structure can be examined by, for example, curing the prepreg to prepare a carbon fiber reinforced material, embedding it in an epoxy resin designed for electron microscopy, further curing it, cryo-cutting it to a thickness of 0.1 μm, and observing a cross section by a transmission electron microscope (for example, H-7100, manufactured by Hitachi, Ltd.).

Here, when observing the phase structure by electron microscopy, pre-treatment may be performed using various generally known stains to permit clear observation of the phase structure.

From the viewpoint of developing a toughness and impact resistance improving effect as a result of the formation of a sea-island structure, the average particle diameter of the domains is preferably 50 μm or less, more preferably 10 μm or less, still more preferably 5 μm or less, and particularly preferably 1 μm or less. Here, the lower limit is preferably 0.05 μm. If the average particle diameter of the domains is outside the above range, the toughness and impact resistance improving effect will be small or cannot be realized in some cases.

For the second preferred embodiment of the present invention, various generally known compatibilizers can be used to control the average particle diameter of the domains.

Here, a compatibilizer is a block copolymer, graft copolymer, random copolymer, etc., that works to decrease the free energy at the interface between phase-separated regions to permit easy control of the average particle diameter of the domains and the distance among the domains in a sea-island structure.

Here, the average particle diameter of the domains can be determined by the method described below.

<Average Particle Diameter of Domains>

As described above, the prepreg is cured to prepare a carbon fiber reinforced material, and it is embedded in an epoxy resin designed for electron microscopy and further cured, followed by cryo-cutting it to a thickness of 0.1 μm and observing a cross section by a transmission electron microscope (for example, H-7100, manufactured by Hitachi, Ltd.). From the transmission electron microscopic photographs obtained, 50 domains are selected at random and their cross sections are measured and converted to diameters of perfect circles that have the same area as them, which are averaged to give the average particle diameter of the domains.

In the case of a bicontinuous structure, three straight lines with predetermined lengths are drawn randomly on a microscopic photograph, and the intersections between the straight lines and the phase-to-phase interfaces are determined. Then, the distance between each pair of adjacent intersections is measured and the number average of the distance measurements is adopted as structural period. Such a line with a predetermined length is defined as follows on the basis of microscopic photographs. For a specimen with an assumed structural period of the order of 0.01 μm (0.01 μm or more and less than 0.1 μm), a photograph is taken at a magnification of 20,000 times and the predetermined length is the length of a 20 mm line (1 μm length on the specimen) drawn on the photograph, and similarly, for a specimen with an assumed phase-separation structural period of the order of 0.1 μm (0.1 μm or more and less than 1 μm), a photograph is taken at a magnification of 2,000 times and it is the length of a 20 mm line (10 μm length on the specimen) drawn on the photograph. For a specimen with an assumed phase-separation structural period of the order of 1 μm (1 μm or more and less than 10 μm), a photograph is taken at a magnification of 200 times and it is the length of a 20 mm line (100 μm length on the specimen) appropriately drawn on the photograph, and for a specimen with an assumed phase-separation structural period of the order of 10 μm (10 μm or more and less than 100 μm), a photograph is taken at a magnification of 20 times and it is the length of a 20 mm line (1,000 μm length on the specimen) appropriately drawn on the photograph. If the measured phase-separation structural period is outside the expected size range, relevant areas are observed again at a magnification that suits the corresponding order.

For the second preferred embodiment of the present invention, it is preferable to form a sea-island structure in which particle-like phases containing the component [D] as main component are dispersed in the phase containing the reaction product of the component [B] and the component [C] as main component from the viewpoint of mechanical property and solvent resistance of the carbon fiber reinforced material.

To allow a phase-separated structure consisting of a phase containing the reaction product of the component [B] and the component [C] as main component and a phase containing the component [D] as main component to be formed in the matrix resin after curing a prepreg, the combined use of an aminophenol epoxy resin [b3] such as triglycidyl aminophenol and either a bisphenol A epoxy resin or a bisphenol F epoxy resin [b4] is preferred from the viewpoint of prepreg production process features such as heat resistance, mechanical property, and carbon fiber impregnating property. From the viewpoint of containing a cured resin simultaneously high in toughness, elongation percentage, and heat resistance, it is preferable for the component [b3] to account for 30 to 70 parts by mass, more preferably 35 to 65 parts by mass, and still more preferably 40 to 60 parts by mass, relative to the total quantity, which accounts for 100 parts by mass, of the component [B].

If the content of the component [b4] is small, it contributes little to the mechanical property of the carbon fiber reinforced material whereas if the content is too large, the heat resistance can decrease largely in some cases. Therefore, from the viewpoint of control of the heat resistance and resin viscosity and also from the viewpoint of the elongation percentage and toughness of the resin, it is preferable for the component [b4] to account for 30 to 70 parts by mass, more preferably 35 to 65 parts by mass, and still more preferably 40 to 60 parts by mass, relative to the total quantity, which accounts for 100 parts by mass, of the component [B].

Among others, liquid bisphenol A epoxy resin and bisphenol F epoxy resin, which are low in viscosity, are particularly preferable from the viewpoint of easy impregnation of carbon fibers with the epoxy resin compositions in a prepreg production process. Compared to liquid bisphenol A epoxy resins, solid bisphenol A epoxy resins will form a structure with a low cross-linking density, which will be low in heat resistance but high in toughness, and accordingly they are used in combination with a glycidyl amine epoxy resin, liquid bisphenol A epoxy resin, or bisphenol F epoxy resin.

Commercially available products of triglycidyl aminophenol useful for the component [b3] and alkyl-substituted derivatives thereof include the same ones as those for the component [b1].

Commercial products of bisphenol A epoxy resin useful for the component [b4] include Epon (registered trademark) 825 (manufactured by Mitsubishi Chemical Corporation), EPICLON (registered trademark) 850 (manufactured by DIC), Epotohto (registered trademark) YD-128 (manufactured by Nippon Steel Chemical Co., Ltd.), and DER-331 and DER-332 (both manufactured by The Dow Chemical Company).

Commercial products of the bisphenol F epoxy resin include jER (registered trademark) 806, jER (registered trademark) 807, and jER (registered trademark) 1750 (all manufactured by Mitsubishi Chemical Corporation), EPICLON (registered trademark) 830 (manufactured by DIC), and Epotohto (registered trademark) YD-170 (manufactured by Nippon Steel Chemical Co., Ltd.).

According to the third preferred embodiment, the epoxy resin [B] includes an epoxy resin [b5] that contains one or more ring structures having four- or more-membered ring and at the same time containing at least one amine type glycidyl group or ether type glycidyl group directly connected to a ring structure, and an epoxy resin [b6] which is tri- or more-functional. This serves to provide a prepreg that has high processability and handleability and gives a cured product with high heat resistance and mechanical strength at low temperatures.

Here, an epoxy resin compound "containing one or more ring structures having four- or more-membered ring" either contains one or more single ring structures each having four or more members, such as cyclohexane, benzene, and pyridine, or contains at least one condensed ring structure having 4- or more membered rings, such as phthalimide, naphthalene, and carbazole.

The above expression "amine type glycidyl group or ether type glycidyl group directly connected to the ring structure of [b5]" means that the N atom is connected to the structure in the case where a ring structure such as benzene and phthalimide has an amine type glycidyl group or that the O atom is connected to the structure in the case of an ether type glycidyl group. The epoxy resin is either monofunctional or di-functional in the case of amine type, and the epoxy resin is monofunctional in the case of ether type. It is referable for the component [b5] to be a di-functional epoxy resin that has a structure as shown by formula (1).

[Chemical formula 2]

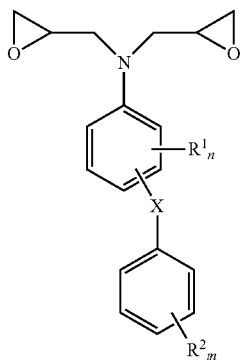

(1)

(In the formula, $R^1$ and $R^2$ are at least independently one selected from the group consisting of an aliphatic hydrocarbon group having 1 to 4 carbon atoms, an alicyclic hydrocarbon group having 3 to 6 carbon atoms, an aromatic hydrocarbon group having 6 to 10 carbon atoms, a halogen atom, an acyl group, a trifluoromethyl group, and a nitro group. Here, n and m are an integer of 0 to 4 and an integer of 0 to 5, respectively. When n or m is an integer of 2 or more, the plurality of $R^1$'s or $R^2$'s may be either identical to or different from each other. X represents one selected from the group consisting of —O—, —S—, —CO—, —C(=O)O—, and —$SO_2$—.)

If the content of [b5] is small, it can contribute little to effect of improving the mechanical strength of the carbon fiber reinforced material in some cases whereas if the content is too large, the heat resistance can decrease largely in some cases. Therefore, the content of [b5] in the prepreg including the preliminary reaction product is preferably 5 to 60 parts by mass relative to the total amount, which represents 100 parts by mass, of the component [B] in the prepreg including the preliminary reaction product. Furthermore, regarding the epoxy resin of the component [B], a monofunctional epoxy resin is more effective in enhancing the strength, and a di-functional epoxy resin realizes a higher heat resistance. Accordingly, in the case of a monofunctional epoxy resin, the content of [b5] is more preferably 10 to 40 parts by mass, and still more preferably 15 to 30 parts by mass, relative to the total amount, which represents 100 parts by mass, of the component [B] in the prepreg including the preliminary reaction product. In the case of a di-functional epoxy resin, it is more preferably 20 to 55 parts by mass, and still more preferably 30 to 50 parts by mass, relative to the total amount, which represents 100 parts by mass, of the component [B] in the prepreg including the preliminary reaction product.

Of the epoxy resins useful as [b5] for the present invention, monofunctional ones include, for example, glycidylphthalimide, glycidyl-1,8-naphthalimide, glycidylcarbazole, glycidyl-3,6-dibromocarbazole, glycidylindole, glycidyl-4-acetoxyindole, glycidyl-3-methylindole, glycidyl-3-acetylindole, glycidyl-5-methoxy-2-methylindole, o-phenylphenyl glycidyl ether, p-phenylphenyl glycidyl ether, p-(3-methylphenyl)phenyl glycidyl ether, 2,6-dibenzylphenyl glycidyl ether, 2-benzylphenyl glycidyl ether, 2,6-diphenylphenyl glycidyl ether, 4-α-cumylphenyl glycidyl ether, o-phenoxyphenyl glycidyl ether, and p-phenoxyphenyl glycidyl ether.

Of the epoxy resins useful as [b5] for the present invention, di-functional ones include, for example, N,N-diglycidyl-4-phenoxy aniline, N,N-diglycidyl-4-(4-methylphenoxy) aniline, N,N-diglycidyl-4-(4-tert-butylphenoxy) aniline, and N,N-diglycidyl-4-(4-phenoxyphenoxy) aniline. In many cases, these resins can be produced by adding epichlorohydrin to a phenoxy aniline derivative and cyclized with an alkali compound. Since the viscosity increases with an increasing molecular weight, N,N-diglycidyl-4-phenoxy aniline, which is represented by formula (1) in which both $R^1$ and $R^2$ are hydrogen atoms, is particularly preferred from the viewpoint of handleability.

Specifically, usable phenoxy aniline derivatives include 4-phenoxy aniline, 4-(4-methylphenoxy) aniline, 4-(3-methylphenoxy) aniline, 4-(2-methylphenoxy) aniline, 4-(4-ethylphenoxy) aniline, 4-(3-ethylphenoxy) aniline, 4-(2-ethylphenoxy) aniline, 4-(4-propylphenoxy) aniline, 4-(4-tert-butylphenoxy) aniline, 4-(4-cyclohexylphenoxy) aniline, 4-(3-cyclohexylphenoxy) aniline, 4-(2-cyclohexylphenoxy) aniline, 4-(4-methoxy phenoxy) aniline, 4-(3-methoxyphenoxy) aniline, 4-(2-methoxyphenoxy) aniline, 4-(3-phenoxyphenoxy) aniline, 4-(4-phenoxyphenoxy) aniline, 4-[4-(trifluoromethyl) phenoxy] aniline, 4-[3-(trifluoromethyl) phenoxy] aniline, 4-[2-(trifluoromethyl) phenoxy] aniline, 4-(2-naphthyloxyphenoxy) aniline, 4-(1-naphthyloxyphenoxy) aniline, 4-[(1,1'-biphenyl-4-yl)oxy] aniline, 4-(4-nitrophenoxy) aniline, 4-(3-nitrophenoxy) aniline, 4-(2-nitrophenoxy) aniline, 3-nitro-4-aminophenyl phenyl ether, 2-nitro-4-(4-nitrophenoxy) aniline, 4-(2,4-dinitrophenoxy) aniline, 3-nitro-4-phenoxy aniline, 4-(2-chlorophenoxy) aniline, 4-(3-chlorophenoxy) aniline, 4-(4-chlorophenoxy) aniline, 4-(2,4-dichlorophenoxy) aniline, 3-chloro-4-(4-chlorophenoxy) aniline, and 4-(4-chloro-3-tolyloxy) aniline.

Of the epoxy resins useful as [b5] for the present invention, commercial products of monofunctional epoxy resins include Denacol (registered trademark) EX-731 (glycidylphthalimide, manufactured by Nagase ChemteX Corporation) and OPP-G (o-phenyl phenyl glycidyl ether, manufactured by Sanko Co., Ltd.), and commercial products of di-functional epoxy resinsones include GAN (N-diglycidyl aniline, manufactured by Nippon Kayaku Co., Ltd.) and TOREP (registered trademark) A-204E (diglycidyl-p-phenoxy aniline, manufactured by Toray Fine Chemicals Co., Ltd.).

The tri- or more functional epoxy resin used as [b6] in the third preferred embodiment according to the present invention is a compound having three or more epoxy groups in one molecule. Examples of [b6] include glycidyl amine epoxy resin, glycidyl ether epoxy resin, and aminophenol epoxy resin.

The compound of [b6] preferably contains 3 to 7, more preferably 3 to 4, functional groups. If there exist too many functional groups, the cured matrix resin will be so brittle that the impact resistance will deteriorate in some cases.

Examples of tri- or more functional glycidyl amine epoxy resins include diaminodiphenylmethane type, diaminodiphenyl sulfone type, metaxylenediamine type, 1,3-bisaminomethyl cyclohexane type, and isocyanurate type epoxy resins.

Examples of tri- or more functional glycidyl ether epoxy resins include phenol novolac type, orthocresol novolac type, tris-hydroxyphenyl methane type, and tetraphenylol ethane type epoxy resins.

Furthermore, in addition to the above tri- or more functional glycidyl amine epoxy resins and tri- or more functional glycidyl ether epoxy resins, the tri- or more functional epoxy resins also include aminophenol epoxy resins, which contain both a glycidyl amine group and a glycidyl ether group in one molecule.

Of the tri- or more functional epoxy resins given above, diaminodiphenylmethane type and aminophenol type epoxy resins are particularly preferred because of a good balance among physical properties.

The heat resistance can decrease if the content of [b6] is too small whereas the cross-linking density can increase leading to a brittle material if the content of [b6] is too large, possibly resulting in a carbon fiber reinforced material suffering from deterioration in impact resistance and strength. Therefore, the content of [b6] in the prepreg including the preliminary reaction product is preferably 40 to 80 parts by mass, more preferably 45 to 75 parts by mass, and still more preferably 50 to 70 parts by mass, relative to the total amount, which represents 100 parts by mass, of the component [B] in the prepreg including the preliminary reaction product.

Commercial products of diaminodiphenyl methane type epoxy resin useful as [b6] include Sumiepoxy (registered trademark) ELM434 (manufactured by Sumitomo Chemical Co., Ltd.), Araldite (registered trademark) MY720, Araldite (registered trademark) MY721, Araldite (registered trademark) MY9512, Araldite (registered trademark) MY9663 (all manufactured by Huntsman Advanced Materials Gmbh), and Epotohto (registered trademark) YH-434 (manufactured by Tohto Kasei Co., Ltd.).

Of the preferred epoxy resins other than the epoxy resins used as [b5] or [b6], the di-functional epoxy resins include glycidyl ether type epoxy resins produced from a phenol as precursor. Examples of such epoxy resins include bisphenol A epoxy resin, bisphenol F epoxy resin, and bisphenol S epoxy resin.

Being low in viscosity, liquid bisphenol A epoxy resins and bisphenol F epoxy resins are preferably used in combination with other epoxy resins.

Compared to liquid bisphenol A epoxy resins, solid bisphenol A epoxy resins will form a structure with a low cross-linking density, which will be low in heat resistance but high in toughness, and accordingly they are used in combination with a glycidyl amine epoxy resin, liquid bisphenol A epoxy resin, or bisphenol F epoxy resin.

Commercial products of bisphenol A epoxy resin include Epon (registered trademark) 825 (manufactured by Japan Epoxy Resins Co., Ltd.), EPICLON (registered trademark) 850 (manufactured by DIC), Epotohto (registered trademark) YD-128 (manufactured by Tohto Kasei Co., Ltd.), and D. E. R. (registered trademark) 331 and D. E. R. (registered trademark) 332 (both manufactured by The Dow Chemical Company).

Commercial products of bisphenol F epoxy resin include jER (registered trademark) 806, jER (registered trademark) 807, and jER (registered trademark) 1750 (all manufactured by Japan Epoxy Resins Co., Ltd.), EPICLON (registered trademark) 830 (manufactured by DIC), and Epotohto (registered trademark) YD-170 (manufactured by Tohto Kasei Co., Ltd.)

Unless there occurs a significant reduction in the heat resistance or mechanical properties, the prepreg according to the present invention in each preferred embodiment may contain an epoxy compound that corresponds to any of the epoxy compounds other than [b1] and [b2] in the first preferred embodiment according to the present invention, an epoxy compound that corresponds to any of the epoxy compounds other than [b3] and [b4] in the second preferred embodiment according to the present invention, or an epoxy compound that corresponds to any of the epoxy compounds other than [b5] and [b6] in the third preferred embodiment according to the present invention. Useful examples include bisphenol S epoxy resin, alicyclic epoxy resin, epoxy resin having a biphenyl skeleton, epoxy resin having a naphthalene skeleton, epoxy resin having a dicyclopentadiene skeleton, urethane modified epoxy resin, hydantoin or resorcinol epoxy resin, phenol novolac epoxy resin, cresol novolac epoxy resin, other novolac epoxy resins, and monoepoxy compounds having only one epoxy group in one molecule. In each preferred embodiment, the addition of appropriate ones that correspond to those given above makes it possible to achieve a good balance between mechanical property and heat resistance or realize appropriate adjustment of the resin viscosity.

An epoxy resin with a naphthalene skeleton will give cured resin having both a low water absorption percentage and a high heat resistance. In addition, biphenyl epoxy resins, dicyclopentadiene epoxy resins, phenol aralkyl epoxy resins, and diphenyl fluorene epoxy resins are also preferred because they give cured resin with a low water absorption percentage. Urethane modified epoxy resins and isocyanate modified epoxy resins give cured resin with a high fracture toughness and a high elongation percentage.

Commercial products of biphenyl epoxy resin include jER (registered trademark) YX4000 (manufactured by Mitsubishi Chemical Corporation).

Commercial products of naphthalene epoxy resin include EPICLON (registered trademark) HP-4032 (manufactured by DIC).

Commercial products of dicyclopentadiene epoxy resin include EPICLON (registered trademark) HP-7200 (manufactured by DIC).

Commercial products of meta-xylene diamine epoxy resin include TETRAD-X (manufactured by Mitsubishi Gas Chemical Co., Inc.).

Commercial products of 1,3-bisaminomethyl cyclohexane epoxy resin include TETRAD-C (manufactured by Mitsubishi Gas Chemical Co., Inc.).

Commercial products of isocyanurate epoxy resin include TEPIC (registered trademark)—P (manufactured by Nissan Chemical Industries, Ltd.).

Commercial products of tris-hydroxyphenyl methane epoxy resin include Tactix (registered trademark) 742 (manufactured by Huntsman Advanced Materials Gmbh).

Commercial products of tetraphenylol ethane epoxy resin include jER (registered trademark) 1031S (manufactured by Japan Epoxy Resins Co., Ltd.).

Commercial products of phenol novolac epoxy resin include D.E.N. (registered trademark) 431 and D.E.N. (registered trademark) 438 (both manufactured by The Dow Chemical Company) and jER (registered trademark) 152 (manufactured by Japan Epoxy Resins Co., Ltd.)

Commercial products of orthocresol novolac epoxy resin include EOCN-1020 (manufactured by Nippon Kayaku Co., Ltd.) and EPICLON (registered trademark) N-660 (manufactured by DIC).

Commercial products of resorcinol epoxy resin include Denacol (registered trademark) EX-201 (manufactured by Nagase ChemteX Corporation).

Commercial products of urethane modified epoxy resin include AER4152 (manufactured by Asahi Kasei E-materials Corp.).

Commercial products of hydantoin epoxy resin include AY238 (manufactured by Huntsman Advanced Materials Gmbh).

Commercial products of phenol aralkyl epoxy resin include NC-3000 (manufactured by Nippon Kayaku Co., Ltd.).

The curing agent used as the component [C] for the present invention may be any compound that has an active group that can react with an epoxy resin under energy irradiation, i.e., exposure to heat, microwave, visible light, infrared light, ultraviolet light, electron beam, or radiation. Examples of such an active group that can react with an epoxy resin include those containing an amino group or an acid anhydride group. When using a curing agent for an epoxy resin, the preservation stability of the prepreg that contains it is preferably as high as possible, and from the viewpoint of allowing the prepreg to have a high preservation stability, it is preferably solid at 23° C. Here, the expression "being solid" means that at least either the glass transition temperature or the melting point is 23° C. or more and the substance substantially does not show fluidity at 23° C.

The component [C] is preferably an aromatic amine compound and preferably has one to four phenyl groups in the molecule from the viewpoint of heat resistance and mechanical property. Furthermore, since a bent molecular skeleton can contribute to an increase in the resin's elastic modulus and improvement in mechanical property, the epoxy resin curing agent is more preferably an aromatic polyamine compound in which at least one phenyl group contained in the backbone has an amino group at an ortho or meta position. Furthermore, from the viewpoint of heat resistance, an aromatic polyamine compound in which two or more phenyl groups have amino groups at para positions is preferred. Specific examples of such aromatic polyamine compounds include phenylene diamine, diaminodiphenylmethane, diaminodiphenyl sulfone, meta-xylylene diamine, (p-phenylene methylene) dianiline, various derivatives thereof such as alkyl-substituted derivatives, and various isomers having amino groups at different positions. To provide materials for spacecraft and aircraft, in particular, the use of 4,4'-diaminodiphenyl sulfone or 3,3'-diaminodiphenyl sulfone is preferred because they can give cured products having high heat resistance and elastic modulus while hardly suffering from a decrease in linear expansion coefficient or a reduction in heat resistance due to moisture absorption. These aromatic amine compounds may be used singly or as a mixture of two or more thereof. When mixed with other components, they may be powder or liquid, or powdery and liquid aromatic amine compounds may be mixed together.

Usable commercial products of aromatic amine compounds include Seikacure (registered trademark)—S (manufactured by Seika K.K.), MDA-220 (manufactured by Mitsui Chemicals, Inc.), Lonzacure (registered trademark) M-DIPA (manufactured by Lonza), Lonzacure (registered trademark) M-MIPA (manufactured by Lonza), and 3,3'-DAS (manufactured by Mitsui Chemicals, Inc.).

When an aromatic amine is used as the component [C], its content is preferably such that the number of moles of the active hydrogen atoms in the aromatic amine is 0.6 to 1.2 times, preferably 0.8 to 1.1 times, that of the number of moles of the epoxy groups contained in the epoxy resin in the prepreg from the viewpoint of heat resistance and mechanical property. If it is less than 0.6 times, the resulting cured product will fail to have a sufficiently high cross-linking density, leading to a lack of elastic modulus and heat resistance, and the resulting carbon fiber reinforced material will not have good static strength characteristics in some cases. If it is more than 1.2 times, the resulting cured material will have an excessively high cross-linking density, which leads to a lack of plastic deformation capacity, and the resulting carbon fiber composite material will possibly be poor in impact resistance.

In addition to the component [C] in the prepreg according to the present invention, an accelerator or a polymerization initiator that is activated under visible light or ultraviolet light may be added unless it impairs the heat resistance or heat stability of the epoxy resin composition. Examples of such an accelerator include tertiary amine, Lewis acid complex, onium salt, imidazole compound, urea compounds, hydrazide compound, and sulfonium salt. The contents of the accelerator and polymerization initiator have to be adjusted appropriately according to the types used, but they are preferably 10 parts by mass or less, preferably 5 parts by mass or less, relative to the total quantity, which accounts for 100 parts by mass, of the epoxy resin. The contents of an accelerator controlled in this range is preferable because uneven temperature distribution will not occur easily during the molding of a carbon fiber reinforced material in the case where the contents of the accelerator and polymerization initiator contained are in the above range.

It is preferable that the thermoplastic resin used as the component [D] is soluble in the epoxy resin used as the component [B]. It may be a thermoplastic resin having a hydrogen bonding functional group because it can be expected to have the effect of improving the adhesiveness between the resin and carbon fiber. Examples of such a hydrogen bonding functional group include alcoholic hydroxyl groups, amide bonds, sulfonyl groups, and carboxyl groups.

The expression "being soluble in an epoxy resin" as used herein means that there exists a temperature region where a homogeneous phase is formed as a result of mixing the thermoplastic resin [D] with an epoxy resin and subsequently heating and stirring them. Here, the expression "forming a homogeneous phase" means that there is a state where phase separation is not found by visual observation. As long as a homogeneous phase can be formed in a particular temperature range, separation may occur in other temperature regions, at 23° C. for example. Dissolution may be confirmed by the following method. Specifically, powder of the thermoplastic resin [D] is mixed with an epoxy resin and maintained for several hours, for example 2 hours, at a constant temperature that is lower than the glass transition temperature of the thermoplastic resin [D] while measuring the viscosity change, and it can be decided that the thermoplastic resin [D] is dissolvable in the epoxy resin if the measured viscosity is larger by 5% or more than the viscosity of the epoxy resin alone heated at the same constant temperature.

Examples of thermoplastic resins having an alcoholic hydroxyl group include polyvinyl acetal resins such as polyvinyl formal and polyvinyl butyral as well as polyvinyl alcohol and phenoxy resins.

Examples of thermoplastic resins having an amide bond include polyamide, polyimide, polyamideimide, and polyvinyl pyrolidone.

Examples of thermoplastic resins having a sulfonyl group include polysulfone and polyethersulfone.

Examples of thermoplastic resins having a carboxyl group include polyester, polyamide, and polyamideimide. The carboxyl group may be located either or both in the main chain or/and at a chain end.

Of the above ones, polyamides, polyimides, and polysulfones may contain, in their main chains, an ether bond or a functional group such as carbonyl group. In such polyamide compounds, the nitrogen atom in the amide group may have a substituent.

Commercially available products of the thermoplastic resin that is soluble in epoxy resin resins and at the same time has a hydrogen bonding functional group include polyvinyl acetal resin products such as Mowital (registered trademark) (manufactured by Kuraray Co., Ltd.) and Vinylec (registered trademark) K (manufactured by JNC); polyvinyl alcohol resin products such as Denka Poval (registered trademark) (manufactured by Denka Company Limited); polyamide resin products such as Macromelt (registered trademark) (manufactured by Henkel Hakusui Corporation) and Amilan (registered trademark) CM4000 (manufactured by Toray Industries, Inc.); polyimide products such as Ultem (registered trademark) (manufactured by SABIC Innovative Plastics IP BV), Aurum registered trademark) (manufactured by Mitsui Chemicals, Inc.), and Vespel (registered trademark) (manufactured by DuPont); PEEK polymers such as Victrex (registered trademark) (manufactured by Victrex PLC); polysulfone products such as UDEL (registered trademark) (manufactured by Solvay Advanced Polymers, L.L.C.); and polyvinyl pyrolidone products such as Luviskol (registered trademark) (manufactured by BASF Japan).

Other preferred examples of such a thermoplastic resin soluble in epoxy resin include thermoplastic resins having a polyaryl ether skeleton. The use of such a thermoplastic resin having a polyaryl ether skeleton as the component [D] serves to control the tackiness of the resulting prepreg, control the fluidity of the matrix resin during the thermal curing of the prepreg, and provide a tough carbon fiber reinforced material without impairing the heat resistance or elastic modulus.

Examples of a thermoplastic resin having a polyaryl ether skeleton include polysulfone, polyphenyl sulfone, polyethersulfone, polyetherimide, polyphenylene ether, polyether ether ketone, and polyether ether sulfone, and these thermoplastic resins having polyaryl ether skeletons may be used singly or as a mixture of two or more thereof.

To ensure a high heat resistance, in particular, the thermoplastic resin having a polyaryl ether skeleton preferably has a glass transition temperature (Tg) of at least 150° C. or more, more preferably 170° C. or more. If the glass transition temperature of the thermoplastic resin having a polyaryl ether skeleton is less than 150° C., moldings produced therefrom may liable to thermal deformation in some cases.

The functional end group in the thermoplastic resin having a polyaryl ether skeleton is preferably a hydroxyl group, carboxyl group, thiol group, anhydride, etc. because they can react with a cation-polymerizable compound. Commercial products of thermoplastic resins having a polyaryl ether skeleton with a functional end group include commercial products of polyethersulfone such as Sumikaexcel (registered trademark) PES3600P, Sumikaexcel (registered trademark) PES5003P, Sumikaexcel (registered trademark) PES5200P, Sumikaexcel (registered trademark) PES7200P (all manufactured by Sumitomo Chemical Co., Ltd.), Virantage (registered trademark) VW-10200RFP, and Virantage (registered trademark) VW-10700RFP (both manufactured by Solvay Advanced Polymers, L.L.C.); copolymeric oligomers of polyethersulfone and polyether ether sulfone as described in Published Japanese Translation of PCT International Publication JP 2004-506789; and commercial products of polyetherimide such as Ultem (registered trademark) 1000, Ultem (registered trademark) 1010, and Ultem (registered trademark) 1040 (all manufactured by SABIC). An oligomer as referred to herein is a polymer composed of a finite number, commonly 10 to 100, of monomers bonded to each other.

The content of the component [D] is preferably in the range of 5 to 45 parts by mass, more preferably in the range of 10 to 40 parts by mass, and still more preferably 15 to 35 parts by mass, relative to the total quantity, which accounts for 100 parts by mass, of the epoxy resins contained in the prepreg. If the content of the thermoplastic resin is controlled in this range, it ensures a good balance between the viscosity of the epoxy resin composition containing the components [B] to [D] and the mechanical property such as toughness and elongation percentage of the carbon fiber reinforced material formed by curing the composition.

For the present invention, organic particles may be added as component [E] in addition to the components [A] to [D]. As a result of this, the prepreg according to the present invention can be cured into a carbon fiber reinforced material having a high impact resistance. The component [E] may be thermoplastic resin particles, rubber particles, etc.

Good examples of thermoplastic resin particles useful for the present invention include particles of the various thermoplastic resins listed previously to exemplify the thermoplastic resins that are intended for use after dissolution in epoxy resins. Among others, polyamide particles are particularly preferable because they are so high in toughness that can provide carbon fiber reinforced materials having high impact resistance. Of the various polyamide particle materials, polyamide 12, polyamide 6, polyamide 11, polyamide 66, polyamide 6/12 copolymer, and polyamide polymers modified with an epoxy compound into a semi IPN structure (semi IPN polyamide) as described in Example 1 of Japanese Unexamined Patent Publication (Kokai) No. HEI 01-104624 can achieve particularly large adhesive strength to epoxy resins. Here, IPN stands for interpenetrating polymer network, which is a kind of polymer blend. Cross-linked polymers are used as components of a blend and the dissimilar cross-linked polymers are partially or fully entangled to form a multiple network structure. A semi IPN has a multiple network structure formed of cross-linked and straight-chain polymers. Semi IPN thermoplastic resin particles can be produced by, for example, dissolving a thermoplastic resin and a thermosetting resin in a common solvent, mixing them uniformly, and performing reprecipitation. The use of particles of an epoxy resin and a semi IPN polyamide serves to prepare a prepreg having a high heat resistance and impact resistance. In regard to the shape of such thermoplastic resin particles, they may be spherical particles, nonspherical particles, or porous particles, of which spherical particles are preferable because they ensure high viscoelasticity by preventing deterioration in the resin flow property and also ensure high impact resistance by eliminating potential starting points of stress concentration.

If particles prepared by further adding an epoxy resin are used as the thermoplastic resin particles, it is more preferable because the adhesiveness to the epoxy resin acting as the matrix resin is improved to provide a carbon fiber reinforced material having improved impact resistance. Useful commercial products of such polyamide particles formed by further adding an epoxy resin include SP-500, SP-10, TR-1, and TR-2 (all manufactured by Toray Industries, Inc.), and Orgasol (registered trademark) 1002D, Orgasol (registered trademark) 2001UD, Orgasol (registered trademark) 2001EXD, Orgasol (registered trademark) 2002D, Orgasol (registered trademark) 3202D, Orgasol (registered trademark) 3501D, and Orgasol (registered trademark) 3502D (all manufactured by Arkema K.K.).

In regard to the shape of such thermoplastic resin particles, they may be spherical, nonspherical, porous, needle-like, whisker-like, or flaky, of which spherical particles are preferable because spherical particles do not work to reduce the epoxy resin flow property and can maintain high carbon fiber impregnating property, and the degree of delamination caused by local impact is further reduced in drop impact (or local impact) test so that, in the case where a stress is applied to the carbon fiber reinforced material after undergoing the impact, there will be a decreased number of delamination parts resulting from the local impact and acting as starting points of destruction attributed to stress concentration, thereby making it possible to obtain a carbon fiber reinforced material having high impact resistance.

Furthermore, there are some thermoplastic resin particles that have a higher modification effect because they are not dissolved in the matrix resin during the curing step. The feature that they are not dissolved during the curing step is also effective for maintaining fluidity of the resin during the curing step and improving the impregnating property.

The rubber particles to use for the present invention may be of a generally known natural rubber or synthetic rubber. In particular, crosslinked rubber particles that are insoluble in thermosetting resins are preferred. If they are insoluble in the thermosetting resin used, the material obtained after curing will have an equivalent degree of heat resistance compared to cured products of the thermosetting resin free of the particles. Furthermore, changes in morphology will not occur depending on the difference in the type or curing conditions of the thermosetting resin and therefore, the cured thermosetting resin will have stable physical property such as toughness. Useful crosslinked rubber particles include, for example, particles of a copolymer with one or a plurality of unsaturated compounds and particles produced through copolymerization between one or a plurality of unsaturated compounds and crosslinkable monomers.

Examples of such unsaturated compounds include aliphatic olefins such as ethylene and propylene; aromatic vinyl compounds such as styrene and methyl styrene; conjugated diene compounds such as butadiene, dimethyl butadiene, isoprene, and chloroprene; unsaturated carboxylates such as methyl acrylate, propyl acrylate, butyl acrylate, methyl methacrylate, propyl methacrylate, and butyl methacrylate; and vinyl cyanides such as acrylonitrile. Furthermore, it may also be effective to use a carboxyl group, epoxy group, hydroxyl group, epoxy resin (amino group, amide group) or a compound having a functional group that is reactive with the curing agent. Useful ones include acrylic acid, glycidylmethacrylate, vinyl phenol, vinyl aniline, and acrylamide.

Useful examples of such crosslinkable monomers include compounds in the form of divinylbenzene, diallylphthalate, ethylene glycol dimethacrylate, etc., having a plurality of polymerizable double bonds in one molecule.

These particles can be produced by various generally known conventional polymerization methods including, for example, emulsion polymerization and suspension polymerization. A typical emulsion polymerization process includes a step for emulsion polymerization of an unsaturated compound, crosslinkable monomers, etc., in the presence of a radical polymerization initiator such as peroxide, a molecular weight adjustor such as mercaptan and halogenated hydrocarbon, and an emulsifier, a step for adding a reaction terminator to stop the polymerization reaction after reaching a predetermined degree of polymerization conversion, and a subsequent step for water vapor distillation to remove unreacted monomers out of the polymerization system, thereby providing a latex of a copolymer. Water is removed from such a latex obtained by emulsion polymerization to provide crosslinked rubber particles.

Examples of such crosslinked rubber particles include crosslinked acrylonitrile butadiene rubber particles, crosslinked styrene butadiene rubber particles, acrylic rubber particles, and core shell rubber particles. Core shell rubber particles are in the form of spherical polymer particles in which the central part and the surface part are of different polymers and may have a simple two-phase structure consisting of a core phase and a single shell phase or a multiple layered structure (multiple core shell rubber particles) having a plurality of shell phases such as, for example, a soft core (located innermost), hard shell, soft shell, and hard shell. Here, a soft phase means a phase of the aforementioned rubber whereas a hard one means a phase of a resin other than the rubber.

Specific examples of such crosslinked rubber particles include commercial products of crosslinked acrylonitrile butadiene rubber (NBR) particles such as XER-91 (manufactured by JSR Corporation) and DuoMod (registered trademark) DP5045 (manufactured by Zeon Corporation). For crosslinked styrene butadiene rubber (SBR) particles, specific examples include XSK-500 (manufactured by JSR Corporation). Specific examples for acrylic rubber particles include Metabrane (registered trademark) W300A and Metabrane (registered trademark) W450A (both manufactured by Mitsubishi Rayon Co., Ltd.), and specific examples for core shell rubber particles include Stafiloid AC3832 and Stafiloid AC3816N (both manufactured by Ganz Chemical Co., Ltd.), Metabrane (registered trademark) KW-4426 (manufactured by Mitsubishi Rayon Co., Ltd.), PARALOID (registered trademark) EXL-2611, PARALOID (registered trademark) EXL-3387, PARALOID (registered trademark) EXL-2655, and PARALOID (registered trademark) EXL-2314 (all manufactured by Rohm and Haas Company), and Stafiloid AC-3355, Stafiloid TR-2105, Stafiloid TR-2102, Stafiloid TR-2122, Stafiloid IM-101, Stafiloid IM-203, Stafiloid IM-301, and Stafiloid IM-401 (all manufactured by Ganz Chemical Co., Ltd.). These crosslinked rubber particles may be of a single material or a combination of particles of two or more materials.

To make a particular interlaminar resin layer tougher selectively in a carbon fiber reinforced material obtained by curing a prepreg according to the present invention, it is necessary for the organic particles of the component [E] to remain in the interlaminar resin layer, and for this, the component [E] preferably has a number average particle diameter in the range of 5 to 50 µm, more preferably in the range of 7 to 40 µm, and still more preferably in the range of 10 to 30 µm. If the number average particle diameter is controlled at 5 µm or more, the component [E] will not enter into bundles of carbon fibers of the component [A] and can remain in the interlaminar resin layer in the resulting carbon fiber reinforced material. If the number average particle diameter is controlled at 50 µm or less, on the other hand, the matrix resin layer at the prepreg surface will have an appropriate thickness, thereby allowing the carbon fibers of the component [A] in the resulting carbon fiber reinforced material to have an appropriate volume content. Here, the value of number average particle diameter to use herein is determined by observing the component [E] at a magnification of ×200 or more using a laser microscope (ultra-deep color 3D profile measuring microscope (VK-9510, manufactured by Keyence Corporation)), selecting 100 particles at random, measuring the diameter of the circumscribed circle about each particle to represent its particle size, and calculating the average.

The epoxy resin composition in a prepreg according to the present invention may contain a coupling agent, thermosetting resin particles, or inorganic fillers such as silica gel, carbon black, clay, carbon nanotube, carbon particles, and metal powder, unless they impair the advantageous effect of the invention. Examples of carbon black include channel black, thermal black, furnace black, and ketjen black.

For the present invention, the preliminary reaction product as a reaction product of the component [B] and the component [C] (hereinafter simply referred to as preliminary reaction product of [B] and [C]) means a polymer, i.e. a dimmer or larger compound, formed through reaction and chemical bonding between glycidyl groups in the epoxy resin of the component [B] and active groups in the curing agent of the component [C], and it should be soluble in the epoxy resin of [B].

The preferable range of the molecular weight of the polymer depends on its structure, but commonly a weight-average molecular weight of 10,000 or less is preferable from the viewpoint of the speed of dissolution in an epoxy resin. It is more preferably 5,000 or less, and still more preferably 2,000 or less.

For the preliminary reaction product of [B] and [C], the expression "being soluble in the epoxy resin" as used herein means that there exists a temperature region where a homogeneous phase is formed as a result of mixing the preliminary reaction product with an epoxy resin and subsequently heating and stirring them. Here, the expression "forming a homogeneous phase" means that there is a state where phase separation is not found by visual observation. As long as a homogeneous phase can be formed in a particular temperature range, separation may occur in other temperature regions, at 23° C. for example. Dissolution may be confirmed by the following method. Specifically, the preliminary reaction product is mixed in the epoxy resin at 80° C. while measuring the changes in viscosity, and it can be decided that the preliminary reaction product is soluble in the epoxy resin if the measured viscosity becomes larger by 5% or more than the viscosity of the epoxy resin alone.

There are some methods to add an preliminary reaction product of [B] and [C] to a prepreg, including a method in which a prepreg precursor containing the components [A] to [D] (which may also contain [E]) is subjected to heat-treatment or energy irradiation using microwave, visible light, infrared light, ultraviolet light, electron beam, or radiation to form a preliminary reaction product in the prepreg, a method in which an epoxy resin composition containing [B] to [D] (which may also contain [E]) is subjected to heat-treatment or energy irradiation to form a preliminary reaction product in the epoxy resin composition, followed by producing a prepreg from the epoxy resin composition, and a method in which [B] and [C] are preliminarily cured by heat-treatment or energy irradiation and an epoxy resin composition containing them (which may also contain [D] and/or [E]) is added to an epoxy resin composition containing [B] to [D] (which may also contain [E]), followed by producing a prepreg from the epoxy resin composition.

There are no specific limitations on the method to use for the above heat-treatment as long as the glycidyl group in the epoxy resin of the component [B] reacts with the active group in the curing agent of the component [C] to undergo chemical bonding. Examples include a method in which the prepreg precursor or the epoxy resin composition is heated by applying hot air, a method in which a heating roller or a heating plate is pressed to the prepreg precursor or the epoxy resin composition to heat them, a method in which infrared ray or microwave is applied to the prepreg precursor or the epoxy resin composition to heat them. The application of hot air for heating is preferable because of easy control of the temperature, the use of a noncontact technique to permit a small likelihood of deterioration in the quality of the prepreg precursor, and capability of treating a large quantity of the prepreg precursor or the epoxy resin composition at a time.

Good methods for applying hot air include leaving a rolled prepreg precursor or epoxy resin composition in a heated oven with explosion vent. In the case where the prepreg precursor or the epoxy resin composition is in a frozen or refrigerated state before the heat-treatment, it is preferable to put it in a hermetically sealed bag etc., leave it in a room at 23° C. and 50% RH to avoid condensation, take it out of the bag etc. after the temperature returns to room temperature, and leave it in an oven with explosion vent. Combined use of energy ray is also preferred in order to produce a preliminary reaction product in a limited portion.

The existence of a preliminary reaction product in a prepreg can be determined by performing high performance liquid chromatography (HPLC) to compare chromatograms of extracts from a prepreg specimen observed before and after the heat-treatment and examining if the peaks derived from the preliminary reaction product show increases in peak area. Here, in the case where the prepreg does not contain a preliminary reaction product before the heat-treatment, it can be determined by examining if new peaks appear.

To prepare a specimen for HPLC measurement, the epoxy resin composition is extracted with acetonitrile from a predetermined quantity of the prepreg. If extraction with acetonitrile is impossible, tetrahydrofuran is used, and if extraction is still impossible, N-methyl-2-pyrrolidone is used.

Acetonitrile and water are used as eluent for HPLC measurement. If measurement is impossible when acetonitrile and water are used as eluent for HPLC, tetrahydrofuran and water are used, and if measurement is still impossible, N-methyl-2-pyrrolidone and water are used.

Regarding the detector to use for HPLC, an appropriate one may be selected from generally known detectors including ultraviolet-visible spectroscopy (UV/Vis) detector, fluorescent detector, differential refraction (RI) detector, and evaporative light scattering detector.

The quantity of the preliminary reaction product required to achieve a particular value of G' for the present invention depends on the components of the epoxy resin composition and therefore, may be adjusted appropriately.

To determine the mass ratio among the epoxy resin components of the component [B] in a prepreg that includes a preliminary reaction product, the epoxy resin composition is extracted with deuterated dimethyl formamide from a predetermined quantity of the prepreg to prepare a specimen and subjected to 1H-NMR measurement.

If measurement is impossible with deuterated dimethyl formamide, deuterated tetrahydrofuran is used, and if measurement is still impossible, deuterated hexafluoro-2-propanol is used to performed the measurement.

If it is difficult to calculate the mass ratio from 1H-NMR measurements alone, generally known analysis methods such as gas chromatography and gas chromatography-mass spectroscopy analysis may be used appropriately in combination.

If the tackiness of the prepreg is sufficiently reduced, the adhesion of the epoxy resin composition in the prepreg to the guide roll will be sufficiently improved and at the same time will ensure high drapability. To realize this effect, at least one surface resin in the prepreg according to the present invention should have a G' value in the range of $1.0 \times 10^3$ to $2.0 \times 10^8$ Pa as measured at a temperature of 40° C. and an angular frequency in the range of 0.06 to 314 rad/s. It is preferably in the range of $2.0 \times 10^3$ to $2.0 \times 10^7$ Pa, and more preferably in the range of $4.0 \times 10^3$ to $4.0 \times 10^6$ Pa. If the G' value is smaller than $1.0 \times 10^3$ Pa, there will be a larger deposit of the epoxy resin composition on the guide roll when performing the AFP method, leading to a high cleaning frequency and a decreased productivity and in addition, an excessive tackiness will occur due to a low G' value to cause a deterioration in resticking work efficiency and sinking of the resin, leading to a shortening of the period in which a required tackiness is maintained (occasionally referred to as tackiness life). If it is larger than $2.0 \times 10^8$ Pa, resin powder will occur on the surface of the slit tape as it suffers from abrasion on the guide roll and cleaning will be necessary to remove the resin powder that comes off, thereby causing not only a decrease in productivity, but also a deterioration in drapability and a decrease in handleability.

For the present invention, the term "surface resin" refers to the epoxy resin composition present in the region extending from the prepreg surface to a depth equal to 20% of the thickness of the prepreg.

The G' value of a surface resin in a prepreg as measured at a temperature of 40° C. and an angular frequency in the range of 0.06 to 314 rad/s as referred to herein is determined by taking measurements using a dynamic viscoelasticity measuring apparatus (for example ARES, manufactured by TA Instruments) equipped with parallel plates under the conditions of a measuring temperature of 40° C., a parallel plate gap of 1 mm, a strain of 0.5%, and an angular frequency in the range of 0.06 rad/s to 314 rad/s to give a G' curve and reading G' values at different frequencies.

In the case where only one surface of the prepreg comes in contact with the guide roll during the automatic lamination step performed by the AFP method, at least the surface resin at that surface should meet the requirements for G' to allow the prepreg to have required processability and handleability, whereas in the case where both surfaces come in contact with the guide roll, it is preferable for the two surface resins located at both surfaces to meet the requirements for G'.

Simultaneous achievement of both required processability and handleability can be realized more easily when one surface and the other surface of the prepreg differ in the storage elastic modulus G' of the prepreg surface resin measured at a temperature of 40° C. and an angular frequency in the range of 0.06 to 314 rad/s. If the two surfaces have nearly the same degree of drapability, the prepreg can have higher processability when the prepreg surface resins at the surfaces have different G' values than in the case where they have the same G' value.

When only one of the surface resins of the prepreg meets the requirements for G' to allow the prepreg to have both required processability and handleability, the unwinding property of the slit tape can be improved by attaching a cover film to the other surface.

For the prepreg according to the present invention, it is preferable that the epoxy resin composition, that is, the remainder of the prepreg deprived of the component [A], has a glass transition temperature in the range of −5° C. to 20° C. as measured by differential scanning calorimetry (DSC). It is more preferably in the range of 5° C. to 15° C., still more preferably in the range of 7° C. to 13° C. If the glass transition temperature is in the range, it will be easier to meet the requirements for G' to allow the prepreg to have both required processability and handleability.

Here, to determine the glass transition temperature as referred to herein, a DSC curve is obtained by placing a specimen in a nitrogen atmosphere in a DSC apparatus (for example DSC Q-2000, manufactured by TA Instruments), maintaining it at −50° C. for 1 minute, then heating it once over the temperature range up to 300° C. under the conditions of an average temperature ramp rate of 5° C./min, a modulation cycle of 40 seconds, and a modulation amplitude of ±0.5° C., and according to JIS-K7121 (1987), straight lines were extended from the baseline toward the low temperature side and the high temperature side, followed by determining the temperature at the point where the straight line that is equidistant in the vertical axis direction from the aforementioned straight lines and the step-like portion of the glass transition curve intersect each other.

Here, to draw a DSC curve, measurements taken by differential scanning calorimetry are plotted on a graph in which the vertical axis represents the difference between the heat energy inputs required by a specimen and a reference in a unit period of time when they are maintained at the same temperature whereas the horizontal axis represents the temperature.

For the prepreg according to the present invention, the degree of conversion of the epoxy resin composition, that is, the remainder of the prepreg deprived of the component [A], is preferably 20% or less. It is more preferably 16% or less, and still more preferably 12% or less. Here, the lower limit is preferably 1% or more. It is more preferably 2 or more, and still more preferably 3% or more. A degree of conversion in this range is preferable because it makes it easier to meet the requirements for G' to allow the prepreg to have both required processability and handleability, and sufficiently large adhesiveness between laminated prepreg layers will be achieved, thereby reducing the void generation that can result from air captured between prepreg layers, in the carbon fiber reinforced material obtained finally.

Here, the degree of conversion of an epoxy resin composition as referred to herein is calculated as described below. First, prepregs are heated at 100° C. for 1 hour, 2 hours, or 3 hours. Then, for these prepregs, the mass ratio W (preliminary reaction product/unreacted epoxy resin composition) between the preliminary reaction product and the unreacted epoxy resin composition is calculated by a generally known analysis method. Subsequently, from each heated prepreg, a DSC curve is obtained by placing it in a nitrogen atmosphere in a DSC apparatus, maintaining it at 30° C. for 1 minute, then heating it once over the temperature range up to 350° C. under the conditions of an average temperature ramp rate of 5° C./min, a modulation cycle of 40 seconds, and a modulation amplitude of ±0.5° C., and the exothermic peak is integrated to calculate the total calorific value per unit mass of each prepreg, which is defined as QC. Then, a graph is plotted representing W on the X axis and QC on the Y axis and the intercept of the approximate straight line is defined as QB. Subsequently, from an unheated prepreg, a DSC curve is obtained by placing it in a nitrogen atmosphere in a DSC apparatus, maintaining it at 30° C. for 1 minute, then heating it once over the temperature range up to 350° C. under the conditions of an average temperature ramp rate of 5° C./min, a modulation cycle of 40 seconds, and a modulation amplitude of ±0.5° C., and the exothermic peak is integrated to calculate the total calorific value per unit mass of each prepreg, which is defined as QA, followed by calculating the degree of conversion (%) of the epoxy resin composition as (QB−QA)/QB×100.

The generally known analysis methods useful for calculating the mass ratio W include HPLC and thermal decomposition gas chromatography-mass spectrometry.

For example, prepregs are heated at 100° C. for 1 hour, 2 hours, or 3 hours and treated with acetonitrile to extract the epoxy resin composition to provide specimens for measurement, which were subjected to HPLC using acetonitrile and water as eluent to separate the unreacted epoxy resin composition and the preliminary reaction product, followed by calculating the mass ratio W (preliminary reaction product/ unreacted epoxy resin composition) between the preliminary reaction product and the unreacted epoxy resin composition for each prepreg.

To distinguish the peak of the preliminary reaction product, the prepreg used above for specimen preparation is heated at 100° C. for 1 hour and the prepreg is treated with acetonitrile to extract the epoxy resin composition to provide a specimen for measurement, which is then subjected to HPLC measurement, followed by making a comparison between the chromatogram obtained above and a chromatogram of an extract taken from the original prepreg to identify an additional peak.

If extraction with acetonitrile is impossible, tetrahydrofuran is used, and if extraction is still impossible, N-methyl-2-pyrrolidone is used.

If measurement is impossible when acetonitrile and water are used as eluent for HPLC, tetrahydrofuran and water are used, and if measurement is still impossible, N-methyl-2-pyrrolidone and water are used.

Regarding the detector to use for HPLC, an appropriate one may be selected from generally known detectors including ultraviolet-visible spectroscopy (UV/Vis) detector, fluorescent detector, differential refraction (RI) detector, and evaporative light scattering detector.

The prepreg and the prepreg precursor according to the present invention are composites of an epoxy resin composition and carbon fibers. The prepreg and the prepreg precursor according to the present invention are produced by the hot-melt process to ensure the development of the advantageous effect of the invention. The hot-melt process is a solvent-free technique designed for the impregnation of carbon fibers with an epoxy resin composition that is heated beforehand to decrease its viscosity. The hot-melt process can be carried out by some different procedures including a procedure in which a matrix resin heated beforehand to decrease the viscosity is used for direct impregnation of carbon fibers and a procedure in which release paper sheets laid with resin film are prepared by coating release paper sheets with a matrix resin and then used to sandwich a carbon fiber sheet, followed by applying heat and pressure to ensure the impregnation of the carbon fiber sheet with the matrix resin. The above procedures are generally intended to provide sheet-like prepregs and prepreg precursors, but a carbon fiber strand may be directly immersed in a resin composition having a decreased viscosity to provide tape-like or thread-like prepregs or prepreg precursors. The temperature and time for carrying out the hot-melt process may be controlled appropriately to allow the preparation of a prepreg while simultaneously performing preliminary reaction of the resin, or a prepreg precursor may be prepared without arresting the reaction of the resin, followed by performing the aforementioned treatment for preliminary reaction of a sheet-like prepreg precursor or a tape-like one intended for processing by an automatic lamination machine as described later. It is preferable that preliminary reaction is started after the preparation of a prepreg precursor from the viewpoint of permitting local control of the viscoelasticity.

For the prepreg according to the present invention, the carbon fiber sheet preferably has an areal weight of 100 to 1,000 g/m². If the areal weight of the carbon fiber sheet is less than 100 g/m², a larger number of sheets have to be stacked to ensure a required thickness when molding a carbon fiber reinforced material, possibly leading to troublesome lamination operation. If it is more than 1,000 g/m², on the other hand, the prepreg tends to be low in drapability. On the other hand, fiber mass content is preferably 40 to 90 mass %, and more preferably 50 to 80 mass %. This is preferable because void generation is depressed during molding and good mechanical property of the carbon fiber is developed. Depending on the molding process, this is also preferable because the heat generation from curing of the resin can be controlled during the molding of large-type members to permit the production of uniform moldings.

Regarding the structure of the prepreg according to the present invention, it may be either a unidirectional prepreg or a woven fabric prepreg.

The prepreg according to the present invention can be processed into a tape or a thread as it is cut to a required width by a generally known method. Such tape-like or thread-like prepregs can be applied suitable to an automatic lamination machine.

Such cutting of a prepreg can be achieved by using a generally known cutter. Examples include cemented carbide blade cutter, ultrasonic cutter, and round blade cutter.

The carbon fiber reinforced material according to the present invention can be produced by laminating sheets of the prepreg according to the present invention in an appropriate form and heating them to cure the resin. It is preferable to press them during the molding step from the viewpoint of depressing the formation of voids and obtaining uniformly cured products. Here, the application of heat and pressure can be carried out by using a generally known method such as autoclave molding, press molding, bagging molding, wrapping tape molding, and internal pressure molding.

Carbon fiber reinforced materials produced by the above molding methods preferably have glass transition temperatures in the range of 100° C. to 250° C. from the viewpoint of processability of the molded materials in post-treatment steps. In the case of aircraft members, in particular, the glass transition temperature is preferably in the range of 170° C. to 250° C. in order to permit their application to members for use at high temperatures.

EXAMPLES

The present invention will now be illustrated in detail with reference to Examples, but it should be understood that the invention is not construed as being limited thereto. Preparation and evaluation of prepreg samples in Examples were performed in an atmosphere under the conditions of a temperature of 25° C.±2° C., a relative humidity of 50%, and the use of one measurement (n=1) unless otherwise specified.

Component [A] <Carbon Fiber>
   Torayca (registered trademark) T800S-24K-10E (carbon fiber with 24,000 filaments, tensile strength of 5.9 GPa, tensile modulus of 290 GPa, and tensile elongation of 2.0%, manufactured by Toray Industries, Inc.).

Component [B] <Epoxy Resin>
[Aminophenol Epoxy Resin: Corresponding to Epoxy Resins [b1], [b3], and [b6]]
   Araldite (registered trademark) MY0600 (triglycidyl-m-aminophenol, manufactured by Huntsman Advanced Materials Gmbh, epoxy equivalent weight 105)
   jER (registered trademark) 630 (triglycidyl-p-aminophenol, manufactured by Mitsubishi Chemical Corporation, epoxy equivalent weight 100)
[Glycidyl Ether Epoxy Resin: Corresponding to Epoxy Resins [b2] and [b4]]
   jER (registered trademark) 819 (bisphenol A epoxy resin, manufactured by Mitsubishi Chemical Corporation, epoxy equivalent weight 200)
   jER (registered trademark) 825 (bisphenol A epoxy resin, manufactured by Mitsubishi Chemical Corporation, epoxy equivalent weight 175)
   jER (registered trademark) 1055 (bisphenol A epoxy resin, manufactured by Mitsubishi Chemical Corporation, epoxy equivalent weight 850)
   jER (registered trademark) 807 (bisphenol F epoxy resin, manufactured by Mitsubishi Chemical Corporation, epoxy equivalent weight 170)
[Glycidyl Amine Epoxy Resin: Corresponding to Epoxy Resins [b2] and [b6]]
   Sumiepoxy (registered trademark) ELM434 (tetraglycidyl diaminodiphenyl methane, manufactured by Sumitomo Chemical Co., Ltd., epoxy equivalent weight 120 g/eq)
[Epoxy Resin Containing One or More Ring Structures Having Four- or More-Membered Ring and at the Same Time Containing at Least One Amine Type Glycidyl Group or Ether Type Glycidyl Group Directly Connected to a Ring Structure: Corresponding to Epoxy Resins [b2] and [b5]]
   Denacol (registered trademark) EX-731 (N-glycidylphthalimide, manufactured by Nagase ChemteX Corporation)
   GAN (N-diglycidyl aniline, manufactured by Nippon Kayaku Co., Ltd.)
   TOREP (registered trademark) A-204E (diglycidyl-N-phenoxy aniline, manufactured by Toray Fine Chemicals Co., Ltd.)
[Other Epoxy Resins]
   EPICLON (registered trademark) HP-7200 (dicyclopentadiene epoxy resin, manufactured by DIC Corporation, epoxy equivalent weight 265)
   jER (registered trademark) YX4000 (biphenyl epoxy resin, manufactured by Mitsubishi Chemical Corporation, epoxy equivalent weight 186)
   EPICLON (registered trademark) HP-4032 (naphthalene epoxy resin, manufactured by DIC Corporation, epoxy equivalent weight 150)

Component [C] <Curing Agent>
   Seikacure S (4,4'-diaminodiphenyl sulfone, manufactured by Seika K.K., active hydrogen equivalent weight: 62)
   3,3'-DAS (3,3'-diaminodiphenyl sulfone, manufactured by Mitsui Fine Chemical, Inc., active hydrogen equivalent weight: 62)

Component [D] <Thermoplastic Resin>
   Sumikaexcel (registered trademark) PES5003P (hydroxyl-capped polyethersulfone, manufactured by Sumitomo Chemical Co., Ltd., Tg 225° C.)
   Virantage (registered trademark) VW-10700RP (hydroxyl-capped polyethersulfone, manufactured by Solvay Advanced Polymers, Tg 220° C.)

Component [E] <Organic Particles>
   Orgasol (registered trademark) 1002D Nat 1 (polyamide 6 particles, manufactured by Arkema, number average particle diameter 20 μm)

(1) Preparation of Epoxy Resin Composition

In a kneader, an epoxy resin for the component [B] and a thermoplastic resin for the component [D] are added according to the lists of components and proportions given in Tables 1 to 13, heated up to 160° C. while kneading, and stirred for 1 hour so that the component [D] is dissolved to provide a transparent viscous liquid. This was allowed to cool to 70° C. while kneading and then a curing agent for the component [C] was added, followed by additional kneading to provide an epoxy resin composition 1.

In the case where organic particles for the component [E] were used, the component [E] was added and kneaded before adding the component [C], and subsequently the component [C] was added, followed by kneading to provide an epoxy resin composition 2 that contained the component [E].

(2) Measurement of Storage Elastic Modulus G' of Surface Resin

The storage elastic modulus G' of a surface resin was determined by taking measurements using a dynamic viscoelasticity measuring apparatus (manufactured by TA Instruments) equipped with parallel plates with diameter of 8 mm under the conditions of a measuring temperature of 40° C., a parallel plate gap of 1 mm, a strain of 0.5%, and an angular frequency in the range of 0.06 rad/s to 314 rad/s. To show typical measurements, G' values determined at an angular frequency of 0.06 rad/s, 6.28 rad/s, or 314 rad/s are given in Tables 14 to 26.

(3) Preparation of Prepreg Precursor

For the following Examples, prepreg precursors were prepared as described below. Silicone was spread over a piece of release paper and the epoxy resin composition 1 or 2 prepared in paragraph (1) was spread uniformly on top of it to prepare a resin film 1 and a resin film 2. A layer of uniformly paralleled carbon fibers (T800S-24K-10E, manufactured by Toray Industries, Inc.) was sandwiched between two sheets of the resin film 1 and heated and pressed using press rolls to provide an impregnated first prepreg (carbon fiber mass 190 g/cm$^2$, resin content 21%) that contained carbon fibers impregnated with the epoxy resin composition 1. After the impregnation with the epoxy resin composition 1, the two pieces of release paper were removed from the impregnated first prepreg. Subsequently, the impregnated first prepreg was sandwiched between two sheets of the resin film 1 or 2 and heated and pressed using press rolls to provide a prepreg precursor (carbon fiber mass 190 g/cm$^2$, resin content 35%) impregnated with the epoxy resin composition 1 or 2.

(4) Measurement of Glass Transition Temperature of Epoxy Resin Composition in Prepreg After preparing a prepreg specimen of about 10 mg, a DSC curve was obtained by placing the specimen in a nitrogen atmosphere in a DSC apparatus (DSC Q-2000, manufactured by TA Instruments), maintaining it at −50° C. for 1 minute, then heating it once over the temperature range up to 300° C. under the conditions of an average temperature ramp rate of 5° C./min, a modulation cycle of 40 seconds, and a modulation amplitude of ±0.5° C., and according to JIS-K7121 (1987), straight lines were extended from the baseline toward the low temperature side and the high temperature side, followed by determining the temperature at the point where the straight line that is equidistant in the vertical axis direction from the aforementioned straight lines and the step-like portion of the glass transition curve intersect each other to determine the glass transition temperature.

To draw a DSC curve as referred to herein, measurements taken by differential scanning calorimetry are plotted on a graph in which the vertical axis represents the difference between the heat energy inputs required by a specimen and a reference in a unit period of time when they are maintained at the same temperature whereas the horizontal axis represents the temperature.

(5) Heat-Treatment of Prepreg Precursor

In an oven with explosion vent (SPHH-102, manufactured by Espec Corp.) having an interior temperature of 60° C., a roll of the prepreg precursor was placed and heated in an air atmosphere for a predetermined period. After the heat-treatment, the prepreg was taken out of the oven, and put in a polyethylene bag, which was hermetically sealed and left to stand in a room at 23° C. and 50% RH until it cooled to room temperature. In the case where the prepreg precursor was in a frozen or refrigerated state before the heat-treatment, it was put in a hermetically sealed bag etc., left in a room at 23° C. and 50% RH, taken out of the bag etc. after the temperature returned to room temperature, and placed in the oven.

(6) Confirmation of Existence of Preliminary Reaction Product in Prepreg

High performance liquid chromatography (HPLC, manufactured by Waters) was performed using acetonitrile and water as eluent in order to confirm the existence of a preliminary reaction product of [B] and [C] in the prepreg. A prepreg sample of a predetermined quantity was treated with acetonitrile to extract the epoxy resin composition to provide a specimen for measurement, which is then subjected to measurement using a model 2695 separation module manufactured by Waters, a model 2487 UV detector manufactured by Waters, and a Nuclesoil column 4.0×250 mm manufactured by GL Sciences, Inc. under the conditions of a flow rate of 1.5 mL/min, an injection rate of 10 μL, and a detection wavelength of 230 nm. The existence of the preliminary reaction product was determined by comparing chromatograms of epoxy resin extracts observed before and after the heat-treatment and examining if the peaks derived from the preliminary reaction product showed increases in peak area.

(7) Calculation of Mass Ratio Among Constituents of Component [B] in Prepreg Including Preliminary Reaction Product A prepreg sample of a predetermined quantity was treated with deuterated dimethyl formamide to extract the epoxy resin composition to provide a specimen for measurement, which is then subjected to 1H-NMR analysis (JNM-AL400, manufactured by JEOL Ltd.) using deuterated dimethyl formamide as solvent to determine the mass ratio among the constituents of the component [B].

(8) Measurement of Degree of Conversion of Epoxy Resin Composition in Prepreg

First, prepregs or resin films were heated at 100° C. for 1 hour, 2 hours, or 3 hours. An epoxy resin composition extracted with acetonitrile from a prepreg or a resin film was used as specimen for measurement, which was subjected to HPLC (the apparatus used for evaluation in (6)) using acetonitrile and water as eluent to separate the unreacted epoxy resin composition and the preliminary reaction product, followed by calculating the mass ratio W (preliminary reaction product/unreacted epoxy resin composition) between the preliminary reaction product and the unreacted epoxy resin composition for each prepreg. Subsequently, a specimen of about 10 mg or about 5 mg was taken from a heated prepreg or resin film prepared above and a DSC curve is obtained by placing it in a nitrogen atmosphere in a DSC apparatus (the apparatus used for evaluation in (4)), maintaining it at 30° C. for 1 minute, then heating it once over the temperature range up to 350° C. under the conditions of an average temperature ramp rate of 5° C./min, a modulation cycle of 40 seconds, and a modulation amplitude of ±0.5° C., and the exothermic peak was integrated to calculate the total calorific value per unit mass of each prepreg. Then, a graph was plotted representing W on the X axis and the total calorific value per unit mass of the prepreg on the Y axis and the intercept of the approximate straight line was defined as QB. In addition, a specimen of about 10 mg or about 5 mg was taken from an unheated prepreg or resin film prepared above and a DSC curve was obtained by placing it in a nitrogen atmosphere in a DSC apparatus, maintaining it at 30° C. for 1 minute, then heating it once over the temperature range up to 350° C. under the conditions of an average temperature ramp rate of 5° C./min, a modulation cycle of 40 seconds, and a modulation amplitude of ±0.5° C., and the exothermic peak was integrated to calculate the total calorific value per unit mass of the prepreg, which was defined as QA, followed by calculating the degree of conversion (%) of the epoxy resin composition as (QB−QA)/QB×100.

(9) Measurement of Tackiness Between Prepreg and Metal (Prepreg's Dry Property Evaluation)

To determine the tackiness between prepreg and metal, a 10 mm×10 mm aluminum plate attached to the weight of a portable tackiness tester (manufactured by Imada Co., Ltd.) with a piece of double-side tape and pressed against the surface of a prepreg specimen with a load of 0.5 kg for 0.1 second, and then it was pulled up at a speed 100 mm/min while measuring the required force. The measurement was performed in an environment at a temperature of 25° C. and a humidity of 50 RH %. For dry property, a prepreg was evaluated according to the measured tackiness and rated in five stages from A to E. A specimen was rated as A when the tackiness was 0.0 N, B when it was in the range of 0.1 to 0.2 N, C when it was in the range of 0.3 to 0.4 N, D when it was in the range of 0.5 to 0.9 N, and E when it was 1.0 N or more. Thus, A means "excellent" in terms of dry property, whereas E means "poor" and the specimen was outside the allowable range in terms of dry property.

(10) Evaluation of Prepreg for Drapability

A specimen with a width of 12.7 mm and a length of 400 mm was cut out of a prepreg and one end thereof was fixed on a horizontal table in such a manner that a 200 mm end portion of the prepreg specimen protruded from the edge of the table. After leaving it to stand for 10 minutes, the deflection angle of the prepreg specimen was measured to represent its drapability. In this instance, the deflection angle means the angle between the straight line formed by extending the prepreg specimen fixed on the table in the horizontal direction and the straight line formed by connecting the free end of the prepreg specimen to the starting end of the protruded portion of the prepreg specimen. The drapability of a prepreg was evaluated according to the measured deflection angle and rated in five stages from A to E. A specimen was rated as A when the deflection angle was 31° or more, B when it was in the range of 25° to 30°, C when it was in the range of 19° to 24°, D when it was in the range of 10° to 18°, and E when it was 9° or less. Thus, A means "excellent" in terms of drapability, whereas E means "poor" and the specimen was outside the allowable range in terms of drapability.

(11) Overall Evaluation

For either dry property or drapability, a prepreg was given 5 points when rated as A, 4 points when rated as B, 3 points when rated as C, 2 points when rated as D, and 1 point when rated as E, and for overall evaluation, a prepreg was rated as A when it gains an average of 4.5 points or more over the two characteristics evaluation items, B when gaining 4 points or more, C when gaining 3.5 points or more, D when gaining 3 points or more, and E if it was rated as E for either characteristics evaluation item.

(12) Curing of Prepreg

Sheets of 100 mm×100 mm were cut out of a unidirectional prepreg and ten of them were laminated in one direction, subjected to vacuum bag molding, and cured in an autoclave for 2 hours at a temperature of 180° C. and a pressure of 6 kg/cm², thereby providing a plate with a thickness of about 2 mm of an unidirectional carbon fiber reinforced material.

(13) Glass Transition Temperature of Carbon Fiber Reinforced Material

A test piece with a length of 55 mm and a width of 12.7 mm is cut out of the plate prepared in (12) above and subjected to dynamic torsion measurement (DMA measurement) in the temperature range of 40° C. to 300° C. using a dynamic viscoelasticity measuring apparatus (ARES) under the conditions of a torsion vibration frequency of 6.28 rad/s, generated torque of $3.0 \times 10^{-4}$ to $2.0 \times 10^{-2}$ N m, and heating rate of 5.0° C./min, thereby determining the G' value in the temperature range of 50° C. to 290° C. In the resulting temperature-storage elastic modulus curve, the glass transition temperature is defined as the temperature represented by the intersection between the baseline in the lower temperature part of the curve and the largest-gradient tangent to that part of the curve where the storage elastic modulus G' sharply changes.

(14) Definition of 0° Direction of Carbon Fiber Reinforced Material

As specified in JIS K7017 (1999), the fiber direction of a unidirectional carbon fiber reinforced material is defined as its axis direction and the axis direction is defined as the 0° direction whereas the direction perpendicular to the axis is defined as the 90° direction.

(15) Measurement of 0° Tensile Strength of Carbon Fiber Reinforced Material

Sheets of a specified size were cut out of a unidirectional prepreg and six of them were laminated in one direction, subjected to vacuum bag molding, and cured in an autoclave for 2 hours at a temperature of 180° C. and a pressure of 6 kg/cm², thereby providing a unidirectional carbon fiber reinforced material (unidirectional reinforced material). A tab was bonded to this unidirectional reinforced material as specified in ASTM D3039-00 and a rectangular part with a length of 254 mm and a width of 12.7 mm was cut out to provide a test piece with its length direction being the 0° direction of the reinforced material. The resulting 0° directional tensile test piece was subjected to tensile test in a −60° C. environment according to ASTM D3039-00 using a universal testing machine (Instron (registered trademark) 5565 P8564, manufactured by Instron Japan Co., Ltd.) at a testing rate of 1.27 mm/min. Five test pieces were examined (n=5).

(16) Electron Microscopic Observation of Carbon Fiber Reinforced Material (Observation for Existence of Phase-Separated Structure)

A thin section was cut out of the carbon fiber reinforced material prepared above, stained, and observed by a transmission electron microscope (H-7100, manufactured by Hitachi, Ltd.) at an accelerating voltage 100 kV to obtain a transmission electron image of an appropriate magnification, which was then used to check for a phase-separated structure. As the stain, either $OsO_4$ or $RuO_4$ that was suitable for the resin composition was used to ensure a required contrast to permit easy morphological examination. The above-mentioned appropriate magnification means 50,000 times for a structural period of 1 nm or more and less than 10 nm, 20,000 times for a structural period of 10 nm or more and less than 100 nm, 2,000 times for a structural period of 100 nm or more and less than 1,000 nm, and 1,000 times for a structural period of 1,000 nm or more.

TABLE 1

|  |  | Example 1 | Example 2 | Example 3 | Example 4 | Example 5 | Example 6 | Example 7 | Example 8 |
|---|---|---|---|---|---|---|---|---|---|
| Epoxy resin composition | Component [B] aminophenol epoxy resin triglycidyl-m-aminophenol (Araldite ®MY600) |  |  |  |  |  |  |  |  |
|  | triglycidyl-p-aminophenol (jER ®630) | 50 | 50 | 50 | 50 | 50 | 50 | 50 | 50 |
|  | Component [B] glycidyl ether epoxy resin |  |  |  |  |  |  |  |  |
|  | bisphenol A epoxy resin (jER ®819) |  |  |  |  |  |  |  |  |
|  | bisphenol A epoxy resin (jER ®825) |  |  |  |  |  |  |  |  |
|  | bisphenol A epoxy resin (jER ®1055) |  |  |  |  |  |  |  |  |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  | bisphenol F epoxy resin (jER ®807) | 50 | 50 | 50 | 50 | 50 | 50 | 50 | 50 |
|  | Component [B] glycidyl amine epoxy resin |  |  |  |  |  |  |  |  |
|  | tetraglycidyl diaminodiphenylmethane (Sumiepoxy ®ELM434) |  |  |  |  |  |  |  |  |
|  | Component [B] epoxy resin that contains one or more ring structures having four- or more-membered ring and at the same time containing at least one amine type glycidyl group or ether type glycidyl group directly connected to a ring structure |  |  |  |  |  |  |  |  |
|  | N-glycidylphthalimide (Denacol ®EX-731) |  |  |  |  |  |  |  |  |
|  | N-diglycidyl aniline (GAN) |  |  |  |  |  |  |  |  |
|  | N,N-diglycidyl-4-phenoxy aniline (TOREP ®A-204E) |  |  |  |  |  |  |  |  |
|  | Component [B] other epoxy resin |  |  |  |  |  |  |  |  |
|  | dicyclopentadiene type epoxy (EPICLON ®HP-7200) |  |  |  |  |  |  |  |  |
|  | biphenyl type epoxy (jER ®YX4000) |  |  |  |  |  |  |  |  |
|  | naphthalene epoxy resin (EPICLON ®HP-4032) |  |  |  |  |  |  |  |  |
|  | Component [C] aromatic amine type curing agent |  |  |  |  |  |  |  |  |
|  | 4,4'-diaminodiphenyl sulfone (Seikacure S) | 35 | 35 | 35 | 35 | 35 | 35 | 35 | 35 |
|  | 3,3'-diaminodiphenyl sulfone (3,3'-DAS) |  |  |  |  |  |  |  |  |
|  | Component [D] thermoplastic resin |  |  |  |  |  |  |  |  |
|  | polyethersulfone (Sumikaexcel ®PES5003P) |  |  |  |  |  |  |  |  |
|  | polyethersulfone (Virantage ®VW-10700RP) | 35 | 35 | 35 | 35 | 35 | 35 | 35 | 35 |
|  | Component [E] organic particles |  |  |  |  |  |  |  |  |
|  | polyamide 6 particles (Orgasol ® 1002D Nat 1) | 25 | 25 | 25 | 25 | 25 | 25 | 25 | 25 |
| Heat treatment time (hours) |  | 60 | 90 | 120 | 145 | 170 | only one side 60 | only one side 90 | one side 90 opposite side 60 |

TABLE 2

|  |  | Example 9 | Example 10 | Example 11 | Example 12 | Example 13 |
|---|---|---|---|---|---|---|
| Epoxy resin composition | Component [B] aminophenol epoxy resin |  |  |  |  |  |
|  | triglycidyl-m-aminophenol (Araldite ®MY600) |  |  |  |  |  |
|  | triglycidyl-p-aminophenol (jER ®630) | 10 | 10 | 10 | 50 | 50 |
|  | Component [B] glycidyl ether epoxy resin |  |  |  |  |  |
|  | bisphenol A epoxy resin (jER ®819) |  |  |  |  |  |
|  | bisphenol A epoxy resin (jER ®825) |  |  |  |  |  |
|  | bisphenol A epoxy resin (jER ®1055) |  |  |  |  |  |
|  | bisphenol F epoxy resin (jER ®807) | 30 | 30 | 30 |  |  |
|  | Component [B] glycidyl amine epoxy resin |  |  |  |  |  |
|  | tetraglycidyl diaminodiphenylmethane (Sumiepoxy ®ELM434) | 60 | 60 | 60 | 50 | 50 |
|  | Component [B] epoxy resin that contains one or more ring structures having four- or more-membered ring and at the same time containing at least one amine type glycidyl group or ether type glycidyl group directly connected to a ring structure |  |  |  |  |  |
|  | N-glycidylphthalimide (Denacol ®EX-731) |  |  |  |  |  |
|  | N-diglycidyl aniline (GAN) |  |  |  |  |  |
|  | N,N-diglycidyl-4-phenoxy aniline (TOREP ®A-204E) |  |  |  |  |  |
|  | Component [B] other epoxy resin |  |  |  |  |  |
|  | dicyclopentadiene type epoxy (EPICLON ®HP-7200) |  |  |  |  |  |
|  | biphenyl type epoxy (jER ®YX4000) |  |  |  |  |  |
|  | naphthalene epoxy resin (EPICLON ®HP-4032) |  |  |  |  |  |
|  | Component [C] aromatic amine type curing agent |  |  |  |  |  |
|  | 4,4'-diaminodiphenyl sulfone (Seikacure S) | 35 | 35 | 35 | 5 | 5 |
|  | 3,3'-diaminodiphenyl sulfone (3,3'-DAS) |  |  |  | 40 | 40 |
|  | Component [D] thermoplastic resin |  |  |  |  |  |

TABLE 2-continued

|  |  |  |  |  |  |
|---|---|---|---|---|---|
| polyethersulfone (Sumikaexcel ®PES5003P) | 20 | 20 | 20 | 15 | 15 |
| polyethersulfone (Virantage ®VW-10700RP) |  |  |  |  |  |
| Component [E] organic particles |  |  |  |  |  |
| polyamide 6 particles (Orgasol ® 1002D Nat 1) | 20 | 20 | 20 |  |  |
| Heat treatment time (hours) | 60 | 90 | 120 | 90 | 120 |

|  |  | Example 14 | Example 15 | Example 16 | Example 17 |
|---|---|---|---|---|---|
| Epoxy resin composition | Component [B] aminophenol epoxy resin |  |  |  |  |
|  | triglycidyl-m-aminophenol (Araldite ®MY600) |  | 50 | 50 | 50 |
|  | triglycidyl-p-aminophenol (jER ®630) | 50 |  |  |  |
|  | Component [B] glycidyl ether epoxy resin |  |  |  |  |
|  | bisphenol A epoxy resin (jER ®819) |  |  |  |  |
|  | bisphenol A epoxy resin (jER ®825) |  | 50 | 50 | 50 |
|  | bisphenol A epoxy resin (jER ®1055) |  |  |  |  |
|  | bisphenol F epoxy resin (jER ®807) |  |  |  |  |
|  | Component [B] glycidyl amine epoxy resin |  |  |  |  |
|  | tetraglycidyl diaminodiphenylmethane (Sumiepoxy ®ELM434) | 50 |  |  |  |
|  | Component [B] epoxy resin that contains one or more ring structures having four- or more-membered ring and at the same time containing at least one amine type glycidyl group or ether type glycidyl group directly connected to a ring structure |  |  |  |  |
|  | N-glycidylphthalimide (Denacol ®EX-731) |  |  |  |  |
|  | N-diglycidyl aniline (GAN) |  |  |  |  |
|  | N,N-diglycidyl-4-phenoxy aniline (TOREP ®A-204E) |  |  |  |  |
|  | Component [B] other epoxy resin |  |  |  |  |
|  | dicyclopentadiene type epoxy (EPICLON ®HP-7200) |  |  |  |  |
|  | biphenyl type epoxy (jER ®YX4000) |  |  |  |  |
|  | naphthalene epoxy resin (EPICLON ®HP-4032) |  |  |  |  |
|  | Component [C] aromatic amine type curing agent |  |  |  |  |
|  | 4,4'-diaminodiphenyl sulfone (Seikacure S) | 5 |  |  |  |
|  | 3,3'-diaminodiphenyl sulfone (3,3'-DAS) | 40 | 35 | 35 | 35 |
|  | Component [D] thermoplastic resin |  |  |  |  |
|  | polyethersulfone (Sumikaexcel ®PES5003P) | 15 |  |  |  |
|  | polyethersulfone (Virantage ®VW-10700RP) |  | 35 | 35 | 35 |
|  | Component [E] organic particles |  |  |  |  |
|  | polyamide 6 particles (Orgasol ® 1002D Nat 1) |  | 25 | 25 | 25 |
| Heat treatment time (hours) |  | 145 | 90 | 120 | 145 |

TABLE 3

|  |  | Example 18 | Example 19 | Example 20 | Example 21 | Example 22 | Example 23 | Example 24 | Example 25 |
|---|---|---|---|---|---|---|---|---|---|
| Epoxy resin composition | Component [B] aminophenol epoxy resin |  |  |  |  |  |  |  |  |
|  | triglycidyl-m-aminophenol (Araldite ®MY600) |  |  |  |  |  | 50 | 50 | 50 |
|  | triglycidyl-p-aminophenol (jER ®630) | 50 | 50 | 50 | 50 | 50 |  |  |  |
|  | Component [B] glycidyl ether epoxy resin |  |  |  |  |  |  |  |  |
|  | bisphenol A epoxy resin (jER ®819) |  |  |  |  |  |  |  |  |
|  | bisphenol A epoxy resin (jER ®825) |  |  |  |  |  | 50 | 50 | 50 |
|  | bisphenol A epoxy resin (jER ®1055) |  |  |  |  |  |  |  |  |
|  | bisphenol F epoxy resin (jER ®807) | 50 | 50 | 50 | 50 | 50 |  |  |  |
|  | Component [B] glycidyl amine epoxy resin |  |  |  |  |  |  |  |  |
|  | tetraglycidyl diaminodiphenylmethane (Sumiepoxy ®ELM434) |  |  |  |  |  |  |  |  |
|  | Component [B] epoxy resin that contains one or more ring structures having four- or more-membered ring and at the same time containing at least one amine type glycidyl group or ether type glycidyl group directly connected to a ring structure |  |  |  |  |  |  |  |  |
|  | N-glycidylphthalimide (Denacol ®EX-731) |  |  |  |  |  |  |  |  |
|  | N-diglycidyl aniline (GAN) |  |  |  |  |  |  |  |  |
|  | N,N-diglycidyl-4-phenoxy aniline (TOREP ®A-204E) |  |  |  |  |  |  |  |  |
|  | Component [B] other epoxy resin |  |  |  |  |  |  |  |  |

TABLE 3-continued

|  | | Example 18 | Example 19 | Example 20 | Example 21 | Example 22 | Example 23 | Example 24 | Example 25 |
|---|---|---|---|---|---|---|---|---|---|
| | dicyclopentadiene type epoxy (EPICLON ®HP-7200) | | | | | | | | |
| | biphenyl type epoxy (jER ®YX4000) | | | | | | | | |
| | naphthalene epoxy resin (EPICLON ®HP-4032) | | | | | | | | |
| | Component [C] aromatic amine type curing agent | | | | | | | | |
| | 4,4'-diaminodiphenyl sulfone (Seikacure S) | 20 | 20 | 20 | 20 | 20 | | | |
| | 3,3'-diaminodiphenyl sulfone (3,3'-DAS) | | | | | | 20 | 20 | 20 |
| | Component [D] thermoplastic resin | | | | | | | | |
| | polyethersulfone (Sumikaexcel ®PES5003P) | 20 | 20 | 20 | 20 | 20 | 20 | 20 | 20 |
| | polyethersulfone (Virantage ®VW-10700RP) | 45 | 45 | 45 | 45 | 45 | 45 | 45 | 45 |
| | Component [E] organic particles | | | | | | | | |
| | polyamide 6 particles (Orgasol ® 1002D Nat 1) | | | | | | | | |
| Heat treatment time (hours) | | 30 | 60 | 90 | 115 | 140 | 60 | 90 | 115 |

TABLE 4

|  | | Example 26 | Example 27 | Example 28 | Example 29 | Example 30 | Example 31 | Example 32 | Example 33 |
|---|---|---|---|---|---|---|---|---|---|
| Epoxy resin composition | Component [B] aminophenol epoxy resin | | | | | | | | |
| | triglycidyl-m-aminophenol (Araldite ®MY600) | | | | | | | | |
| | triglycidyl-p-aminophenol (jER ®630) | 50 | 50 | 50 | | | | | |
| | Component [B] glycidyl ether epoxy resin | | | | | | | | |
| | bisphenol A epoxy resin (jER ®819) | | | | | | | | |
| | bisphenol A epoxy resin (jER ®825) | | | | 15 | 15 | 15 | 15 | 15 |
| | bisphenol A epoxy resin (jER ®1055) | | | | | | | | |
| | bisphenol F epoxy resin (jER ®807) | 50 | 50 | 50 | | | | | |
| | Component [B] glycidyl amine epoxy resin | | | | | | | | |
| | tetraglycidyl diaminodiphenylmethane (Sumiepoxy ®ELM434) | | | | 60 | 60 | 60 | 60 | 60 |
| | Component [B] epoxy resin that contains one or more ring structures having four- or more-membered ring and at the same time containing at least one amine type glycidyl group or ether type glycidyl group directly connected to a ring structure | | | | | | | | |
| | N-glycidylphthalimide (Denacol ®EX-731) | | | | 25 | 25 | 25 | 25 | 25 |
| | N-diglycidyl aniline (GAN) | | | | | | | | |
| | N,N-diglycidyl-4-phenoxy aniline (TOREP ®A-204E) | | | | | | | | |
| | Component [B] other epoxy resin | | | | | | | | |
| | dicyclopentadiene type epoxy (EPICLON ®HP-7200) | | | | | | | | |
| | biphenyl type epoxy (jER ®YX4000) | | | | | | | | |
| | naphthalene epoxy resin (EPICLON ®HP-4032) | | | | | | | | |
| | Component [C] aromatic amine type curing agent | | | | | | | | |
| | 4,4'-diaminodiphenyl sulfone (Seikacure S) | 20 | 20 | 20 | 40 | 40 | 40 | 40 | 40 |
| | 3,3'-diaminodiphenyl sulfone (3,3'-DAS) | | | | | | | | |
| | Component [D] thermoplastic resin | | | | | | | | |
| | polyethersulfone (Sumikaexcel ®PES5003P) | 20 | 20 | 20 | 10 | 10 | 10 | 10 | 10 |
| | polyethersulfone (Virantage ®VW-10700RP) | 45 | 45 | 45 | | | | | |
| | Component [E] organic particles | | | | | | | | |
| | polyamide 6 particles (Orgasol ® 1002D Nat 1) | | | | 20 | 20 | 20 | 20 | 20 |
| Heat treatment time (hours) | | only one side 30 | only one side 60 | one side 60 opposite side 30 | 30 | 75 | 150 | only one side 30 | only one side 75 |

TABLE 5

|  | | Example 34 | Example 35 | Example 36 | Example 37 | Example 38 | Example 39 | Example 40 | Example 41 |
|---|---|---|---|---|---|---|---|---|---|
| Epoxy resin composition | Component [B] aminophenol epoxy resin | | | | | | | | |
| | triglycidyl-m-aminophenol (Araldite ®MY600) | | | | | | | | |
| | triglycidyl-p-aminophenol (jER ®630) | | | | | | | | |
| | Component [B] glycidyl ether epoxy resin | | | | | | | | |
| | bisphenol A epoxy resin (jER ®819) | | | | | | | | |

TABLE 5-continued

| | | Example 34 | Example 35 | Example 36 | Example 37 | Example 38 | Example 39 | Example 40 | Example 41 |
|---|---|---|---|---|---|---|---|---|---|
| | bisphenol A epoxy resin (jER®825) | 15 | 35 | 30 | 15 | 15 | 30 | | |
| | bisphenol A epoxy resin (jER®1055) | | | | | | | | |
| | bisphenol F epoxy resin (jER®807) | | | | | | | | |
| | Component [B] glycidyl amine epoxy resin | | | | | | | | |
| | tetraglycidyl diaminodiphenylmethane (Sumiepoxy®ELM434) | 60 | 60 | 60 | 60 | 60 | 45 | 70 | 80 |
| | Component [B] epoxy resin that contains one or more ring structures having four- or more-membered ring and at the same time containing at least one amine type glycidyl group or ether type glycidyl group directly connected to a ring structure | | | | | | | | |
| | N-glycidylphthalimide (Denacol®EX-731) | 25 | 5 | 10 | 25 | 25 | 25 | 30 | 20 |
| | N-diglycidyl aniline (GAN) | | | | | | | | |
| | N,N-diglycidyl-4-phenoxy aniline (TOREP®A-204E) | | | | | | | | |
| | Component [B] other epoxy resin | | | | | | | | |
| | dicyclopentadiene type epoxy (EPICLON®HP-7200) | | | | | | | | |
| | biphenyl type epoxy (jER®YX4000) | | | | | | | | |
| | naphthalene epoxy resin (EPICLON®HP-4032) | | | | | | | | |
| | Component [C] aromatic amine type curing agent | | | | | | | | |
| | 4,4'-diaminodiphenyl sulfone (Seikacure S) | 40 | 40 | 40 | 40 | 40 | 40 | 44 | 44 |
| | 3,3'-diaminodiphenyl sulfone (3,3'-DAS) | | | | | | | | |
| | Component [D] thermoplastic resin | | | | | | | | |
| | polyethersulfone (Sumikaexcel®PES5003P) | 10 | 10 | 10 | 15 | 20 | 10 | 10 | 10 |
| | polyethersulfone (Virantage®VW-10700RP) | | | | | | | | |
| | Component [E] organic particles | | | | | | | | |
| | polyamide 6 particles (Orgasol® 1002D Nat 1) | 20 | 20 | 20 | 20 | 20 | 20 | 20 | 20 |
| Heat treatment time (hours) | | one side 75 opposite side 30 | 75 | 75 | 75 | 75 | 75 | 75 | 75 |

TABLE 6

| | | Example 42 | Example 43 | Example 44 | EExample 45 | Example 46 | Example 47 | Example 48 | Example 49 |
|---|---|---|---|---|---|---|---|---|---|
| Epoxy resin composition | Component [B] aminophenol epoxy resin | | | | | | | | |
| | triglycidyl-m-aminophenol (Araldite®MY600) | | | | | | | | |
| | triglycidyl-p-aminophenol (jER®630) | | | | | | | | |
| | Component [B] glycidyl ether epoxy resin | | | | | | | | |
| | bisphenol A epoxy resin (jER®819) | | | | | | | | |
| | bisphenol A epoxy resin (jER®825) | 10 | 10 | 10 | 10 | 10 | 10 | 35 | 20 |
| | bisphenol A epoxy resin (jER®1055) | | | | | | | | |
| | bisphenol F epoxy resin (jER®807) | | | | | | | | |
| | Component [B] glycidyl amine epoxy resin | | | | | | | | |
| | tetraglycidyl diaminodiphenylmethane (Sumiepoxy®ELM434) | 60 | 60 | 60 | 60 | 60 | 60 | 60 | 60 |
| | Component [B] epoxy resin that contains one or more ring structures having four- or more-membered ring and at the same time containing at least one amine type glycidyl group or ether type glycidyl group directly connected to a ring structure | | | | | | | | |
| | N-glycidylphthalimide (Denacol®EX-731) | | | | | | | | |
| | N-diglycidyl aniline (GAN) | 30 | 30 | 30 | 30 | 30 | 30 | 5 | 20 |
| | N,N-diglycidyl-4-phenoxy aniline (TOREP®A-204E) | | | | | | | | |
| | Component [B] other epoxy resin | | | | | | | | |
| | dicyclopentadiene type epoxy (EPICLON®HP-7200) | | | | | | | | |
| | biphenyl type epoxy (jER®YX4000) | | | | | | | | |
| | naphthalene epoxy resin (EPICLON®HP-4032) | | | | | | | | |
| | Component [C] aromatic amine type curing agent | | | | | | | | |
| | 4,4'-diaminodiphenyl sulfone (Seikacure S) | 45 | 45 | 45 | 45 | 45 | 45 | 45 | 45 |
| | 3,3'-diaminodiphenyl sulfone (3,3'-DAS) | | | | | | | | |
| | Component [D] thermoplastic resin | | | | | | | | |

TABLE 6-continued

|  | Example 42 | Example 43 | Example 44 | EExample 45 | Example 46 | Example 47 | Example 48 | Example 49 |
|---|---|---|---|---|---|---|---|---|
| polyethersulfone (Sumikaexcel ®PES5003P) | 10 | 10 | 10 | 10 | 10 | 10 | 10 | 10 |
| polyethersulfone (Virantage ®VW-10700RP) |  |  |  |  |  |  |  |  |
| Component [E] organic particles |  |  |  |  |  |  |  |  |
| polyamide 6 particles (Orgasol ® 1002D Nat 1) | 20 | 20 | 20 | 20 | 20 | 20 | 20 | 20 |
| Heat treatment time (hours) | 30 | 75 | 150 | only one side 30 | only one side 75 | one side 75 opposite side 30 | 75 | 75 |

TABLE 7

|  |  | Example 50 | Example 51 | Example 52 | Example 53 | Example 54 | Example 55 | Example 56 | Example 57 |
|---|---|---|---|---|---|---|---|---|---|
| Epoxy resin composition | Component [B] aminophenol epoxy resin |  |  |  |  |  |  |  |  |
|  | triglycidyl-m-aminophenol (Araldite ®MY600) |  |  |  |  |  |  |  |  |
|  | triglycidyl-p-aminophenol (jER ®630) |  |  |  |  |  |  |  |  |
|  | Component [B] glycidyl ether epoxy resin |  |  |  |  |  |  |  |  |
|  | bisphenol A epoxy resin (jER ®819) |  |  |  |  |  |  |  |  |
|  | bisphenol A epoxy resin (jER ®825) | 10 | 10 | 30 |  |  |  |  |  |
|  | bisphenol A epoxy resin (jER ®1055) |  |  |  |  |  |  |  |  |
|  | bisphenol F epoxy resin (jER ®807) |  |  |  |  |  |  |  |  |
|  | Component [B] glycidyl amine epoxy resin |  |  |  |  |  |  |  |  |
|  | tetraglycidyl diaminodiphenylmethane (Sumiepoxy ®ELM434) | 60 | 60 | 40 | 60 | 80 | 60 | 60 | 60 |
|  | Component [B] epoxy resin that contains one or more ring structures having four- or more-membered ring and at the same time containing at least one amine type glycidyl group or ether type glycidyl group directly connected to a ring structure |  |  |  |  |  |  |  |  |
|  | N-glycidylphthalimide (Denacol ®EX-731) |  |  |  |  |  |  |  |  |
|  | N-diglycidyl aniline (GAN) | 30 | 30 | 30 | 40 | 20 |  |  |  |
|  | N,N-diglycidyl-4-phenoxy aniline (TOREP ®A-204E) |  |  |  |  |  | 40 | 40 | 40 |
|  | Component [B] other epoxy resin |  |  |  |  |  |  |  |  |
|  | dicyclopentadiene type epoxy (EPICLON ®HP-7200) |  |  |  |  |  |  |  |  |
|  | biphenyl type epoxy (jER ®YX4000) |  |  |  |  |  |  |  |  |
|  | naphthalene epoxy resin (EPICLON ®HP-4032) |  |  |  |  |  |  |  |  |
|  | Component [C] aromatic amine type curing agent |  |  |  |  |  |  |  |  |
|  | 4,4'-diaminodiphenyl sulfone (Seikacure S) | 45 | 45 | 38 | 50 | 50 |  |  |  |
|  | 3,3'-diaminodiphenyl sulfone (3,3'-DAS) |  |  |  |  |  | 45 | 45 | 45 |
|  | Component [D] thermoplastic resin |  |  |  |  |  |  |  |  |
|  | polyethersulfone (Sumikaexcel ®PES5003P) | 15 | 20 | 10 | 10 | 10 | 10 | 10 | 10 |
|  | polyethersulfone (Virantage ®VW-10700RP) |  |  |  |  |  |  |  |  |
|  | Component [E] organic particles |  |  |  |  |  |  |  |  |
|  | polyamide 6 particles (Orgasol ® 1002D Nat 1) | 20 | 20 | 20 | 20 | 20 | 20 | 20 | 20 |
| Heat treatment time (hours) |  | 75 | 75 | 75 | 75 | 75 | 20 | 50 | 100 |

TABLE 8

|  |  | Example 58 | Example 59 | Example 60 | Example 61 | Example 62 | Example 63 | Example 64 | Example 65 |
|---|---|---|---|---|---|---|---|---|---|
| Epoxy resin composition | Component [B] aminophenol epoxy resin |  |  |  |  |  |  |  |  |
|  | triglycidyl-m-aminophenol (Araldite ®MY600) |  |  |  |  |  |  |  |  |
|  | triglycidyl-p-aminophenol (jER ®630) |  |  |  |  |  |  |  |  |
|  | Component [B] glycidyl ether epoxy resin |  |  |  |  |  |  |  |  |
|  | bisphenol A epoxy resin (jER ®819) |  |  |  |  |  |  |  |  |
|  | bisphenol A epoxy resin (jER ®825) |  |  |  |  | 35 | 15 |  | 20 |
|  | bisphenol A epoxy resin (jER ®1055) |  |  |  |  |  |  |  |  |
|  | bisphenol F epoxy resin (jER ®807) |  |  |  |  |  |  |  |  |
|  | Component [B] glycidyl amine epoxy resin |  |  |  |  |  |  |  |  |

TABLE 8-continued

|  | Example 58 | Example 59 | Example 60 | Example 61 | Example 62 | Example 63 | Example 64 | Example 65 |
|---|---|---|---|---|---|---|---|---|
| tetraglycidyl diaminodiphenylmethane (Sumiepoxy ®ELM434) | 60 | 60 | 60 | 60 | 60 | 60 | 60 | 40 |
| Component [B] epoxy resin that contains one or more ring structures having four- or more-membered ring and at the same time containing at least one amine type glycidyl group or ether type glycidyl group directly connected to a ring structure |  |  |  |  |  |  |  |  |
| N-glycidylphthalimide (Denacol ®EX-731) |  |  |  |  |  |  |  |  |
| N-diglycidyl aniline (GAN) |  |  |  |  |  |  |  |  |
| N,N-diglycidyl-4-phenoxy aniline (TOREP ®A-204E) | 40 | 40 | 40 | 5 | 25 | 40 | 40 | 40 |
| Component [B] other epoxy resin |  |  |  |  |  |  |  |  |
| dicyclopentadiene type epoxy (EPICLON ®HP-7200) |  |  |  |  |  |  |  |  |
| biphenyl type epoxy (jER ®YX4000) |  |  |  |  |  |  |  |  |
| naphthalene epoxy resin (EPICLON ®HP-4032) |  |  |  |  |  |  |  |  |
| Component [C] aromatic amine type curing agent |  |  |  |  |  |  |  |  |
| 4,4'-diaminodiphenyl sulfone (Seikacure S) |  |  |  |  |  |  |  |  |
| 3,3'-diaminodiphenyl sulfone (3,3'-DAS) | 45 | 45 | 45 | 45 | 45 | 45 | 45 | 38 |
| Component [D] thermoplastic resin |  |  |  |  |  |  |  |  |
| polyethersulfone (Sumikaexcel ®PES5003P) | 10 | 10 | 10 | 10 | 10 | 15 | 20 | 10 |
| polyethersulfone (Virantage ®VW-10700RP) |  |  |  |  |  |  |  |  |
| Component [E] organic particles |  |  |  |  |  |  |  |  |
| polyamide 6 particles (Orgasol ® 1002D Nat 1) | 20 | 20 | 20 | 20 | 20 | 20 | 20 | 20 |
| Heat treatment time (hours) | only one side 20 | only one side 50 | one side 50 opposite side 20 | 50 | 50 | 50 | 50 | 50 |

TABLE 9

|  |  | Example 66 | Example 67 | Example 68 | Example 69 | Example 70 | Example 71 | Example 72 | Example 73 |
|---|---|---|---|---|---|---|---|---|---|
| Epoxy resin composition | Component [B] aminophenol epoxy resin |  |  |  |  |  |  |  |  |
|  | triglycidyl-m-aminophenol (Araldite ®MY600) |  |  |  |  |  |  |  |  |
|  | triglycidyl-p-aminophenol (jER ®630) |  |  |  |  |  |  |  |  |
|  | Component [B] glycidyl ether epoxy resin |  |  |  |  |  |  |  |  |
|  | bisphenol A epoxy resin (jER ®819) |  |  |  |  |  |  |  |  |
|  | bisphenol A epoxy resin (jER ®825) |  |  |  |  |  |  |  |  |
|  | bisphenol A epoxy resin (jER ®1055) |  |  |  |  |  |  |  |  |
|  | bisphenol F epoxy resin (jER ®807) |  |  |  |  |  |  |  |  |
|  | Component [B] glycidyl amine epoxy resin |  |  |  |  |  |  |  |  |
|  | tetraglycidyl diaminodiphenylmethane (Sumiepoxy ®ELM434) | 50 | 40 | 70 | 90 | 70 | 90 | 70 | 90 |
|  | Component [B] epoxy resin that contains one or more ring structures having four- or more-membered ring and at the same time containing at least one amine type glycidyl group or ether type glycidyl group directly connected to a ring structure |  |  |  |  |  |  |  |  |
|  | N-glycidylphthalimide (Denacol ®EX-731) |  |  |  |  |  |  |  |  |
|  | N-diglycidyl aniline (GAN) |  |  |  |  |  |  |  |  |
|  | N,N-diglycidyl-4-phenoxy aniline (TOREP ®A-204E) | 50 | 60 |  |  |  |  |  |  |
|  | Component [B] other epoxy resin |  |  |  |  |  |  |  |  |
|  | dicyclopentadiene type epoxy (EPICLON ®HP-7200) |  |  | 30 | 10 |  |  |  |  |
|  | biphenyl type epoxy (jER ®YX4000) |  |  |  |  | 30 | 10 |  |  |
|  | naphthalene epoxy resin (EPICLON ®HP-4032) |  |  |  |  |  |  | 30 | 10 |
|  | Component [C] aromatic amine type curing agent |  |  |  |  |  |  |  |  |
|  | 4,4'-diaminodiphenyl sulfone (Seikacure S) |  |  | 45 | 45 | 45 | 45 | 55 | 55 |
|  | 3,3'-diaminodiphenyl sulfone (3,3'-DAS) | 45 | 41 |  |  |  |  |  |  |
|  | Component [D] thermoplastic resin |  |  |  |  |  |  |  |  |
|  | polyethersulfone (Sumikaexcel ®PES5003P) | 10 | 10 |  |  |  |  |  |  |
|  | polyethersulfone (Virantage ®VW-10700RP) |  |  | 20 | 20 | 20 | 20 | 20 | 20 |
|  | Component [E] organic particles |  |  |  |  |  |  |  |  |
|  | polyamide 6 particles (Orgasol ® 1002D Nat 1) | 20 | 20 | 20 | 20 | 20 | 20 | 20 | 20 |
| Heat treatment time (hours) |  | 50 | 50 | 75 | 75 | 75 | 75 | 60 | 60 |

TABLE 10

| | | Comparative example 1 | Comparative example 2 | Comparative example 3 | Comparative example 4 | Comparative example 5 |
|---|---|---|---|---|---|---|
| Epoxy resin composition | Component [B] aminophenol epoxy resin | | | | | |
| | triglycidyl-m-aminophenol (Araldite ®MY600) | | | | | |
| | triglycidyl-p-aminophenol (jER ®630) | 50 | 50 | 10 | 10 | 50 |
| | Component [B] glycidyl ether epoxy resin | | | | | |
| | bisphenol A epoxy resin (jER ®819) | | | | | |
| | bisphenol A epoxy resin (jER ®825) | | | | | |
| | bisphenol A epoxy resin (jER ®1055) | | | | | |
| | bisphenol F epoxy resin (jER ®807) | 50 | 50 | 30 | 30 | |
| | Component [B] glycidyl amine epoxy resin | | | | | |
| | tetraglycidyl diaminodiphenylmethane (Sumiepoxy ®ELM434) | | | 60 | 60 | 50 |
| | Component [B] epoxy resin that contains one or more ring structures having four- or more-membered ring and at the same time containing at least one amine type glycidyl group or ether type glycidyl group directly connected to a ring structure | | | | | |
| | N-glycidylphthalimide (Denacol ®EX-731) | | | | | |
| | N-diglycidyl aniline (GAN) | | | | | |
| | N,N-diglycidyl-4-phenoxy aniline (TOREP ®A-204E) | | | | | |
| | Component [B] other epoxy resin | | | | | |
| | dicyclopentadiene type epoxy (EPICLON ®HP-7200) | | | | | |
| | biphenyl type epoxy (jER ®YX4000) | | | | | |
| | naphthalene epoxy resin (EPICLON ®HP-4032) | | | | | |
| | Component [C] aromatic amine type curing agent | | | | | |
| | 4,4'-diaminodiphenyl sulfone (Seikacure S) | 35 | 35 | 35 | 35 | 5 |
| | 3,3'-diaminodiphenyl sulfone (3,3'-DAS) | | | | | 40 |
| | Component [D] thermoplastic resin | | | | | |
| | polyethersulfone (Sumikaexcel ®PES5003P) | | | 20 | 20 | 15 |
| | polyethersulfone (Virantage ®VW-10700RP) | 35 | 35 | | | |
| | Component [E] organic particles | | | | | |
| | polyamide 6 particles (Orgasol ® 1002D Nat 1) | 25 | 25 | 20 | 20 | |
| Heat treatment time (hours) | | 0 | 190 | 0 | 170 | 0 |

| | | Comparative example 6 | Comparative example 7 | Comparative example 8 |
|---|---|---|---|---|
| Epoxy resin composition | Component [B] aminophenol epoxy resin | | | |
| | triglycidyl-m-aminophenol (Araldite ®MY600) | | | |
| | triglycidyl-p-aminophenol (jER ®630) | 50 | 50 | 80 |
| | Component [B] glycidyl ether epoxy resin | | | |
| | bisphenol A epoxy resin (jER ®819) | | | |
| | bisphenol A epoxy resin (jER ®825) | | | |
| | bisphenol A epoxy resin (jER ®1055) | | 50 | 20 |
| | bisphenol F epoxy resin (jER ®807) | | | |
| | Component [B] glycidyl amine epoxy resin | | | |
| | tetraglycidyl diaminodiphenylmethane (Sumiepoxy ®ELM434) | 50 | | |
| | Component [B] epoxy resin that contains one or more ring structures having four- or more-membered ring and at the same time containing at least one amine type glycidyl group or ether type glycidyl group directly connected to a ring structure | | | |
| | N-glycidylphthalimide (Denacol ®EX-731) | | | |
| | N-diglycidyl aniline (GAN) | | | |
| | N,N-diglycidyl-4-phenoxy aniline (TOREP ®A-204E) | | | |
| | Component [B] other epoxy resin | | | |
| | dicyclopentadiene type epoxy (EPICLON ®HP-7200) | | | |
| | biphenyl type epoxy (jER ®YX4000) | | | |
| | naphthalene epoxy resin (EPICLON ®HP-4032) | | | |
| | Component [C] aromatic amine type curing agent | | | |
| | 4,4'-diaminodiphenyl sulfone (Seikacure S) | 5 | 35 | 35 |
| | 3,3'-diaminodiphenyl sulfone (3,3'-DAS) | 40 | | |
| | Component [D] thermoplastic resin | | | |
| | polyethersulfone (Sumikaexcel ®PES5003P) | 15 | | |
| | polyethersulfone (Virantage ®VW-10700RP) | | 35 | 35 |
| | Component [E] organic particles | | | |
| | polyamide 6 particles (Orgasol ® 1002D Nat 1) | | 25 | 25 |
| Heat treatment time (hours) | | 190 | 0 | 0 |

TABLE 11

| | | Comparative example 9 | Comparative example 10 | Comparative example 11 | Comparative example 12 | Comparative example 13 |
|---|---|---|---|---|---|---|
| Epoxy resin composition | Component [B] aminophenol epoxy resin | | | | | |
| | triglycidyl-m-aminophenol (Araldite ®MY600) | | | | | |
| | triglycidyl-p-aminophenol (jER ®630) | 50 | 50 | 50 | 70 | |
| | Component [B] glycidyl ether epoxy resin | | | | | |

TABLE 11-continued

| | | | | | |
|---|---|---|---|---|---|
| bisphenol A epoxy resin (jER®819) | | | | | 15 |
| bisphenol A epoxy resin (jER®825) | | | 50 | 30 | |
| bisphenol A epoxy resin (jER®1055) | | | | | |
| bisphenol F epoxy resin (jER®807) | 50 | 50 | | | |
| Component [B] glycidyl amine epoxy resin | | | | | |
| tetraglycidyl diaminodiphenylmethane (Sumiepoxy®ELM434) | | | | | 60 |
| Component [B] epoxy resin that contains one or more ring structures having four- or more-membered ring and at the same time containing at least one amine type glycidyl group or ether type glycidyl group directly connected to a ring structure | | | | | |
| N-glycidylphthalimide (Denacol®EX-731) | | | | | 25 |
| N-diglycidyl aniline (GAN) | | | | | |
| N,N-diglycidyl-4-phenoxy aniline (TOREP®A-204E) | | | | | |
| Component [B] other epoxy resin | | | | | |
| dicyclopentadiene type epoxy (EPICLON®HP-7200) | | | | | |
| biphenyl type epoxy (jER®YX4000) | | | | | |
| naphthalene epoxy resin (EPICLON®HP-4032) | | | | | |
| Component [C] aromatic amine type curing agent | | | | | |
| 4,4'-diaminodiphenyl sulfone (Seikacure S) | 20 | 20 | 20 | 20 | 40 |
| 3,3'-diaminodiphenyl sulfone (3,3'-DAS) | | | | | |
| Component [D] thermoplastic resin | | | | | |
| polyethersulfone (Sumikaexcel®PES5003P) | 20 | 20 | 20 | 20 | 10 |
| polyethersulfone (Virantage®VW-10700RP) | 45 | 45 | 45 | 45 | |
| Component [E] organic particles | | | | | |
| polyamide 6 particles (Orgasol® 1002D Nat 1) | | | | | 20 |
| Heat treatment time (hours) | 0 | 90 | 0 | 0 | 0 |

| | | Comparative example 14 | Comparative example 15 | Comparative example 16 | Comparative example 17 |
|---|---|---|---|---|---|
| Epoxy resin composition | Component [B] aminophenol epoxy resin | | | | |
| | triglycidyl-m-aminophenol (Araldite®MY600) | | | | |
| | triglycidyl-p-aminophenol (jER®630) | | | | |
| | Component [B] glycidyl ether epoxy resin | | | | |
| | bisphenol A epoxy resin (jER®819) | | | | |
| | bisphenol A epoxy resin (jER®825) | 15 | 10 | 10 | |
| | bisphenol A epoxy resin (jER®1055) | | | | |
| | bisphenol F epoxy resin (jER®807) | | | | |
| | Component [B] glycidyl amine epoxy resin | | | | |
| | tetraglycidyl diaminodiphenylmethane (Sumiepoxy®ELM434) | 60 | 60 | 60 | 60 |
| | Component [B] epoxy resin that contains one or more ring structures having four- or more-membered ring and at the same time containing at least one amine type glycidyl group or ether type glycidyl group directly connected to a ring structure | | | | |
| | N-glycidylphthalimide (Denacol®EX-731) | 25 | | | |
| | N-diglycidyl aniline (GAN) | | 30 | 30 | |
| | N,N-diglycidyl-4-phenoxy aniline (TOREP®A-204E) | | | | 40 |
| | Component [B] other epoxy resin | | | | |
| | dicyclopentadiene type epoxy (EPICLON®HP-7200) | | | | |
| | biphenyl type epoxy (jER®YX4000) | | | | |
| | naphthalene epoxy resin (EPICLON®HP-4032) | | | | |
| | Component [C] aromatic amine type curing agent | | | | |
| | 4,4'-diaminodiphenyl sulfone (Seikacure S) | 40 | 45 | 45 | |
| | 3,3'-diaminodiphenyl sulfone (3,3'-DAS) | | | | 45 |
| | Component [D] thermoplastic resin | | | | |
| | polyethersulfone (Sumikaexcel®PES5003P) | 10 | 10 | 10 | 10 |
| | polyethersulfone (Virantage®VW-10700RP) | | | | |
| | Component [E] organic particles | | | | |
| | polyamide 6 particles (Orgasol® 1002D Nat 1) | 20 | 20 | 20 | 20 |
| Heat treatment time (hours) | | 250 | 0 | 250 | 0 |

TABLE 12

| | | Comparative example 18 | Comparative example 19 | Comparative example 20 | Comparative example 21 | Comparative example 22 |
|---|---|---|---|---|---|---|
| Epoxy resin composition | Component [B] aminophenol epoxy resin | | | | | |
| | triglycidyl-m-aminophenol (Araldite®MY600) | | | | | |
| | triglycidyl-p-aminophenol (jER®630) | | | | | |
| | Component [B] glycidyl ether epoxy resin | | | | | |
| | bisphenol A epoxy resin (jER®819) | | | | | |
| | bisphenol A epoxy resin (jER®825) | | | | | |
| | bisphenol A epoxy resin (jER®1055) | | 20 | 20 | 20 | |
| | bisphenol F epoxy resin (jER®807) | | | | | |
| | Component [B] glycidyl amine epoxy resin | | | | | |
| | tetraglycidyl diaminodiphenylmethane (Sumiepoxy®ELM434) | 60 | 60 | 60 | 60 | 70 |
| | Component [B] epoxy resin that contains one or more ring | | | | | |

TABLE 12-continued

| | | | | | |
|---|---|---|---|---|---|
| structures having four- or more-membered ring and at the same time containing at least one amine type glycidyl group or ether type glycidyl group directly connected to a ring structure | | | | | |
| N-glycidylphthalimide (Denacol ®EX-731) | | 20 | | | |
| N-diglycidyl aniline (GAN) | | | 20 | | |
| N,N-diglycidyl-4-phenoxy aniline (TOREP ®A-204E) | 40 | | | 20 | |
| Component [B] other epoxy resin | | | | | |
| dicyclopentadiene type epoxy (EPICLON ®HP-7200) | | | | | 30 |
| biphenyl type epoxy (jER ®YX4000) | | | | | |
| naphthalene epoxy resin (EPICLON ®HP-4032) | | | | | |
| Component [C] aromatic amine type curing agent | | | | | |
| 4,4'-diaminodiphenyl sulfone (Seikacure S) | | 40 | 45 | | 45 |
| 3,3'-diaminodiphenyl sulfone (3,3'-DAS) | 45 | | | 45 | |
| Component [D] thermoplastic resin | | | | | |
| polyethersulfone (Sumikaexcel ®PES5003P) | 10 | 10 | 10 | 10 | |
| polyethersulfone (Virantage ®VW-10700RP) | | | | | 20 |
| Component [E] organic particles | | | | | |
| polyamide 6 particles (Orgasol ® 1002D Nat 1) | 20 | 20 | 20 | 20 | 20 |
| Heat treatment time (hours) | 250 | 0 | 0 | 0 | 0 |

| | | Comparative example 23 | Comparative example 24 | Comparative example 25 | Comparative example 26 |
|---|---|---|---|---|---|
| Epoxy resin composition | Component [B] aminophenol epoxy resin | | | | |
| | triglycidyl-m-aminophenol (Araldite ®MY600) | | | | |
| | triglycidyl-p-aminophenol (jER ®630) | | | | |
| | Component [B] glycidyl ether epoxy resin | | | | |
| | bisphenol A epoxy resin (jER ®819) | | | | |
| | bisphenol A epoxy resin (jER ®825) | | | | |
| | bisphenol A epoxy resin (jER ®1055) | | | | |
| | bisphenol F epoxy resin (jER ®807) | | | | |
| | Component [B] glycidyl amine epoxy resin | | | | |
| | tetraglycidyl diaminodiphenylmethane (Sumiepoxy ®ELM434) | 70 | 70 | 70 | 70 |
| | Component [B] epoxy resin that contains one or more ring structures having four- or more-membered ring and at the same time containing at least one amine type glycidyl group or ether type glycidyl group directly connected to a ring structure | | | | |
| | N-glycidylphthalimide (Denacol ®EX-731) | | | | |
| | N-diglycidyl aniline (GAN) | | | | |
| | N,N-diglycidyl-4-phenoxy aniline (TOREP ®A-204E) | | | | |
| | Component [B] other epoxy resin | | | | |
| | dicyclopentadiene type epoxy (EPICLON ®HP-7200) | 30 | | | |
| | biphenyl type epoxy (jER ®YX4000) | | 30 | 30 | |
| | naphthalene epoxy resin (EPICLON ®HP-4032) | | | | 30 |
| | Component [C] aromatic amine type curing agent | | | | |
| | 4,4'-diaminodiphenyl sulfone (Seikacure S) | 45 | 45 | 45 | 55 |
| | 3,3'-diaminodiphenyl sulfone (3,3'-DAS) | | | | |
| | Component [D] thermoplastic resin | | | | |
| | polyethersulfone (Sumikaexcel ®PES5003P) | | | | |
| | polyethersulfone (Virantage ®VW-10700RP) | 20 | 20 | 20 | 20 |
| | Component [E] organic particles | | | | |
| | polyamide 6 particles (Orgasol ® 1002D Nat 1) | 20 | 20 | 20 | 20 |
| Heat treatment time (hours) | | 200 | 0 | 200 | 0 |

TABLE 13

| | | Comparative example 27 | Comparative example 28 | Comparative example 29 | Comparative example 30 | Comparative example 31 |
|---|---|---|---|---|---|---|
| Epoxy resin composition | Component [B] aminophenol epoxy resin | | | | | |
| | triglycidyl-m-aminophenol (Araldite ®MY600) | | | | | |
| | triglycidyl-p-aminophenol (jER ®630) | | | | | |
| | Component [B] glycidyl ether epoxy resin | | | | | |
| | bisphenol A epoxy resin (jER ®819) | | | | | |
| | bisphenol A epoxy resin (jER ®825) | | | | | |
| | bisphenol A epoxy resin (jER ®1055) | | 20 | 20 | 20 | 40 |
| | bisphenol F epoxy resin (jER ®807) | | | | | |
| | Component [B] glycidyl amine epoxy resin | | | | | |
| | tetraglycidyl diaminodiphenylmethane (Sumiepoxy ®ELM434) | 70 | 80 | 80 | 80 | 60 |
| | Component [B] epoxy resin that contains one or more ring structures having four- or more-membered ring and at the same time containing at least one amine type glycidyl group or ether type glycidyl group directly connected to a ring structure | | | | | |
| | N-glycidylphthalimide (Denacol ®EX-731) | | | | | |
| | N-diglycidyl aniline (GAN) | | | | | |
| | N,N-diglycidyl-4-phenoxy aniline (TOREP ®A-204E) | | | | | |
| | Component [B] other epoxy resin | | | | | |

TABLE 13-continued

|  |  |  |  |  |  |
| --- | --- | --- | --- | --- | --- |
| dicyclopentadiene type epoxy (EPICLON ®HP-7200) |  |  |  |  |  |
| biphenyl type epoxy (jER ®YX4000) |  |  |  |  |  |
| naphthalene epoxy resin (EPICLON ®HP-4032) | 30 |  |  |  |  |
| Component [C] aromatic amine type curing agent |  |  |  |  |  |
| 4,4'-diaminodiphenyl sulfone (Seikacure S) | 55 | 30 | 30 | 30 | 30 |
| 3,3'-diaminodiphenyl sulfone (3,3'-DAS) |  |  |  |  |  |
| Component [D] thermoplastic resin |  |  |  |  |  |
| polyethersulfone (Sumikaexcel ®PES5003P) |  | 14 | 11 | 16 | 14 |
| polyethersulfone (Virantage ®VW-10700RP) | 20 |  |  |  |  |
| Component [E] organic particles |  |  |  |  |  |
| polyamide 6 particles (Orgasol ® 1002D Nat 1) | 20 | 20 | 20 | 20 | 20 |
| Heat treatment time (hours) | 160 | 0 | 0 | 0 | 0 |

|  |  | Comparative example 32 | Comparative example 33 | Comparative example 34 |
| --- | --- | --- | --- | --- |
| Epoxy resin composition | Component [B] aminophenol epoxy resin |  |  |  |
|  | triglycidyl-m-aminophenol (Araldite ®MY600) |  |  |  |
|  | triglycidyl-p-aminophenol (jER ®630) |  |  |  |
|  | Component [B] glycidyl ether epoxy resin |  |  |  |
|  | bisphenol A epoxy resin (jER ®819) |  |  |  |
|  | bisphenol A epoxy resin (jER ®825) | 20 | 50 | 50 |
|  | bisphenol A epoxy resin (jER ®1055) |  |  |  |
|  | bisphenol F epoxy resin (jER ®807) |  |  |  |
|  | Component [B] glycidyl amine epoxy resin |  |  |  |
|  | tetraglycidyl diaminodiphenylmethane (Sumiepoxy ®ELM434) | 80 | 50 | 50 |
|  | Component [B] epoxy resin that contains one or more ring structures having four- or more-membered ring and at the same time containing at least one amine type glycidyl group or ether type glycidyl group directly connected to a ring structure |  |  |  |
|  | N-glycidylphthalimide (Denacol ®EX-731) |  |  |  |
|  | N-diglycidyl aniline (GAN) |  |  |  |
|  | N,N-diglycidyl-4-phenoxy aniline (TOREP ®A-204E) |  |  |  |
|  | Component [B] other epoxy resin |  |  |  |
|  | dicyclopentadiene type epoxy (EPICLON ®HP-7200) |  |  |  |
|  | biphenyl type epoxy (jER ®YX4000) |  |  |  |
|  | naphthalene epoxy resin (EPICLON ®HP-4032) |  |  |  |
|  | Component [C] aromatic amine type curing agent |  |  |  |
|  | 4,4'-diaminodiphenyl sulfone (Seikacure S) | 30 | 30 | 30 |
|  | 3,3'-diaminodiphenyl sulfone (3,3'-DAS) |  |  |  |
|  | Component [D] thermoplastic resin |  |  |  |
|  | polyethersulfone (Sumikaexcel ®PES5003P) | 14 |  |  |
|  | polyethersulfone (Virantage ®VW-10700RP) |  |  |  |
|  | Component [E] organic particles |  |  |  |
|  | polyamide 6 particles (Orgasol ® 1002D Nat 1) | 20 |  |  |
| Heat treatment time (hours) |  | 0 | 190 | 240 |

TABLE 14

|  |  |  | Example 1 | Example 2 | Example 3 | Example 4 |
| --- | --- | --- | --- | --- | --- | --- |
| Characteristics of prepreg | storage elastic modulus G' of surface resin (Pa) | 40° C., 0.06 rad/s | $2.1 \times 10^3$ | $6.7 \times 10^3$ | $1.3 \times 10^4$ | $3.3 \times 10^4$ |
|  |  | 40° C., 6.28 rad/s | $5.2 \times 10^4$ | $9.2 \times 10^4$ | $2.6 \times 10^5$ | $5.2 \times 10^5$ |
|  |  | 40° C., 314 rad/s | $1.2 \times 10^6$ | $2.0 \times 10^6$ | $5.6 \times 10^6$ | $2.4 \times 10^7$ |
|  | storage elastic modulus G' of opposite-side surface resin (Pa) | 40° C., 0.06 rad/s | same on both sides | same on both sides | same on both sides | same on both sides |
|  |  | 40° C., 6.28 rad/s |  |  |  |  |
|  |  | 40° C., 314 rad/s |  |  |  |  |
|  | glass transition temperature of prepreg (° C.) |  | 5.2 | 10.1 | 14.6 | 19.4 |
|  | degree of conversion of epoxy resin composition (%) |  | 5.7 | 7.9 | 9.7 | 11.8 |
|  | tackiness between prepreg and metal (25° C.) | tackiness value (N) | 0.2 | 0.0 | 0.0 | 0.0 |
|  |  | acceptable A B C D E rejectable | B | A | A | A |
|  | drapability (25° C.) | deflection angle | 30 | 25 | 20 | 1 |
|  |  | acceptable A B C D E rejectable | B | B | C | D |
|  | overall evaluation | acceptable A B C D E rejectable | B | A | B | C |
| Characteristics of cured product | glass transition temperature of cured product (° C.) |  | 200 | 200 | 200 | 200 |
|  | phase-separated structure |  | absent | absent | absent | absent |
|  | tensile strength (MPa) |  | — | — | — | — |

|  |  |  | Example 5 | Example 6 | Example 7 | Example 8 |
| --- | --- | --- | --- | --- | --- | --- |
| Characteristics of prepreg | storage elastic modulus G' of surface resin (Pa) | 40° C., 0.06 rad/s | $2.3 \times 10^5$ | $2.1 \times 10^3$ | $6.7 \times 10^3$ | $6.7 \times 10^3$ |
|  |  | 40° C., 6.28 rad/s | $1.2 \times 10^7$ | $5.2 \times 10^4$ | $9.2 \times 10^4$ | $9.2 \times 10^4$ |
|  |  | 40° C., 314 rad/s | $1.6 \times 10^8$ | $1.2 \times 10^6$ | $2.0 \times 10^6$ | $2.0 \times 10^6$ |

TABLE 14-continued

|  |  |  |  |  |  |  |  |
|---|---|---|---|---|---|---|---|
|  | storage elastic modulus G' of opposite-side surface resin (Pa) | 40° C., 0.06 rad/s<br>40° C., 6.28 rad/s<br>40° C., 314 rad/s | same on both sides | $2.0 \times 10^1$<br>$1.2 \times 10^3$<br>$3.5 \times 10^4$ | $2.0 \times 10^1$<br>$1.2 \times 10^3$<br>$3.5 \times 10^4$ | $2.1 \times 10^3$<br>$5.2 \times 10^4$<br>$1.2 \times 10^6$ |  |
|  | glass transition temperature of prepreg (° C.) |  |  | 28.8 | −1.4 | 1.5 | 7.5 |
|  | degree of conversion of epoxy resin composition (%) |  |  | 15.2 | 3.5 | 4.9 | 6.9 |
|  | tackiness between prepreg and metal (25° C.) | tackiness value (N)<br>acceptable A B C D E rejectable |  | 0.0<br>A | 0.2<br>B | 0.0<br>A | 0.0<br>A |
|  | drapability (25° C.) | deflection angle<br>acceptable A B C D E rejectable |  | 10<br>D | 34<br>A | 30<br>B | 25<br>B |
|  | overall evaluation | acceptable A B C D E rejectable |  | C | A | A | A |
| Characteristics of cured product | glass transition temperature of cured product (° C.)<br>phase-separated structure<br>tensile strength (MPa) |  |  | 200<br>absent<br>— | 200<br>absent<br>— | 200<br>absent<br>— | 200<br>absent<br>— |

TABLE 15

|  |  |  | Example 9 | Example 10 | Example 11 | Example 12 | Example 13 |
|---|---|---|---|---|---|---|---|
| Characteristics of prepreg | storage elastic modulus G' of surface resin (Pa) | 40° C., 0.06 rad/s<br>40° C., 6.28 rad/s<br>40° C., 314 rad/s | $7.0 \times 10^3$<br>$1.0 \times 10^5$<br>$2.3 \times 10^6$ | $1.7 \times 10^4$<br>$1.0 \times 10^5$<br>$7.0 \times 10^6$ | $2.6 \times 10^4$<br>$5.3 \times 10^5$<br>$4.1 \times 10^7$ | $6.2 \times 10^3$<br>$8.8 \times 10^4$<br>$1.6 \times 10^6$ | $8.8 \times 10^3$<br>$2.4 \times 10^5$<br>$6.8 \times 10^6$ |
|  | storage elastic modulus G' of opposite-side surface resin (Pa) | 40° C., 0.06 rad/s<br>40° C., 6.28 rad/s<br>40° C., 314 rad/s | same on both sides | same on both sides | same on both sides | same on both sides | same on both sides |
|  | glass transition temperature of prepreg (° C.) |  | 9.8 | 13.7 | 19.1 | 9.5 | 14.1 |
|  | degree of conversion of epoxy resin composition (%) |  | 5.1 | 7.4 | 10.5 | 8.5 | 10.4 |
|  | tackiness between prepreg and metal (25° C.) | tackiness value (N)<br>acceptable A B C D E rejectable | 0.0<br>A | 0.0<br>A | 0.0<br>A | 0.0<br>A | 0.0<br>A |
|  | drapability (25° C.) | deflection angle<br>acceptable A B C D E rejectable | 26<br>B | 19<br>C | 14<br>D | 25<br>B | 20<br>C |
|  | overall evaluation | acceptable A B C D E rejectable | A | B | C | A | B |
| Characteristics of cured product | glass transition temperature of cured product (° C.)<br>phase-separated structure<br>tensile strength (MPa) |  | 205<br>absent<br>— | 205<br>absent<br>— | 205<br>absent<br>— | 190<br>absent<br>— | 190<br>absent<br>— |

|  |  |  | Example 14 | Example 15 | Example 16 | Example 17 |
|---|---|---|---|---|---|---|
| Characteristics of prepreg | storage elastic modulus G' of surface resin (Pa) | 40° C., 0.06 rad/s<br>40° C., 6.28 rad/s<br>40° C., 314 rad/s | $2.3 \times 10^4$<br>$5.1 \times 10^5$<br>$3.8 \times 10^7$ | $6.1 \times 10^3$<br>$8.7 \times 10^4$<br>$1.5 \times 10^6$ | $8.0 \times 10^3$<br>$2.1 \times 10^5$<br>$5.1 \times 10^6$ | $2.8 \times 10^4$<br>$4.7 \times 10^5$<br>$2.1 \times 10^7$ |
|  | storage elastic modulus G' of opposite-side surface resin (Pa) | 40° C., 0.06 rad/s<br>40° C., 6.28 rad/s<br>40° C., 314 rad/s | same on both sides | same on both sides | same on both sides | same on both sides |
|  | glass transition temperature of prepreg (° C.) |  | 18.8 | 8.8 | 13.1 | 17.5 |
|  | degree of conversion of epoxy resin composition (%) |  | 12.1 | 7.2 | 9.3 | 11.4 |
|  | tackiness between prepreg and metal (25° C.) | tackiness value (N)<br>acceptable A B C D E rejectable | 0.0<br>A | 0.0<br>A | 0.0<br>A | 0.0<br>A |
|  | drapability (25° C.) | deflection angle<br>acceptable A B C D E rejectable | 16<br>D | 26<br>B | 21<br>C | 16<br>D |
|  | overall evaluation | acceptable A B C D E rejectable | C | A | B | C |
| Characteristics of cured product | glass transition temperature of cured product (° C.)<br>phase-separated structure<br>tensile strength (MPa) |  | 190<br>absent<br>— | 185<br>absent<br>— | 185<br>absent<br>— | 185<br>absent<br>— |

TABLE 16

|  |  |  | Example 18 | Example 19 | Example 20 | Example 21 |
|---|---|---|---|---|---|---|
| Characteristics of prepreg | storage elastic modulus G' of surface resin (Pa) | 40° C., 0.06 rad/s<br>40° C., 6.28 rad/s<br>40° C., 314 rad/s | $2.2 \times 10^3$<br>$5.4 \times 10^4$<br>$1.3 \times 10^6$ | $6.5 \times 10^3$<br>$9.1 \times 10^5$<br>$2.1 \times 10^6$ | $1.4 \times 10^4$<br>$9.4 \times 10^4$<br>$5.8 \times 10^6$ | $3.2 \times 10^4$<br>$5.3 \times 10^5$<br>$2.3 \times 10^7$ |
|  | storage elastic modulus G' of opposite-side surface resin (Pa) | 40° C., 0.06 rad/s<br>40° C., 6.28 rad/s<br>40° C., 314 rad/s | same on both sides | same on both sides | same on both sides | same on both sides |
|  | glass transition temperature of prepreg (° C.) |  | 5.3 | 9.5 | 14.4 | 19.7 |
|  | degree of conversion of epoxy resin composition (%) |  | 1.5 | 3.4 | 5.6 | 8.1 |
|  | tackiness between prepreg and | tackiness value (N) | 0.2 | 0.0 | 0.0 | 0.0 |

TABLE 16-continued

|  |  |  | Example 18 | Example 19 | Example 20 | Example 21 |
|---|---|---|---|---|---|---|
|  | metal (25° C.) | acceptable A B C D E rejectable | B | A | A | A |
|  | drapability (25° C.) | deflection angle | 31 | 25 | 20 | 15 |
|  |  | acceptable A B C D E rejectable | A | B | C | D |
|  | overall evaluation | acceptable A B C D E rejectable | B | A | B | C |
| Characteristics of cured product | glass transition temperature of cured product (° C.) |  | 205 | 205 | 205 | 205 |
|  | phase-separated structure |  | existing | existing | existing | existing |
|  | tensile strength (MPa) |  | — | — | — | — |

|  |  |  | Example 22 | Example 23 | Example 24 | Example 25 |
|---|---|---|---|---|---|---|
| Characteristics of prepreg | storage elastic modulus G' of surface resin (Pa) | 40° C., 0.06 rad/s | $2.5 \times 10^5$ | $5.5 \times 10^3$ | $9.4 \times 10^3$ | $4.2 \times 10^4$ |
|  |  | 40° C., 6.28 rad/s | $1.4 \times 10^6$ | $8.1 \times 10^5$ | $8.4 \times 10^4$ | $6.3 \times 10^5$ |
|  |  | 40° C., 314 rad/s | $1.8 \times 10^8$ | $1.1 \times 10^6$ | $4.8 \times 10^6$ | $3.3 \times 10^7$ |
|  | storage elastic modulus G' of opposite-side surface resin (Pa) | 40° C., 0.06 rad/s | same on both sides | same on both sides | same on both sides | same on both sides |
|  |  | 40° C., 6.28 rad/s |  |  |  |  |
|  |  | 40° C., 314 rad/s |  |  |  |  |
|  | glass transition temperature of prepreg (° C.) |  | 24.8 | 10.4 | 16.1 | 21.3 |
|  | degree of conversion of epoxy resin composition (%) |  | 10.4 | 3.7 | 5.8 | 8.7 |
|  | tackiness between prepreg and metal (25° C.) | tackiness value (N) | 0.0 | 0.0 | 0.0 | 0.0 |
|  |  | acceptable A B C D E rejectable | A | A | A | A |
|  | drapability (25° C.) | deflection angle | 11 | 23 | 19 | 12 |
|  |  | acceptable A B C D E rejectable | D | B | C | D |
|  | overall evaluation | acceptable A B C D E rejectable | C | A | B | C |
| Characteristics of cured product | glass transition temperature of cured product (° C.) |  | 205 | 185 | 185 | 185 |
|  | phase-separated structure |  | existing | existing | existing | existing |
|  | tensile strength (MPa) |  | — | — | — | — |

TABLE 17

|  |  |  | Example 26 | Example 27 | Example 28 | Example 29 |
|---|---|---|---|---|---|---|
| Characteristics of prepreg | storage elastic modulus G' of surface resin (Pa) | 40° C., 0.06 rad/s | $2.2 \times 10^3$ | $6.5 \times 10^3$ | $6.5 \times 10^3$ | $1.4 \times 10^3$ |
|  |  | 40° C., 6.28 rad/s | $5.4 \times 10^4$ | $9.1 \times 10^5$ | $9.1 \times 10^5$ | $1.1 \times 10^5$ |
|  |  | 40° C., 314 rad/s | $1.3 \times 10^6$ | $2.1 \times 10^6$ | $2.1 \times 10^6$ | $1.5 \times 10^6$ |
|  | storage elastic modulus G' of opposite-side surface resin (Pa) | 40° C., 0.06 rad/s | $2.0 \times 10^1$ | $2.0 \times 10^1$ | $2.2 \times 10^3$ | same on both sides |
|  |  | 40° C., 6.28 rad/s | $1.2 \times 10^3$ | $1.2 \times 10^3$ | $5.4 \times 10^4$ |  |
|  |  | 40° C., 314 rad/s | $3.3 \times 10^4$ | $3.3 \times 10^4$ | $1.3 \times 10^6$ |  |
|  | glass transition temperature of prepreg (° C.) |  | 3.9 | 6.4 | 8.5 | 5.3 |
|  | degree of conversion of epoxy resin composition (%) |  | 0.8 | 1.6 | 2.5 | 2.3 |
|  | tackiness between prepreg and metal (25° C.) | tackiness value (N) | 0.2 | 0.0 | 0.0 | 0.3 |
|  |  | acceptable A B C D E rejectable | B | A | A | C |
|  | drapability (25° C.) | deflection angle | 35 | 31 | 26 | 30 |
|  |  | acceptable A B C D E rejectable | A | A | B | B |
|  | overall evaluation | acceptable A B C D E rejectable | A | A | A | C |
| Characteristics of cured product | glass transition temperature of cured product (° C.) |  | 205 | 205 | 205 | 182 |
|  | phase-separated structure |  | existing | existing | existing | absent |
|  | tensile strength (MPa) |  | — | — | — | 2,920 |

|  |  |  | Example 30 | Example 31 | Example 32 | Example 33 |
|---|---|---|---|---|---|---|
| Characteristics of prepreg | storage elastic modulus G' of surface resin (Pa) | 40° C., 0.06 rad/s | $4.7 \times 10^3$ | $1.1 \times 10^4$ | $1.4 \times 10^3$ | $4.7 \times 10^3$ |
|  |  | 40° C., 6.28 rad/s | $2.7 \times 10^5$ | $9.0 \times 10^5$ | $1.1 \times 10^5$ | $2.7 \times 10^5$ |
|  |  | 40° C., 314 rad/s | $3.8 \times 10^6$ | $5.0 \times 10^7$ | $1.5 \times 10^6$ | $3.8 \times 10^6$ |
|  | storage elastic modulus G' of opposite-side surface resin (Pa) | 40° C., 0.06 rad/s | same on both sides | same on both sides | $4.5 \times 10^2$ | $4.5 \times 10^2$ |
|  |  | 40° C., 6.28 rad/s |  |  | $4.5 \times 10^4$ | $4.5 \times 10^4$ |
|  |  | 40° C., 314 rad/s |  |  | $5.0 \times 10^5$ | $5.0 \times 10^5$ |
|  | glass transition temperature of prepreg (° C.) |  | 10.3 | 19.7 | 3.5 | 5.8 |
|  | degree of conversion of epoxy resin composition (%) |  | 7.0 | 14.1 | 1.3 | 3.7 |
|  | tackiness between prepreg and metal (25° C.) | tackiness value (N) | 0.0 | 0.0 | 0.3 | 0.0 |
|  |  | acceptable A B C D E rejectable | A | A | C | A |
|  | drapability (25° C.) | deflection angle | 25 | 14 | 34 | 30 |
|  |  | acceptable A B C D E rejectable | B | D | A | B |
|  | overall evaluation | acceptable A B C D E rejectable | A | C | B | A |
| Characteristics of cured product | glass transition temperature of cured product (° C.) |  | 182 | 182 | 182 | 182 |
|  | phase-separated structure |  | absent | absent | absent | absent |
|  | tensile strength (MPa) |  | 2,910 | 2,930 | 2,920 | 2,910 |

TABLE 18

| | | | Example 34 | Example 35 | Example 36 | Example 37 |
|---|---|---|---|---|---|---|
| Characteristics of prepreg | storage elastic modulus G' of surface resin (Pa) | 40° C., 0.06 rad/s | $4.7 \times 10^3$ | $2.8 \times 10^3$ | $3.8 \times 10^3$ | $1.4 \times 10^4$ |
| | | 40° C., 6.28 rad/s | $2.7 \times 10^5$ | $1.6 \times 10^5$ | $2.2 \times 10^5$ | $8.1 \times 10^5$ |
| | | 40° C., 314 rad/s | $3.8 \times 10^6$ | $2.3 \times 10^6$ | $3.0 \times 10^6$ | $1.1 \times 10^7$ |
| | storage elastic modulus G' of opposite-side surface resin (Pa) | 40° C., 0.06 rad/s | $1.4 \times 10^3$ | same on both sides | same on both sides | same on both sides |
| | | 40° C., 6.28 rad/s | $1.1 \times 10^5$ | | | |
| | | 40° C., 314 rad/s | $1.5 \times 10^6$ | | | |
| | glass transition temperature of prepreg (° C.) | | 7.7 | 8.9 | 9.7 | 11.6 |
| | degree of conversion of epoxy resin composition (%) | | 4.4 | 7.3 | 7.4 | 7.1 |
| | tackiness between prepreg and metal (25° C.) | tackiness value (N) | 0.0 | 0.2 | 0.1 | 0.0 |
| | | acceptable A B C D E rejectable | A | B | B | A |
| | drapability (25° C.) | deflection angle | 25 | 25 | 25 | 24 |
| | | acceptable A B C D E rejectable | B | B | B | C |
| | overall evaluation | acceptable A B C D E rejectable | A | B | B | B |
| Characteristics of cured product | glass transition temperature of cured product (° C.) | | 182 | 198 | 191 | 182 |
| | phase-separated structure | | absent | absent | absent | absent |
| | tensile strength (MPa) | | 2,920 | 2,780 | 2,840 | 3,080 |

| | | | Example 38 | Example 39 | Example 40 | Example 41 |
|---|---|---|---|---|---|---|
| Characteristics of prepreg | storage elastic modulus G' of surface resin (Pa) | 40° C., 0.06 rad/s | $3.7 \times 10^4$ | $3.3 \times 10^3$ | $1.1 \times 10^4$ | $9.8 \times 10^3$ |
| | | 40° C., 6.28 rad/s | $2.4 \times 10^6$ | $1.6 \times 10^5$ | $7.6 \times 10^5$ | $7.2 \times 10^5$ |
| | | 40° C., 314 rad/s | $3.1 \times 10^7$ | $2.1 \times 10^6$ | $9.8 \times 10^6$ | $9.5 \times 10^6$ |
| | storage elastic modulus G' of opposite-side surface resin (Pa) | 40° C., 0.06 rad/s | same on both sides | same on both sides | same on both sides | same on both sides |
| | | 40° C., 6.28 rad/s | | | | |
| | | 40° C., 314 rad/s | | | | |
| | glass transition temperature of prepreg (° C.) | | 12.2 | 9.3 | 11.1 | 10.8 |
| | degree of conversion of epoxy resin composition (%) | | 7.0 | 7.3 | 7.2 | 7.0 |
| | tackiness between prepreg and metal (25° C.) | tackiness value (N) | 0.0 | 0.2 | 0.0 | 0.0 |
| | | acceptable A B C D E rejectable | A | B | A | A |
| | drapability (25° C.) | deflection angle | 22 | 31 | 24 | 25 |
| | | acceptable A B C D E rejectable | C | B | C | B |
| | overall evaluation | acceptable A B C D E rejectable | B | B | B | A |
| Characteristics of cured product | glass transition temperature of cured product (° C.) | | 183 | 175 | 181 | 188 |
| | phase-separated structure | | absent | absent | absent | absent |
| | tensile strength (MPa) | | 3,220 | 2,990 | 2,900 | 2,790 |

TABLE 19

| | | | Example 42 | Example 43 | Example 44 | Example 45 |
|---|---|---|---|---|---|---|
| Characteristics of prepreg | storage elastic modulus G' of surface resin (Pa) | 40° C., 0.06 rad/s | $1.0 \times 10^3$ | $3.6 \times 10^3$ | $8.4 \times 10^3$ | $1.0 \times 10^3$ |
| | | 40° C., 6.28 rad/s | $7.2 \times 10^4$ | $1.7 \times 10^5$ | $5.7 \times 10^5$ | $7.2 \times 10^4$ |
| | | 40° C., 314 rad/s | $7.0 \times 10^5$ | $1.6 \times 10^6$ | $2.3 \times 10^7$ | $7.0 \times 10^5$ |
| | storage elastic modulus G' of opposite-side surface resin (Pa) | 40° C., 0.06 rad/s | same on both sides | same on both sides | same on both sides | $3.5 \times 10^2$ |
| | | 40° C., 6.28 rad/s | | | | $3.0 \times 10^4$ |
| | | 40° C., 314 rad/s | | | | $2.4 \times 10^5$ |
| | glass transition temperature of prepreg (° C.) | | 4.2 | 9.2 | 18.9 | 3.2 |
| | degree of conversion of epoxy resin composition (%) | | 2.0 | 6.8 | 13.7 | 1.1 |
| | tackiness between prepreg and metal (25° C.) | tackiness value (N) | 0.3 | 0.0 | 0.0 | 0.3 |
| | | acceptable A B C D E rejectable | C | A | A | C |
| | drapability (25° C.) | deflection angle | 31 | 27 | 16 | 36 |
| | | acceptable A B C D E rejectable | A | B | D | A |
| | overall evaluation | acceptable A B C D E rejectable | B | A | C | B |
| Characteristics of cured product | glass transition temperature of cured product (° C.) | | 190 | 190 | 190 | 190 |
| | phase-separated structure | | absent | absent | absent | absent |
| | tensile strength (MPa) | | 2,800 | 2,820 | 2,810 | 2,810 |

| | | | Example 46 | Example 47 | Example 48 | Example 49 |
|---|---|---|---|---|---|---|
| Characteristics of prepreg | storage elastic modulus G' of surface resin (Pa) | 40° C., 0.06 rad/s | $3.6 \times 10^3$ | $3.6 \times 10^3$ | $4.8 \times 10^3$ | $4.1 \times 10^3$ |
| | | 40° C., 6.28 rad/s | $1.7 \times 10^5$ | $1.7 \times 10^5$ | $2.6 \times 10^5$ | $2.2 \times 10^5$ |
| | | 40° C., 314 rad/s | $1.6 \times 10^6$ | $1.6 \times 10^6$ | $2.3 \times 10^6$ | $2.0 \times 10^6$ |
| | storage elastic modulus G' of opposite-side surface resin (Pa) | 40° C., 0.06 rad/s | $3.5 \times 10^2$ | $1.0 \times 10^3$ | same on both sides | same on both sides |
| | | 40° C., 6.28 rad/s | $3.0 \times 10^4$ | $7.2 \times 10^4$ | | |
| | | 40° C., 314 rad/s | $2.4 \times 10^5$ | $7.0 \times 10^5$ | | |
| | glass transition temperature of prepreg (° C.) | | 5.5 | 7.5 | 9.9 | 9.3 |
| | degree of conversion of epoxy resin composition (%) | | 3.3 | 4.3 | 7.3 | 7.4 |
| | tackiness between prepreg and metal (25° C.) | tackiness value (N) | 0.0 | 0.0 | 0.0 | 0.0 |

TABLE 19-continued

|  |  |  |  |  |  |  |
|---|---|---|---|---|---|---|
|  | metal (25° C.) | acceptable A B C D E rejectable | A | A | A | A |
|  | drapability (25° C.) | deflection angle | 32 | 27 | 27 | 27 |
|  |  | acceptable A B C D E rejectable | B | B | B | B |
|  | overall evaluation | acceptable A B C D E rejectable | A | A | A | A |
| Characteristics of cured product | glass transition temperature of cured product (° C.) |  | 190 | 190 | 204 | 196 |
|  | phase-separated structure |  | absent | absent | absent | absent |
|  | tensile strength (MPa) |  | 2,820 | 2,820 | 2,670 | 2,750 |

TABLE 20

|  |  |  | Example 50 | Example 51 | Example 52 | Example 53 |
|---|---|---|---|---|---|---|
| Characteristics of prepreg | storage elastic modulus G' of surface resin (Pa) | 40° C., 0.06 rad/s | $1.1 \times 10^4$ | $2.2 \times 10^4$ | $2.6 \times 10^3$ | $9.8 \times 10^3$ |
|  |  | 40° C., 6.28 rad/s | $5.2 \times 10^5$ | $1.0 \times 10^6$ | $1.1 \times 10^5$ | $4.8 \times 10^5$ |
|  |  | 40° C., 314 rad/s | $5.1 \times 10^6$ | $1.2 \times 10^7$ | $9.0 \times 10^5$ | $4.2 \times 10^6$ |
|  | storage elastic modulus G' of opposite-side surface resin (Pa) | 40° C., 0.06 rad/s | same on both sides | same on both sides | same on both sides | same on both sides |
|  |  | 40° C., 6.28 rad/s |  |  |  |  |
|  |  | 40° C., 314 rad/s |  |  |  |  |
|  | glass transition temperature of prepreg (° C.) |  | 10.0 | 11.0 | 3.9 | 10.3 |
|  | degree of conversion of epoxy resin composition (%) |  | 7.4 | 7.5 | 7.7 | 7.6 |
|  | tackiness between prepreg and metal (25° C.) | tackiness value (N) | 0.0 | 0.0 | 0.2 | 0.0 |
|  |  | acceptable A B C D E rejectable | A | A | B | A |
|  | drapability (25° C.) | deflection angle | 27 | 24 | 33 | 24 |
|  |  | acceptable A B C D E rejectable | B | C | A | C |
|  | overall evaluation | acceptable A B C D E rejectable | A | B | B | B |
| Characteristics of cured product | glass transition temperature of cured product (° C.) |  | 190 | 190 | 178 | 188 |
|  | phase-separated structure |  | absent | absent | absent | absent |
|  | tensile strength (MPa) |  | 2,930 | 3,050 | 2,870 | 2,780 |

|  |  |  | Example 54 | Example 55 | Example 56 | Example 57 |
|---|---|---|---|---|---|---|
| Characteristics of prepreg | storage elastic modulus G' of surface resin (Pa) | 40° C., 0.06 rad/s | $1.2 \times 10^4$ | $1.2 \times 10^3$ | $4.7 \times 10^3$ | $9.2 \times 10^3$ |
|  |  | 40° C., 6.28 rad/s | $5.3 \times 10^5$ | $7.2 \times 10^4$ | $1.9 \times 10^5$ | $6.3 \times 10^5$ |
|  |  | 40° C., 314 rad/s | $4.7 \times 10^6$ | $7.0 \times 10^5$ | $2.0 \times 10^6$ | $2.6 \times 10^7$ |
|  | storage elastic modulus G' of opposite-side surface resin (Pa) | 40° C., 0.06 rad/s | same on both sides | same on both sides | same on both sides | same on both sides |
|  |  | 40° C., 6.28 rad/s |  |  |  |  |
|  |  | 40° C., 314 rad/s |  |  |  |  |
|  | glass transition temperature of prepreg (° C.) |  | 10.9 | 4.4 | 9.4 | 19.1 |
|  | degree of conversion of epoxy resin composition (%) |  | 7.8 | 2.2 | 6.9 | 13.9 |
|  | tackiness between prepreg and metal (25° C.) | tackiness value (N) | 0.0 | 0.3 | 0.0 | 0.0 |
|  |  | acceptable A B C D E rejectable | A | C | A | A |
|  | drapability (25° C.) | deflection angle | 22 | 30 | 26 | 15 |
|  |  | acceptable A B C D E rejectable | C | B | B | D |
|  | overall evaluation | acceptable A B C D E rejectable | B | C | A | C |
| Characteristics of cured product | glass transition temperature of cured product (° C.) |  | 198 | 192 | 192 | 192 |
|  | phase-separated structure |  | absent | absent | absent | absent |
|  | tensile strength (MPa) |  | 2,700 | 2,840 | 2,830 | 2,830 |

TABLE 21

|  |  |  | Example 58 | Example 59 | Example 60 | Example 61 |
|---|---|---|---|---|---|---|
| Characteristics of prepreg | storage elastic modulus G' of surface resin (Pa) | 40° C., 0.06 rad/s | $1.2 \times 10^3$ | $4.7 \times 10^3$ | $4.7 \times 10^3$ | $5.3 \times 10^3$ |
|  |  | 40° C., 6.28 rad/s | $7.2 \times 10^4$ | $1.9 \times 10^5$ | $1.9 \times 10^5$ | $2.4 \times 10^5$ |
|  |  | 40° C., 314 rad/s | $7.0 \times 10^5$ | $2.0 \times 10^6$ | $2.0 \times 10^6$ | $2.5 \times 10^6$ |
|  | storage elastic modulus G' of opposite-side surface resin (Pa) | 40° C., 0.06 rad/s | $2.3 \times 10^2$ | $2.3 \times 10^2$ | $1.2 \times 10^3$ | same on both sides |
|  |  | 40° C., 6.28 rad/s | $2.8 \times 10^4$ | $2.8 \times 10^4$ | $7.2 \times 10^4$ |  |
|  |  | 40° C., 314 rad/s | $3.2 \times 10^5$ | $3.2 \times 10^5$ | $7.0 \times 10^5$ |  |
|  | glass transition temperature of prepreg (° C.) |  | 3.3 | 5.6 | 7.6 | 10.1 |
|  | degree of conversion of epoxy resin composition (%) |  | 1.3 | 3.6 | 4.8 | 8.3 |
|  | tackiness between prepreg and metal (25° C.) | tackiness value (N) | 0.3 | 0.0 | 0.0 | 0.0 |
|  |  | acceptable A B C D E rejectable | C | A | A | A |
|  | drapability (25° C.) | deflection angle | 35 | 31 | 26 | 26 |
|  |  | acceptable A B C D E rejectable | A | B | B | B |
|  | overall evaluation | acceptable A B C D E rejectable | B | A | A | A |

TABLE 21-continued

| Characteristics of cured product | glass transition temperature of cured product (° C.) | 192 | 192 | 192 | 206 |
|---|---|---|---|---|---|
| | phase-separated structure | absent | absent | absent | absent |
| | tensile strength (MPa) | 2,840 | 2,820 | 2,830 | 2,690 |

| | | | Example 62 | Example 63 | Example 64 | Example 65 |
|---|---|---|---|---|---|---|
| Characteristics of prepreg | storage elastic modulus G' of surface resin (Pa) | 40° C., 0.06 rad/s | $5.0 \times 10^3$ | $1.4 \times 10^4$ | $2.6 \times 10^4$ | $3.1 \times 10^3$ |
| | | 40° C., 6.28 rad/s | $2.1 \times 10^5$ | $6.2 \times 10^5$ | $1.2 \times 10^6$ | $1.4 \times 10^5$ |
| | | 40° C., 314 rad/s | $2.3 \times 10^6$ | $5.9 \times 10^6$ | $1.4 \times 10^7$ | $1.1 \times 10^6$ |
| | storage elastic modulus G' of opposite-side surface resin (Pa) | 40° C., 0.06 rad/s | same on both sides | same on both sides | same on both sides | same on both sides |
| | | 40° C., 6.28 rad/s | | | | |
| | | 40° C., 314 rad/s | | | | |
| | glass transition temperature of prepreg (° C.) | | 9.6 | 10.2 | 11.3 | 4.2 |
| | degree of conversion of epoxy resin composition (%) | | 8.4 | 8.4 | 8.5 | 8.6 |
| | tackiness between prepreg and metal (25° C.) | tackiness value (N) | 0.0 | 0.0 | 0.0 | 0.2 |
| | | acceptable A B C D E rejectable | A | A | A | B |
| | drapability (25° C.) | deflection angle | 26 | 25 | 23 | 32 |
| | | acceptable A B C D E rejectable | B | B | C | A |
| | overall evaluation | acceptable A B C D E rejectable | A | A | B | B |
| Characteristics of cured product | glass transition temperature of cured product (° C.) | | 199 | 192 | 193 | 181 |
| | phase-separated structure | | absent | absent | absent | absent |
| | tensile strength (MPa) | | 2,780 | 2,960 | 3,110 | 2,930 |

TABLE 22

| | | | Example 66 | Example 67 | Example 68 | Example 69 |
|---|---|---|---|---|---|---|
| Characteristics of prepreg | storage elastic modulus G' of surface resin (Pa) | 40° C., 0.06 rad/s | $1.2 \times 10^4$ | $1.0 \times 10^4$ | $1.5 \times 10^4$ | $9.4 \times 10^3$ |
| | | 40° C., 6.28 rad/s | $6.2 \times 10^5$ | $5.8 \times 10^5$ | $8.1 \times 10^5$ | $6.8 \times 10^5$ |
| | | 40° C., 314 rad/s | $5.5 \times 10^6$ | $5.3 \times 10^6$ | $1.1 \times 10^7$ | $9.1 \times 10^6$ |
| | storage elastic modulus G' of opposite-side surface resin (Pa) | 40° C., 0.06 rad/s | same on both sides | same on both sides | same on both sides | same on both sides |
| | | 40° C., 6.28 rad/s | | | | |
| | | 40° C., 314 rad/s | | | | |
| | glass transition temperature of prepreg (° C.) | | 10.5 | 10.1 | 12.6 | 11.5 |
| | degree of conversion of epoxy resin composition (%) | | 8.6 | 8.1 | 4.3 | 4.0 |
| | tackiness between prepreg and metal (25° C.) | tackiness value (N) | 0.0 | 0.0 | 0.0 | 0.0 |
| | | acceptable A B C D E rejectable | A | A | A | A |
| | drapability (25° C.) | deflection angle | 24 | 25 | 22 | 25 |
| | | acceptable A B C D E rejectable | C | B | C | B |
| | overall evaluation | acceptable A B C D E rejectable | B | A | B | A |
| Characteristics of cured product | glass transition temperature of cured product (° C.) | | 191 | 183 | 204 | 202 |
| | phase-separated structure | | absent | absent | absent | absent |
| | tensile strength (MPa) | | 2,900 | 2,960 | — | — |

| | | | Example 70 | Example 71 | Example 72 | Example 73 |
|---|---|---|---|---|---|---|
| Characteristics of prepreg | storage elastic modulus G' of surface resin (Pa) | 40° C., 0.06 rad/s | $1.9 \times 10^4$ | $1.3 \times 10^4$ | $1.7 \times 10^4$ | $9.0 \times 10^3$ |
| | | 40° C., 6.28 rad/s | $8.5 \times 10^5$ | $7.9 \times 10^5$ | $8.0 \times 10^5$ | $6.0 \times 10^5$ |
| | | 40° C., 314 rad/s | $1.5 \times 10^7$ | $9.5 \times 10^6$ | $9.4 \times 10^6$ | $8.3 \times 10^6$ |
| | storage elastic modulus G' of opposite-side surface resin (Pa) | 40° C., 0.06 rad/s | same on both sides | same on both sides | same on both sides | same on both sides |
| | | 40° C., 6.28 rad/s | | | | |
| | | 40° C., 314 rad/s | | | | |
| | glass transition temperature of prepreg (° C.) | | 13.1 | 12.3 | 12.4 | 11.0 |
| | degree of conversion of epoxy resin composition (%) | | 4.8 | 4.2 | 5.3 | 5.1 |
| | tackiness between prepreg and metal (25° C.) | tackiness value (N) | 0.0 | 0.0 | 0.0 | 0.0 |
| | | acceptable A B C D E rejectable | A | A | A | A |
| | drapability (25° C.) | deflection angle | 20 | 22 | 21 | 23 |
| | | acceptable A B C D E rejectable | C | C | C | C |
| | overall evaluation | acceptable A B C D E rejectable | B | B | B | B |
| Characteristics of cured product | glass transition temperature of cured product (° C.) | | 206 | 203 | 203 | 201 |
| | phase-separated structure | | absent | absent | absent | absent |
| | tensile strength (MPa) | | — | — | — | — |

TABLE 23

| | | | Comparative example 1 | Comparative example 2 | Comparative example 3 | Comparative example 4 |
|---|---|---|---|---|---|---|
| Characteristics of prepreg | storage elastic modulus G' of surface resin (Pa) | 40° C., 0.06 rad/s | $2.0 \times 10^1$ | $9.1 \times 10^5$ | $2.2 \times 10^1$ | $1.0 \times 10^6$ |
| | | 40° C., 6.28 rad/s | $1.2 \times 10^3$ | $2.5 \times 10^7$ | $1.3 \times 10^3$ | $3.1 \times 10^7$ |
| | | 40° C., 314 rad/s | $3.5 \times 10^4$ | $>10^9$ | $3.6 \times 10^4$ | $>10^9$ |
| | storage elastic modulus G' of opposite-side surface resin (Pa) | 40° C., 0.06 rad/s | same on both sides | same on both sides | same on both sides | same on both sides |
| | | 40° C., 6.28 rad/s | | | | |
| | | 40° C., 314 rad/s | | | | |
| | glass transition temperature of prepreg (° C.) | | −7.5 | 40.5 | 0.0 | 39.4 |
| | degree of conversion of epoxy resin composition (%) | | 0.0 | 30.2 | 0.0 | 28.3 |
| | tackiness between prepreg and metal (25° C.) | tackiness value (N) | 1.5 | 0.0 | 1.2 | 0.0 |
| | | acceptable A B C D E rejectable | E | A | E | A |
| | drapability (25° C.) | deflection angle | 40 | 5 | 38 | 4 |
| | | acceptable A B C D E rejectable | A | E | A | E |
| | overall evaluation | acceptable A B C D E rejectable | E | E | E | E |
| Characteristics of cured product | glass transition temperature of cured product (° C.) | | 200 | 200 | 205 | 205 |
| | phase-separated structure | | absent | absent | absent | absent |
| | tensile strength (MPa) | | — | — | — | — |

| | | | Comparative example 5 | Comparative example 6 | Comparative example 7 | Comparative example 8 |
|---|---|---|---|---|---|---|
| Characteristics of prepreg | storage elastic modulus G' of surface resin (Pa) | 40° C., 0.06 rad/s | $2.1 \times 10^1$ | $8.8 \times 10^5$ | $6.4 \times 10^3$ | $9.5 \times 10^2$ |
| | | 40° C., 6.28 rad/s | $1.2 \times 10^3$ | $2.4 \times 10^7$ | $8.8 \times 10^4$ | $1.1 \times 10^4$ |
| | | 40° C., 314 rad/s | $3.3 \times 10^4$ | $>10^9$ | $1.7 \times 10^6$ | $5.9 \times 10^5$ |
| | storage elastic modulus G' of opposite-side surface resin (Pa) | 40° C., 0.06 rad/s | same on both sides | same on both sides | same on both sides | same on both sides |
| | | 40° C., 6.28 rad/s | | | | |
| | | 40° C., 314 rad/s | | | | |
| | glass transition temperature of prepreg (° C.) | | −8.2 | 38.1 | 6.4 | 1.1 |
| | degree of conversion of epoxy resin composition (%) | | 0.0 | 31.4 | 0.0 | 0.0 |
| | tackiness between prepreg and metal (25° C.) | tackiness value (N) | 1.4 | 0.0 | 0.3 | 1.1 |
| | | acceptable A B C D E rejectable | E | A | C | E |
| | drapability (25° C.) | deflection angle | 42 | 5 | 26 | 35 |
| | | acceptable A B C D E rejectable | A | E | B | A |
| | overall evaluation | acceptable A B C D E rejectable | E | E | C | E |
| Characteristics of cured product | glass transition temperature of cured product (° C.) | | 190 | 190 | 170 | 190 |
| | phase-separated structure | | absent | absent | absent | absent |
| | tensile strength (MPa) | | — | — | — | — |

TABLE 24

| | | | Comparative example 9 | Comparative example 10 | Comparative example 11 | Comparative example 12 | Comparative example 13 |
|---|---|---|---|---|---|---|---|
| Characteristics of prepreg | storage elastic modulus G' of surface resin (Pa) | 40° C., 0.06 rad/s | $2.0 \times 10^1$ | $8.6 \times 10^5$ | $6.6 \times 10^3$ | $9.8 \times 10^2$ | $4.5 \times 10^2$ |
| | | 40° C., 6.28 rad/s | $1.1 \times 10^3$ | $2.1 \times 10^7$ | $8.9 \times 10^4$ | $1.4 \times 10^4$ | $4.5 \times 10^4$ |
| | | 40° C., 314 rad/s | $3.3 \times 10^4$ | $>10^9$ | $2.0 \times 10^6$ | $6.3 \times 10^5$ | $5.0 \times 10^5$ |
| | storage elastic modulus G' of opposite-side surface resin (Pa) | 40° C., 0.06 rad/s | same on both sides | same on both sides | same on both sides | same on both sides | same on both sides |
| | | 40° C., 6.28 rad/s | | | | | |
| | | 40° C., 314 rad/s | | | | | |
| | glass transition temperature of prepreg (° C.) | | 1.8 | 40.5 | 6.4 | 1.1 | −1.5 |
| | degree of conversion of epoxy resin composition (%) | | 0.0 | 30.2 | 0.0 | 0.0 | 0.0 |
| | tackiness between prepreg and metal (25° C.) | tackiness value (N) | 1.0 | 0.0 | 0.3 | 1.1 | 2.0 |
| | | acceptable A B C D E rejectable | E | A | C | E | E |
| | drapability (25° C.) | deflection angle | 40 | 6 | 26 | 35 | 42 |
| | | acceptable A B C D E rejectable | A | E | B | A | A |
| | overall evaluation | acceptable A B C D E rejectable | E | E | C | E | E |
| Characteristics of cured product | glass transition temperature of cured product (° C.) | | 205 | 205 | 170 | 185 | 182 |
| | phase-separated structure | | existing | existing | existing | existing | absent |
| | tensile strength (MPa) | | — | — | — | — | 2,930 |

| | | | Comparative example 14 | Comparative example 15 | Comparative example 16 | Comparative example 17 |
|---|---|---|---|---|---|---|
| Characteristics of prepreg | storage elastic modulus G' of surface resin (Pa) | 40° C., 0.06 rad/s | $1.2 \times 10^6$ | $3.5 \times 10^2$ | $8.3 \times 10^5$ | $2.3 \times 10^2$ |
| | | 40° C., 6.28 rad/s | $8.8 \times 10^8$ | $3.0 \times 10^4$ | $5.5 \times 10^8$ | $2.8 \times 10^4$ |
| | | 40° C., 314 rad/s | $>10^9$ | $2.4 \times 10^5$ | $>10^9$ | $3.2 \times 10^5$ |
| | storage elastic modulus G' of opposite-side surface resin (Pa) | 40° C., 0.06 rad/s | same on both sides | same on both sides | same on both sides | same on both sides |
| | | 40° C., 6.28 rad/s | | | | |
| | | 40° C., 314 rad/s | | | | |

TABLE 24-continued

|  |  |  | | | | |
|---|---|---|---|---|---|---|
|  |  | glass transition temperature of prepreg (° C.) | 41.2 | −1.2 | 39.5 | −1.0 |
|  |  | degree of conversion of epoxy resin composition (%) | 28.6 | 0.0 | 27.4 | 0.0 |
|  |  | tackiness between prepreg and metal (25° C.) | tackiness value (N) | 0.0 | 2.2 | 0.0 | 2.5 |
|  |  |  | acceptable A B C D E rejectable | A | E | A | E |
|  |  | drapability (25° C.) | deflection angle | 5 | 44 | 6 | 45 |
|  |  |  | acceptable A B C D E rejectable | E | A | E | A |
|  |  | overall evaluation | acceptable A B C D E rejectable | E | E | E | E |
| Characteristics of cured product | glass transition temperature of cured product (° C.) | | 182 | 190 | 190 | 192 |
|  | phase-separated structure | | absent | absent | absent | absent |
|  | tensile strength (MPa) | | 2,920 | 2,810 | 2,820 | 2,840 |

TABLE 25

|  |  |  |  | Comparative example 18 | Comparative example 19 | Comparative example 20 | Comparative example 21 | Comparative example 22 |
|---|---|---|---|---|---|---|---|---|
| Characteristics of prepreg | storage elastic modulus G' of surface resin (Pa) | 40° C., 0.06 rad/s | | $9.1 \times 10^5$ | $4.3 \times 10^3$ | $1.3 \times 10^3$ | $1.6 \times 10^3$ | $8.8 \times 10^2$ |
|  |  | 40° C., 6.28 rad/s | | $6.1 \times 10^8$ | $5.1 \times 10^5$ | $2.1 \times 10^5$ | $2.4 \times 10^5$ | $8.9 \times 10^4$ |
|  |  | 40° C., 314 rad/s | | $>10^9$ | $8.0 \times 10^6$ | $4.9 \times 10^6$ | $5.3 \times 10^6$ | $9.8 \times 10^5$ |
|  | storage elastic modulus G' of opposite-side surface resin (Pa) | 40° C., 0.06 rad/s | | same on both sides | same on both sides | same on both sides | same on both sides | same on both sides |
|  |  | 40° C., 6.28 rad/s | | | | | | |
|  |  | 40° C., 314 rad/s | | | | | | |
|  | glass transition temperature of prepreg (° C.) | | | 40.6 | 10.3 | 9.2 | 9.6 | 5.6 |
|  | degree of conversion of epoxy resin composition (%) | | | 28.1 | 0.0 | 0.0 | 0.0 | 0.0 |
|  | tackiness between prepreg and metal (25° C.) | tackiness value (N) | | 0.0 | 0.2 | 0.4 | 0.3 | 1.4 |
|  |  | acceptable A B C D E rejectable | | A | B | C | C | E |
|  | drapability (25° C.) | deflection angle | | 7 | 25 | 27 | 26 | 36 |
|  |  | acceptable A B C D E rejectable | | E | B | B | B | A |
|  | overall evaluation | acceptable A B C D E rejectable | | E | B | C | C | E |
| Characteristics of cured product | glass transition temperature of cured product (° C.) | | | 192 | 163 | 169 | 171 | 204 |
|  | phase-separated structure | | | absent | absent | absent | absent | absent |
|  | tensile strength (MPa) | | | 2,840 | 2,920 | 2,840 | 2,750 | — |

|  |  |  |  | Comparative example 23 | Comparative example 24 | Comparative example 25 | Comparative example 26 |
|---|---|---|---|---|---|---|---|
| Characteristics of prepreg | storage elastic modulus G' of surface resin (Pa) | 40° C., 0.06 rad/s | | $1.6 \times 10^6$ | $9.7 \times 10^2$ | $1.9 \times 10^6$ | $9.2 \times 10^2$ |
|  |  | 40° C., 6.28 rad/s | | $9.2 \times 10^8$ | $1.2 \times 10^5$ | $9.7 \times 10^8$ | $9.7 \times 10^4$ |
|  |  | 40° C., 314 rad/s | | $>10^9$ | $1.5 \times 10^7$ | $>10^9$ | $1.1 \times 10^7$ |
|  | storage elastic modulus G' of opposite-side surface resin (Pa) | 40° C., 0.06 rad/s | | same on both sides | same on both sides | same on both sides | same on both sides |
|  |  | 40° C., 6.28 rad/s | | | | | |
|  |  | 40° C., 314 rad/s | | | | | |
|  | glass transition temperature of prepreg (° C.) | | | 43.1 | 8.2 | 44.7 | 7.4 |
|  | degree of conversion of epoxy resin composition (%) | | | 30.1 | 0.0 | 31.8 | 0.0 |
|  | tackiness between prepreg and metal (25° C.) | tackiness value (N) | | 0.0 | 1.0 | 0.0 | 1.1 |
|  |  | acceptable A B C D E rejectable | | A | E | A | E |
|  | drapability (25° C.) | deflection angle | | 4 | 33 | 3 | 38 |
|  |  | acceptable A B C D E rejectable | | E | A | E | A |
|  | overall evaluation | acceptable A B C D E rejectable | | E | D | E | D |
| Characteristics of cured product | glass transition temperature of cured product (° C.) | | | 204 | 206 | 206 | 203 |
|  | phase-separated structure | | | absent | absent | absent | absent |
|  | tensile strength (MPa) | | | — | — | — | — |

TABLE 26

|  |  |  | Comparative example 27 | Comparative example 28 | Comparative example 29 | Comparative example 30 |
|---|---|---|---|---|---|---|
| Characteristics of prepreg | storage elastic modulus G' of surface resin (Pa) | 40° C., 0.06 rad/s | $1.8 \times 10^6$ | $3.1 \times 10^4$ | $1.8 \times 10^3$ | $3.4 \times 10^5$ |
|  |  | 40° C., 6.28 rad/s | $9.3 \times 10^8$ | $4.8 \times 10^5$ | $4.6 \times 10^4$ | $5.2 \times 10^6$ |
|  |  | 40° C., 314 rad/s | $>10^9$ | $2.0 \times 10^7$ | $1.0 \times 10^6$ | $2.5 \times 10^8$ |
|  | storage elastic modulus G' of opposite-side surface resin (Pa) | 40° C., 0.06 rad/s | same on both sides | same on both sides | same on both sides | same on both sides |
|  |  | 40° C., 6.28 rad/s |  |  |  |  |
|  |  | 40° C., 314 rad/s |  |  |  |  |
|  | glass transition temperature of prepreg (° C.) |  | 42.9 | 10.0 | 8.9 | 11.4 |
|  | degree of conversion of epoxy resin composition (%) |  | 30.8 | 0.0 | 0.0 | 0.0 |
|  | tackiness between prepreg and metal (25° C.) | tackiness value (N) | 0.0 | 0.5 | 0.7 | 0.3 |
|  |  | acceptable A B C D E rejectable | A | D | D | C |
|  | drapability (25° C.) | deflection angle | 5 | 30 | 32 | 28 |
|  |  | acceptable A B C D E rejectable | E | B | A | B |
|  | overall evaluation | acceptable A B C D E rejectable | E | D | C | C |
| Characteristics of cured product | glass transition temperature of cured product (° C.) |  | 202 | 195 | 195 | 195 |
|  | phase-separated structure |  | absent | absent | absent | absent |
|  | tensile strength (MPa) |  | — | 2,280 | 2,200 | 2,340 |

|  |  |  | Comparative example 31 | Comparative example 32 | Comparative example 33 | Comparative example 34 |
|---|---|---|---|---|---|---|
| Characteristics of prepreg | storage elastic modulus G' of surface resin (Pa) | 40° C., 0.06 rad/s | $1.5 \times 10^5$ | $1.5 \times 10^3$ | $1.2 \times 10^3$ | $2.6 \times 10^3$ |
|  |  | 40° C., 6.28 rad/s | $2.3 \times 10^6$ | $3.8 \times 10^4$ | $3.6 \times 10^4$ | $4.8 \times 10^4$ |
|  |  | 40° C., 314 rad/s | $1.1 \times 10^8$ | $9.2 \times 10^5$ | $8.5 \times 10^5$ | $1.6 \times 10^6$ |
|  | storage elastic modulus G' of opposite-side surface resin (Pa) | 40° C., 0.06 rad/s | same on both sides | same on both sides | same on both sides | same on both sides |
|  |  | 40° C., 6.28 rad/s |  |  |  |  |
|  |  | 40° C., 314 rad/s |  |  |  |  |
|  | glass transition temperature of prepreg (° C.) |  | 13.8 | 8.4 | 5.8 | 10.6 |
|  | degree of conversion of epoxy resin composition (%) |  | 0.0 | 0.0 | 25.2 | 28.7 |
|  | tackiness between prepreg and metal (25° C.) | tackiness value (N) | 0.2 | 1.0 | 0.3 | 0.1 |
|  |  | acceptable A B C D E rejectable | B | E | C | B |
|  | drapability (25° C.) | deflection angle | 25 | 34 | 24 | 18 |
|  |  | acceptable A B C D E rejectable | B | A | C | D |
|  | overall evaluation | acceptable A B C D E rejectable | B | E | D | D |
| Characteristics of cured product | glass transition temperature of cured product (° C.) |  | 180 | 210 | 190 | 190 |
|  | phase-separated structure |  | absent | absent | absent | absent |
|  | tensile strength (MPa) |  | 2,400 | 2,260 | 2,450 | 2,440 |

Example 1

An epoxy resin composition 1 was prepared by mixing 50 parts of jER (registered trademark) 630 and 50 parts of jER (registered trademark) 807 as the component [B], 35 parts of Seikacure-S as the component [C], and 35 parts of Virantage (registered trademark) VW-10700RP as the component [D] according to the epoxy resin composition preparation procedure described in (1). Then, 25 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 60 hours according to the prepreg precursor heat-treatment procedure described in (5) to allow the preliminary reaction product of [B] and [C] to be contained in the prepreg.

As shown in Table 14, the surface resin in the prepreg prepared above had a storage elastic modulus G' in the range of $2.1 \times 10^3$ to $1.2 \times 10^6$ Pa as measured at a temperature of 40° C. and an angular frequency in the range of 0.06 to 314 rad/s. The prepreg had good dry property as evaluated based on measurements of the tackiness between prepreg and metal taken as described in (9) and there was no surface resin remaining on the metal plate after removal by pulling. It also had good drapability as evaluated by the prepreg drapability evaluation procedure described in (10). The prepreg had a glass transition temperature of 5.2° C. as measured by the prepreg's glass transition temperature measurement procedure described in (4) and the epoxy resin composition in the prepreg had a degree of conversion of 5.7% as measured by the epoxy resin composition's degree of conversion measurement procedure described in (7). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 200° C. as measured according to the procedure described in (13).

Examples 2 to 5

Except for changing the heat-treatment time of the prepreg precursor as specified in Table 1, the same procedure as in Example 1 was carried out to prepare a prepreg.

As shown in Table 14, the prepreg prepared in Example 2, which contained a surface resin having a G' value in the range of $6.7 \times 10^3$ to $2.0 \times 10^6$ Pa as measured at a temperature of 40° C. and an angular frequency in the range of 0.06 to 314 rad/s, had a particularly good dry property as evaluated based on measurements of the tackiness between prepreg and metal taken as described in (9), with no surface resin remaining on the metal plate after removal by pulling, and also had good drapability as evaluated by the prepreg drapability evaluation procedure described in (10). Furthermore, the prepreg prepared in Example 3, which contained a surface resin having a G' value in the range of $1.3 \times 10^4$ to $5.6 \times 10^6$ Pa as measured at a temperature of 40° C. and an angular frequency in the range of 0.06 to 314 rad/s, had particularly good dry property as evaluated based on measurements of the tackiness between prepreg and metal taken as described in (9) and there was no surface resin remaining on the metal plate after removal by pulling. The drapability as evaluated by the prepreg drapability evaluation procedure described in (10) was at an acceptable level although slightly lower than in Example 2. The prepregs prepared in Examples 4 and 5, each containing a surface resin having a G' value in the range of $1.0 \times 10^3$ to $2.0 \times 10^8$ Pa as measured at a temperature of 40° C. and an angular frequency in the range of 0.06 to 314 rad/s, had particularly good dry property and also had a permissible level of drapability although a little worse compared with Examples 1 to 3. Other measurement results are shown in Table 14. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Example 6

An epoxy resin composition 1 was prepared by mixing 50 parts of jER (registered trademark) 630 and 50 parts of jER (registered trademark) 807 as the component [B], 35 parts of Seikacure-S as the component [C], and 35 parts of Virantage (registered trademark) VW-10700RP as the component [D] according to the epoxy resin composition preparation procedure described in (1). Then, 25 parts of Orgasol (registered trademark) 1002D Nat 1 adopted as the component [E] was added to the epoxy resin composition 1 to prepare an epoxy resin composition 2.

Using the epoxy resin composition 2 prepared above, a resin film 2 was prepared according to the prepreg precursor preparation procedure described in (3). The resin film 2 prepared above was heat-treated for 60 hours in a similar way to the prepreg precursor heat-treatment procedure described in (5) to provide a resin film 2' that included a preliminary reaction product of [B] and [C].

Furthermore, when a prepreg is prepared using Torayca (registered trademark) T800S-24K-10E as the component [A] according to the prepreg precursor preparation procedure described in (3), an impregnated first prepreg was sandwiched between the resin films 2 and 2' to provide a prepreg having the resin film 2 as one surface resin and the resin film 2' as the other surface resin.

As shown in Table 14, the surface resin in the prepreg prepared above that was higher in G' had a G' value in the range of $2.1 \times 10^3$ to $1.2 \times 10^6$ Pa as measured at a temperature of 40° C. and an angular frequency in the range of 0.06 to 314 rad/s. The prepreg had good dry property as evaluated based on measurements of the tackiness between prepreg and metal taken as described in (9) and there was no surface resin remaining on the metal plate after removal by pulling. It had particularly good drapability as evaluated by the prepreg drapability evaluation procedure described in (10). The prepreg had a glass transition temperature of −1.4° C. as measured by the prepreg's glass transition temperature measurement procedure described in (4) and the epoxy resin composition in the prepreg had a degree of conversion of 3.5% as measured by the epoxy resin composition's degree of conversion measurement procedure described in (7).

Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 200° C. as measured according to the procedure described in (13).

Here, a polypropylene cover film with a thickness of 50 μm was stuck on the surface of the prepreg's surface resin that was the lower in G' and results showed good sticking property.

Example 7

Except that the resin film 2 was heat-treated for 90 hours instead of 60 hours when producing the resin film 2', the same procedure as in Example 6 was carried out to prepare a prepreg.

As shown in Table 14, the surface resin in the prepreg prepared above that was higher in G' had a G' value in the range of $6.7 \times 10^3$ to $2.0 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. It also had good drapability as evaluated by the prepreg drapability evaluation procedure described in (10). The prepreg had a glass transition temperature of 1.5° C. as measured by the prepreg's glass transition temperature measurement procedure described in (4) and the epoxy resin composition in the prepreg had a degree of conversion of 4.9% as measured by the epoxy resin composition's degree of conversion measurement procedure described in (7). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 200° C. as measured according to the procedure described in (13).

Here, a polypropylene cover film with a thickness of 50 μm was stuck on the surface of the prepreg's surface resin that was the lower in G' and results showed good sticking property.

Example 8

Except that the resin film 2 was heat-treated for 60 hours or 90 hours to prepare two resin films 2' and 2" that differed in the content of the preliminary reaction product and that they were used to sandwich an impregnated first prepreg, the same procedure as in Example 6 was carried out to prepare a prepreg.

As shown in Table 14, the surface resin in the prepreg prepared above that was higher in G' had a G' value in the range of $6.7 \times 10^3$ to $2.0 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. It also had good drapability as evaluated by the prepreg drapability evaluation procedure described in (10). The prepreg had a glass transition temperature of 7.5° C. as measured by the prepreg's glass transition temperature measurement procedure described in (4) and the epoxy resin composition in the prepreg had a degree of conversion of 6.9% as measured by the epoxy resin composition's degree of conversion measurement procedure described in (7). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 200° C. as measured according to the procedure described in (13).

Here, a polypropylene cover film with a thickness of 50 μm was stuck on the surface of the prepreg's surface resin that was the lower in G' and results showed a slight deterioration in sticking property though it is still at an acceptable level.

Example 9

An epoxy resin composition 1 was prepared by mixing 10 parts of jER (registered trademark) 630, 60 parts of Sumiepoxy (registered trademark) ELM434, and 30 parts of jER (registered trademark) 807 as the component [B], 35 parts of Seikacure-S as the component [C], and 20 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 60 hours according to the prepreg precursor heat-treatment procedure described in (5) to allow the preliminary reaction product of [B] and [C] to be contained in the prepreg.

As shown in Table 15, the surface resin in the prepreg prepared above had a storage elastic modulus G' in the range of $7.0 \times 10^3$ to $2.3 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. It also had good drapability as evaluated by the prepreg drapability evaluation procedure described in (10). In addition, this prepreg had a glass transition temperature of 9.8° C. and the epoxy resin composition in the prepreg had a degree of conversion of 5.1%. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 205° C. as measured according to the procedure described in (13).

Examples 10 and 11

Except for changing the heat-treatment time of the prepreg precursor as specified in Table 2, the same procedure as in Example 9 was carried out to prepare a prepreg.

As shown in Table 15, the prepreg prepared in Example 10, which contained a surface resin having a G' value in the range of $1.7 \times 10^4$ to $7.0 \times 10^6$ Pa as measured at a temperature of 40° C. and an angular frequency in the range of 0.06 to 314 rad/s, had particularly good dry property as evaluated based on measurements of the tackiness between prepreg and metal taken as described in (9) and there was no surface resin remaining on the metal plate after removal by pulling. It also had an acceptable level of drapability as evaluated by the prepreg drapability evaluation procedure described in (10). Furthermore, the prepreg prepared in Example 11, which contained a surface resin having a G' value in the range of $2.6 \times 10^4$ to $4.1 \times 10^7$ Pa as measured at a temperature of 40° C. and an angular frequency in the range of 0.06 to 314 rad/s, had particularly good dry property and also had a permissible level of drapability although a little worse compared with Examples 9 and 10. Other measurement results are shown in Table 15. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Example 12

An epoxy resin composition 1 was prepared by mixing 50 parts of jER (registered trademark) 630 and 50 parts of Sumiepoxy (registered trademark) ELM434 as the component [B], 5 parts of Seikacure-S and 40 parts of 3,3'-DAS as the component [C] and 15 parts of Sumikaexcel (registered trademark) PES5003P as the component [D] according to the epoxy resin composition preparation procedure described in (1).

Furthermore, using Torayca (registered trademark) T800S-24K-10E as the component [A] and the epoxy resin composition 1 prepared above, a prepreg precursor was produced according to the prepreg precursor preparation procedure described in (3). The resulting prepreg precursor was heat-treated for 90 hours according to the prepreg precursor heat-treatment procedure described in (5) to allow the preliminary reaction product of [B] and [C] to be contained in the prepreg.

As shown in Table 15, the prepreg prepared contained a surface resin having a storage elastic modulus G' in the range of $6.2 \times 10^3$ to $1.6 \times 10^6$ Pa as measured at a temperature of 40° C. and an angular frequency in the range of 0.06 to 314 rad/s, had a particularly good dry property as evaluated based on measurements of the tackiness between prepreg and metal taken as described in (9), with no surface resin remaining on the metal plate after removal by pulling, and also had good drapability as evaluated by the prepreg drapability evaluation procedure described in (10). In addition, this prepreg had a glass transition temperature of 9.5° C. and the epoxy resin composition in the prepreg had a degree of conversion of 8.5%. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 190° C. as measured according to the procedure described in (13).

Examples 13 and 14

Except for changing the heat-treatment time of the prepreg precursor as specified in Table 2, the same procedure as in Example 12 was carried out to prepare a prepreg.

As shown in Table 15, the prepreg prepared in Example 13, which contained a surface resin having a G' value in the range of $8.8 \times 10^3$ to $6.8 \times 10^6$ Pa as measured at a temperature of 40° C. and an angular frequency in the range of 0.06 to 314 rad/s, had particularly good dry property as evaluated based on measurements of the tackiness between prepreg and metal taken as described in (9) and there was no surface resin remaining on the metal plate after removal by pulling. It also had an acceptable level of drapability as evaluated by the prepreg drapability evaluation procedure described in (10). Furthermore, the prepreg prepared in Example 14, which contained a surface resin having a G' value in the range of $2.3 \times 10^4$ to $3.8 \times 10^7$ Pa as measured at a temperature of 40° C. and an angular frequency in the range of 0.06 to 314 rad/s, had particularly good dry property and also had a permissible level of drapability although a little worse compared with Examples 12 and 13. Other measurement results are shown in Table 15. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Example 15

An epoxy resin composition 1 was prepared by mixing 50 parts of ARALDITE (registered trademark) MY0600 and 50 parts of jER (registered trademark) 825 as the component [B], 35 parts of 3,3'-DAS as the component [C], and 35 parts of Virantage (registered trademark) VW-10700RP as the component [D] according to the epoxy resin composition preparation procedure described in (1). Then, 25 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 90 hours according to the prepreg precursor heat-treatment procedure described in (5) to allow the preliminary reaction product of [B] and [C] to be contained in the prepreg.

As shown in Table 15, the prepreg prepared contained a surface resin having a storage elastic modulus G' in the range of $6.1 \times 10^3$ to $1.5 \times 10^6$ Pa as measured at a temperature of 40° C. and an angular frequency in the range of 0.06 to 314 rad/s, had a particularly good dry property as evaluated based on measurements of the tackiness between prepreg and metal taken as described in (9), with no surface resin remaining on the metal plate after removal by pulling, and also had good drapability as evaluated by the prepreg drapability evaluation procedure described in (10). In addition, this prepreg had a glass transition temperature of 8.8° C. and the epoxy resin composition in the prepreg had a degree of conversion of 7.2%. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 185° C. as measured according to the procedure described in (13).

Examples 16 and 17

Except for changing the heat-treatment time of the prepreg precursor as specified in Table 2, the same procedure as in Example 15 was carried out to prepare a prepreg.

As shown in Table 15, the prepreg prepared in Example 16, which contained a surface resin having a G' value in the range of $8.0 \times 10^3$ to $5.1 \times 10^6$ Pa as measured at a temperature of 40° C. and an angular frequency in the range of 0.06 to 314 rad/s, had particularly good dry property as evaluated based on measurements of the tackiness between prepreg and metal taken as described in (9) and there was no surface resin remaining on the metal plate after removal by pulling. It also had an acceptable level of drapability as evaluated by the prepreg drapability evaluation procedure described in (10). Furthermore, the prepreg prepared in Example 17, which contained a surface resin having a G' value in the range of $2.8 \times 10^4$ to $2.1 \times 10^7$ Pa as measured at a temperature of 40° C. and an angular frequency in the range of 0.06 to 314 rad/s, had particularly good dry property and also had a permissible level of drapability although a little worse compared with Examples 15 and 16. Other measurement results are shown in Table 15. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Example 18

An epoxy resin composition was prepared by mixing 50 parts of jER (registered trademark) 630 and 50 parts of jER (registered trademark) 807 as the component [B], 20 parts of Seikacure-S as the component [C], and 20 parts of Sumikaexcel (registered trademark) PES5003P and 45 parts of Virantage (registered trademark) VW-10700RP as the component [D] according to the epoxy resin composition preparation procedure described in (1).

Furthermore, using Torayca (registered trademark) T800S-24K-10E as the component [A] and the epoxy resin composition prepared above, a prepreg precursor was produced according to the prepreg precursor preparation procedure described in (3). The resulting prepreg precursor was heat-treated for 30 hours according to the prepreg precursor heat-treatment procedure described in (5) to allow the preliminary reaction product of [B] and [C] to be contained in the prepreg.

As shown in Table 16, the surface resin in the prepreg prepared above had a storage elastic modulus G' in the range of 2.2×10³ to 1.3×10⁶ Pa as measured at a temperature of 40° C. and an angular frequency in the range of 0.06 to 314 rad/s. The prepreg had good dry property as evaluated based on measurements of the tackiness between prepreg and metal taken as described in (9) and there was no surface resin remaining on the metal plate after removal by pulling. It had particularly good drapability as evaluated by the prepreg drapability evaluation procedure described in (10). The prepreg had a glass transition temperature of 5.3° C. as measured by the prepreg's glass transition temperature measurement procedure described in (4) and the epoxy resin composition in the prepreg had a degree of conversion of 1.5% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the cured prepreg cured by the prepreg curing procedure described in (12) had a glass transition temperature of 205° C. as measured according to the procedure described in (13). Furthermore, electron microscopic observation showed that the cured prepreg had a sea-island type phase-separated structure.

Examples 19 to 22

Except for changing the heat-treatment time of the prepreg precursor as specified in Table 3, the same procedure as in Example 18 was carried out to prepare a prepreg.

As shown in Table 16, the prepreg prepared in Example 19, which contained a surface resin having a G' value in the range of 6.5×10³ to 2.1×10⁶ Pa as measured at a temperature of 40° C. and an angular frequency in the range of 0.06 to 314 rad/s, had a particularly good dry property as evaluated based on measurements of the tackiness between prepreg and metal taken as described in (9), with no surface resin remaining on the metal plate after removal by pulling, and also had good drapability as evaluated by the prepreg drapability evaluation procedure described in (10). Furthermore, the prepreg prepared in Example 20, which contained a surface resin having a G' value in the range of 1.4×10⁴ to 5.8×10⁶ Pa as measured at a temperature of 40° C. and an angular frequency in the range of 0.06 to 314 rad/s, had particularly good dry property as evaluated based on measurements of the tackiness between prepreg and metal taken as described in (9) and there was no surface resin remaining on the metal plate after removal by pulling. The drapability as evaluated by the prepreg drapability evaluation procedure was at an acceptable level although slightly lower than in Example 19. Furthermore, the prepregs prepared in Examples 21 and 22, each containing a surface resin having a G' value in the range of 1.0×10³ to 2.0×10⁸ Pa as measured at a temperature of 40° C. and an angular frequency in the range of 0.06 to 314 rad/s, had particularly good dry property and also had a permissible level of drapability although a little worse compared with Examples 18 to 20. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction. Other measurement results are shown in Table 16.

Furthermore, electron microscopic observation showed that the cured prepreg produced by curing the prepreg of Example 19 to 22 had a sea-island type phase-separated structure.

Example 23

An epoxy resin composition was prepared by mixing 50 parts of ARALDITE (registered trademark) MY0600 and 50 parts of jER (registered trademark) 825 as the component [B], 20 parts of 3,3'-DAS as the component [C], and 20 parts of Sumikaexcel (registered trademark) PES5003P and 45 parts of Virantage (registered trademark) VW-10700RP as the component [D] according to the epoxy resin composition preparation procedure described in (1).

Furthermore, using Torayca (registered trademark) T800S-24K-10E as the component [A] and the epoxy resin composition prepared above, a prepreg precursor was produced according to the prepreg precursor preparation procedure described in (3). The resulting prepreg precursor was heat-treated for 60 hours according to the prepreg precursor heat-treatment procedure described in (5) to allow the preliminary reaction product of [B] and [C] to be contained in the prepreg.

As shown in Table 16, the surface resin in the prepreg prepared above had a storage elastic modulus G' in the range of 5.5×10³ to 1.1×10⁶ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. It had good drapability as evaluated by the prepreg drapability evaluation procedure described in (10). The prepreg had a glass transition temperature of 10.4° C. as measured by the prepreg's glass transition temperature measurement procedure described in (4) and the epoxy resin composition in the prepreg had a degree of conversion of 3.7% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the cured prepreg cured by the prepreg curing procedure described in (12) had a glass transition temperature of 185° C. as measured according to the procedure described in (13). Furthermore, electron microscopic observation showed that the cured prepreg had a sea-island type phase-separated structure.

Examples 24 and 25

Except for changing the heat-treatment time of the prepreg precursor as specified in Table 3, the same procedure as in Example 23 was carried out to prepare a prepreg.

As shown in Table 16, the prepreg prepared in Example 24, which contained a surface resin having a G' value in the range of 9.4×10³ to 4.8×10⁶ Pa as measured at a temperature of 40° C. and an angular frequency in the range of 0.06 to 314 rad/s, had particularly good dry property as evaluated based on measurements of the tackiness between prepreg and metal taken as described in (9) and there was no surface resin remaining on the metal plate after removal by pulling. It also had an acceptable level of drapability as evaluated by the prepreg drapability evaluation procedure described in (10). Furthermore, the prepreg prepared in Example 25, which contained a surface resin having a G' value in the range of $4.2 \times 10^4$ to $3.3 \times 10^7$ Pa as measured at a temperature of 40° C. and an angular frequency in the range of 0.06 to 314 rad/s, had particularly good dry property and also had a permissible level of drapability although a little worse compared with Examples 23 and 24. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction. Other measurement results are shown in Table 16.

Furthermore, electron microscopic observation showed that the cured prepreg produced by curing the prepreg of Example 24 and 25 had a sea-island type phase-separated structure.

Example 26

An epoxy resin composition was prepared by mixing 50 parts of jER (registered trademark) 630 and 50 parts of jER (registered trademark) 807 as the component [B], 20 parts of Seikacure-S as the component [C], and 20 parts of Sumikaexcel (registered trademark) PES5003P and 45 parts of Virantage (registered trademark) VW-10700RP as the component [D] according to the epoxy resin composition preparation procedure described in (1).

Using the epoxy resin composition prepared above, a resin film 1 was prepared according to the prepreg precursor preparation procedure described in (3). The resin film 1 prepared above was heat-treated for 30 hours in a similar way to the prepreg precursor heat-treatment procedure described in (5) to provide a resin film 1' that included a preliminary reaction product of [B] and [C].

Furthermore, when a prepreg is prepared using Torayca (registered trademark) T800S-24K-10E as the component [A] according to the prepreg precursor preparation procedure described in (3), an impregnated first prepreg was sandwiched between the resin films 1 and 1' to provide a prepreg having the resin film 1 as one surface resin and the resin film 1' as the other surface resin.

As shown in Table 17, the surface resin in the prepreg prepared above that was higher in G' had a G' value in the range of $2.2 \times 10^3$ to $1.3 \times 10^6$ Pa as measured at a temperature of 40° C. and an angular frequency in the range of 0.06 to 314 rad/s. The prepreg had good dry property as evaluated based on measurements of the tackiness between prepreg and metal taken as described in (9) and there was no surface resin remaining on the metal plate after removal by pulling. It had particularly good drapability as evaluated by the prepreg drapability evaluation procedure described in (10). The prepreg had a glass transition temperature of 3.9° C. as measured by the prepreg's glass transition temperature measurement procedure described in (4) and the epoxy resin composition in the prepreg had a degree of conversion of 0.8% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the cured prepreg cured by the prepreg curing procedure described in (12) had a glass transition temperature of 205° C. as measured according to the procedure described in (13). Electron microscopic observation showed that the cured prepreg had a sea-island type phase-separated structure.

Here, a polypropylene cover film with a thickness of 50 μm was stuck on the surface of the prepreg's surface resin that was the lower in G' and results showed good sticking property.

Example 27

Except that the resin film 1 was heat-treated for 60 hours instead of 30 hours when producing the resin film 1, the same procedure as in Example 26 was carried out to prepare a prepreg.

As shown in Table 17, the surface resin in the prepreg prepared above that was higher in G' had a G' value in the range of $6.5 \times 10^3$ to $2.1 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. It also had particularly good drapability as evaluated by the prepreg drapability evaluation procedure described in (10). The prepreg had a glass transition temperature of 6.4° C. as measured by the prepreg's glass transition temperature measurement procedure described in (4) and the epoxy resin composition in the prepreg had a degree of conversion of 1.6% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the cured prepreg cured by the prepreg curing procedure described in (12) had a glass transition temperature of 205° C. as measured according to the procedure described in (13). Electron microscopic observation showed that the cured prepreg had a sea-island type phase-separated structure.

Here, a polypropylene cover film with a thickness of 50 μm was stuck on the surface of the prepreg's surface resin that was the lower in G' and results showed good sticking property.

Example 28

Except that the resin film 1 was heat-treated for 30 hours or 60 hours to prepare two resin films 1' and 1'' that differed in the content of the preliminary reaction product and that they were used to sandwich an impregnated first prepreg, the same procedure as in Example 26 was carried out to prepare a prepreg.

As shown in Table 17, the surface resin in the prepreg prepared above that was higher in G' had a G' value in the range of $6.5 \times 10^3$ to $2.1 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. It also had good drapability as evaluated by the prepreg drapability evaluation procedure described in (10). The prepreg had a glass transition temperature of 8.5° C. as measured by the prepreg's glass transition temperature measurement procedure described in (4) and the epoxy resin composition in the prepreg had a degree of conversion of 2.5% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the cured prepreg cured by the prepreg curing procedure described in (12) had a glass transition temperature of 205° C. as measured according to the procedure described in (13). Furthermore, electron microscopic observation showed that the cured prepreg had a sea-island type phase-separated structure.

Here, a polypropylene cover film with a thickness of 50 μm was stuck on the surface of the prepreg's surface resin that was the lower in G' and results showed a slight deterioration in sticking property though it is still at an acceptable level.

Example 29

An epoxy resin composition 1 was prepared by mixing 25 parts of Denacol (registered trademark) EX-731, 60 parts of Sumiepoxy (registered trademark) ELM434, and 15 parts of jER (registered trademark) 825 as the component [B], 40 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 30 hours according to the prepreg precursor heat-treatment procedure described in (5) to allow the preliminary reaction product of [B] and [C] to be contained in the prepreg.

As shown in Table 17, the surface resin in the prepreg prepared above had a storage elastic modulus G' in the range of $1.4 \times 10^3$ to $1.5 \times 10^6$ Pa as measured at a temperature of 40° C. and an angular frequency in the range of 0.06 to 314 rad/s. The prepreg had an acceptable level of dry property as evaluated based on measurements of the tackiness between prepreg and metal taken as described in (9). It had good drapability as evaluated by the prepreg drapability evaluation procedure described in (10). The prepreg had a glass transition temperature of 5.3° C. as measured by the prepreg's glass transition temperature measurement procedure described in (4) and the epoxy resin composition in the prepreg had a degree of conversion of 2.3% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 182° C. as measured according to the procedure described in (13). Furthermore, the carbon fiber reinforced material had a 0° tensile strength of 2,920 MPa as measured according to (15).

Examples 30 and 31

Except for changing the heat-treatment time of the prepreg precursor as specified in Table 4, the same procedure as in Example 29 was carried out to prepare a prepreg.

As shown in Table 17, the prepreg prepared in Example 30, which contained a surface resin having a G' value in the range of $4.7 \times 10^3$ to $3.8 \times 10^6$ Pa as measured at a temperature of 40° C. and an angular frequency in the range of 0.06 to 314 rad/s, had particularly good dry property as evaluated based on measurements of the tackiness between prepreg and metal taken as described in (9) and there was no surface resin remaining on the metal plate after removal by pulling. It also had good drapability as evaluated by the prepreg drapability evaluation procedure described in (10).

Furthermore, the prepreg prepared in Example 31, which contained a surface resin having a G' value in the range of $1.1 \times 10^4$ to $5.0 \times 10^7$ Pa as measured at a temperature of 40° C. and an angular frequency in the range of 0.06 to 314 rad/s, had particularly good dry property and there was no surface resin remaining on the metal plate after removal by pulling. In addition, the drapability was at an acceptable level although a little worse compared with Examples 29 and 30. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Furthermore, in both Examples 30 and 31, the carbon fiber reinforced material had the same level of 0° tensile strength as in Example 29 as measured according to (15). Other measurement results are shown in Table 17.

Example 32

An epoxy resin composition 1 was prepared by mixing 25 parts of Denacol (registered trademark) EX-731, 60 parts of Sumiepoxy (registered trademark) ELM434, and 15 parts of jER (registered trademark) 825 as the component [B], 40 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Using the epoxy resin composition 2 prepared above, a resin film 2 was prepared according to the prepreg precursor preparation procedure described in (3). The resin film 2 prepared above was heat-treated for 30 hours in a similar way to the prepreg precursor heat-treatment procedure described in (5) to provide a resin film 2' that included a preliminary reaction product of [B] and [C].

Furthermore, when a prepreg is prepared using Torayca (registered trademark) T800S-24K-10E as the component [A] according to the prepreg precursor preparation procedure described in (3), an impregnated first prepreg was sandwiched between the resin films 2 and 2' to provide a prepreg having the resin film 2 as one surface resin and the resin film 2' as the other surface resin.

As shown in Table 17, the surface resin in the prepreg prepared above that was higher in G' had a G' value in the range of $1.4\times10^3$ to $1.5\times10^6$ Pa as measured at a temperature of 40° C. and an angular frequency in the range of 0.06 to 314 rad/s. The prepreg had an acceptable level of dry property as evaluated based on measurements of the tackiness between prepreg and metal taken as described in (9). Furthermore, it had particularly good drapability as evaluated by the prepreg drapability evaluation procedure described in (10). The prepreg had a glass transition temperature of 3.5° C. as measured by the prepreg's glass transition temperature measurement procedure described in (4) and the epoxy resin composition in the prepreg had a degree of conversion of 1.3% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 182° C. as measured according to the procedure described in (13). Furthermore, the carbon fiber reinforced material had a 0° tensile strength of 2,920 MPa as measured according to (15).

A polypropylene cover film with a thickness of 50 µm was stuck on the surface of the prepreg's surface resin that was the lower in G' and results showed good sticking property.

Example 33

Except that the resin film 2 was heat-treated for 75 hours instead of 30 hours when producing the resin film 2, the same procedure as in Example 32 was carried out to prepare a prepreg.

As shown in Table 17, the surface resin in the prepreg prepared above that was higher in G' had a G' value in the range of $4.7\times10^3$ to $3.8\times10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 5.8° C. as measured by the prepreg's glass transition temperature measurement procedure described in (4) and the epoxy resin composition in the prepreg had a degree of conversion of 3.7% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 182° C. as measured according to the procedure described in (13). Furthermore, the carbon fiber reinforced material had a 0° tensile strength of 2,910 MPa as measured according to (15).

Here, a polypropylene cover film with a thickness of 50 µm was stuck on the surface of the prepreg's surface resin that was lower in G' and results showed good sticking property.

Example 34

Except that the resin film 2 was heat-treated for 30 hours or 75 hours to prepare two resin films 2' and 2" that differed in the content of the preliminary reaction product and that they were used to sandwich an impregnated first prepreg, the same procedure as in Example 32 was carried out to prepare a prepreg.

As shown in Table 18, the surface resin in the prepreg prepared above that was higher in G' had a G' value in the range of $4.7\times10^3$ to $3.8\times10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 7.7° C. as measured by the prepreg's glass transition temperature measurement procedure described in (4) and the epoxy resin composition in the prepreg had a degree of conversion of 4.4% as measured by the epoxy resin composition's degree of conversion measurement procedure described in (8).

Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 182° C. as measured according to the procedure described in (13). Furthermore, the carbon fiber reinforced material had a 0° tensile strength of 2,920 MPa as measured according to (15).

Here, a polypropylene cover film with a thickness of 50 µm was stuck on the surface of the prepreg's surface resin that was lower in G' and results showed a slight deterioration in sticking property though it is still at an acceptable level.

Example 35

Except for using 5 parts, instead of 25 parts, of Denacol (registered trademark) EX-731 and 35 parts, instead of 15 parts, of jER (registered trademark) 825 as the component [B], the same procedure as in Example 30 was carried out to prepare a prepreg.

As shown in Table 18, the surface resin in the prepreg prepared above had a storage elastic modulus G' in the range of $2.8\times10^3$ to $2.3\times10^6$ Pa as measured at a temperature of 40° C. and an angular frequency in the range of 0.06 to 314 rad/s. The prepreg had good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 8.9° C. as measured by the prepreg's glass transition temperature measurement procedure described in (4) and the epoxy resin composition in the prepreg had a degree of conversion of 7.3% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 198° C. as measured according to the procedure described in (13). Furthermore, the carbon fiber reinforced material had a 0° tensile strength of 2,780 MPa as measured according to (15), which was a little smaller than in Example 30.

Example 36

Except for using 10 parts, instead of 25 parts, of Denacol (registered trademark) EX-731 and 30 parts, instead of 15 parts, of jER (registered trademark) 825 as the component [B], the same procedure as in Example 30 was carried out to prepare a prepreg.

As shown in Table 18, the surface resin in the prepreg prepared above had a storage elastic modulus G' in the range of $3.8 \times 10^3$ to $3.0 \times 10^6$ Pa as measured at a temperature of 40° C. and an angular frequency in the range of 0.06 to 314 rad/s. The prepreg had good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 9.7° C. as measured by the prepreg's glass transition temperature measurement procedure described in (4) and the epoxy resin composition in the prepreg had a degree of conversion of 7.4% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 191° C. as measured according to the procedure described in (13). Furthermore, the carbon fiber reinforced material had a 0° tensile strength of 2,840 MPa as measured according to (15), which was slightly smaller than in Example 30.

Examples 37 and 38

Except for using 15 parts or 20 parts, instead of 10 parts, of Sumikaexcel (registered trademark) PES5003P as the component [D], the same procedure as in Example 30 was carried out to prepare a prepreg.

As shown in Table 18, the prepreg prepared in Example 37, which contained a surface resin having a G' value in the range of $1.4 \times 10^4$ to $1.1 \times 10^7$ Pa as measured at a temperature of 40° C. and an angular frequency in the range of 0.06 to 314 rad/s, and the prepreg prepared in Example 38, which contained a surface resin having a G' value in the range of $3.7 \times 10^4$ to $3.1 \times 10^7$ Pa, had particularly good dry property as evaluated based on measurements of the tackiness between prepreg and metal taken as described in (9) and there was no surface resin remaining on the metal plate after removal by pulling. Furthermore, the drapability as evaluated by the prepreg drapability evaluation procedure described in (10) was at an acceptable level although slightly lower than in Example 30. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 182° C. or 183° C. as measured according to the procedure described in (13). Furthermore, the carbon fiber reinforced material had a 0° tensile strength of 3,080 MPa or 3,220 MPa as measured according to (15), which were larger than in Example 30.

Example 39

Except for using 45 parts, instead of 60 parts, of Sumiepoxy (registered trademark) ELM434 and 30 parts, instead of 15 parts, of jER (registered trademark) 825 as the component [C], the same procedure as in Example 30 was carried out to prepare a prepreg.

As shown in Table 18, the surface resin in the prepreg prepared above had a storage elastic modulus G' in the range of $3.3 \times 10^3$ to $2.1 \times 10^6$ Pa as measured at a temperature of 40° C. and an angular frequency in the range of 0.06 to 314 rad/s. The prepreg had good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 9.3° C. as measured by the prepreg's glass transition temperature measurement procedure described in (4) and the epoxy resin composition in the prepreg had a degree of conversion of 7.3% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 175° C. as measured according to the procedure described in (13). Furthermore, the carbon fiber reinforced material had a 0° tensile strength of 2,990 MPa as measured according to (15), which was slightly larger than in Example 30.

Example 40

An epoxy resin composition 1 was prepared by mixing 30 parts of Denacol (registered trademark) EX-731 and 70 parts of Sumiepoxy (registered trademark) ELM434 as the component [B], 44 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 75 hours according to the prepreg precursor heat-treatment procedure described in (5) to allow the preliminary reaction product of [B] and [C] to be contained in the prepreg.

As shown in Table 18, the surface resin in the prepreg prepared above had a storage elastic modulus G' in the range of $1.1 \times 10^4$ to $9.8 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had an acceptable level of drapability as evaluated by the prepreg drapability evaluation procedure described in (10). The prepreg had a glass transition temperature of 11.1° C. as measured by the prepreg's glass transition temperature measurement procedure described in (4) and the epoxy resin composition in the prepreg had a degree of conversion of 7.2% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 181° C. as measured according to the procedure described in (13). Furthermore, the carbon fiber reinforced material had a 0° tensile strength of 2,900 MPa as measured according to (15).

Example 41

An epoxy resin composition 1 was prepared by mixing 20 parts of Denacol (registered trademark) EX-731 and 80 parts of Sumiepoxy (registered trademark) ELM434 as the component [B], 44 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 75 hours according to the prepreg precursor heat-treatment procedure described in (5) to allow the preliminary reaction product of [B] and [C] to be contained in the prepreg.

As shown in Table 18, the surface resin in the prepreg prepared above had a storage elastic modulus G' in the range of $9.8 \times 10^3$ to $9.5 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 10.8° C. as measured by the prepreg's glass transition temperature measurement procedure described in (4) and the epoxy resin composition in the prepreg had a degree of conversion of 7.0% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 188° C. as measured according to the procedure described in (13). Furthermore, the carbon fiber reinforced material had a 0° tensile strength of 2,790 MPa as measured according to (15).

Example 42

An epoxy resin composition 1 was prepared by mixing 30 parts of GAN, 60 parts of Sumiepoxy (registered trademark) ELM434, and 10 parts of jER (registered trademark) 825 as the component [B], 45 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 30 hours according to the prepreg precursor heat-treatment procedure described in (5) to allow the preliminary reaction product of [B] and [C] to be contained in the prepreg.

As shown in Table 19, the surface resin in the prepreg prepared above had a storage elastic modulus G' in the range of $1.0 \times 10^3$ to $7.0 \times 10^5$ Pa as measured at a temperature of 40° C. and an angular frequency in the range of 0.06 to 314 rad/s. The prepreg had an acceptable level of dry property as evaluated based on measurements of the tackiness between prepreg and metal taken as described in (9). Furthermore, it had particularly good drapability as evaluated by the prepreg drapability evaluation procedure described in (10). The prepreg had a glass transition temperature of 4.2° C. as measured by the prepreg's glass transition temperature measurement procedure described in (4) and the epoxy resin composition in the prepreg had a degree of conversion of 2.0% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 190° C. as measured according to the procedure described in (13). Furthermore, the carbon fiber reinforced material had a 0° tensile strength of 2,800 MPa as measured according to (15).

Examples 43 and 44

Except for changing the heat-treatment time of the prepreg precursor as specified in Table 6, the same procedure as in Example 42 was carried out to prepare a prepreg.

As shown in Table 19, the prepreg prepared in Example 43, which contained a surface resin having a G' value in the range of $3.6 \times 10^3$ to $1.6 \times 10^6$ Pa as measured at a temperature of 40° C. and an angular frequency in the range of 0.06 to 314 rad/s, had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10).

Furthermore, the prepreg prepared in Example 44, which contained a surface resin having a G' value in the range of $8.4 \times 10^3$ to $2.3 \times 10^7$ Pa as measured at a temperature of 40° C. and an angular frequency in the range of 0.06 to 314 rad/s, had particularly good dry property and there was no surface resin remaining on the metal plate after removal by pulling. In addition, the drapability was at an acceptable level although slightly worse compared with Examples 42 and 43. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Furthermore, in both Examples 43 and 44, the carbon fiber reinforced material had the same level of 0° tensile strength as in Example 42 as measured according to (15). Other measurement results are shown in Table 19.

Example 45

An epoxy resin composition 1 was prepared by mixing 30 parts of GAN, 60 parts of Sumiepoxy (registered trademark) ELM434, and 10 parts of jER (registered trademark) 825 as the component [B], 45 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Using the epoxy resin composition 2 prepared above, a resin film 2 was prepared according to the prepreg precursor preparation procedure described in (3). The resin film 2 prepared above was heat-treated for 30 hours in a similar way to the prepreg precursor heat-treatment procedure described in (5) to provide a resin film 2' that included a preliminary reaction product of [B] and [C].

Furthermore, when a prepreg is prepared using Torayca (registered trademark) T800S-24K-10E as the component [A] according to the prepreg precursor preparation procedure described in (3), an impregnated first prepreg was sandwiched between the resin films 2 and 2' to provide a prepreg having the resin film 2 as one surface resin and the resin film 2' as the other surface resin.

As shown in Table 19, the surface resin in the prepreg prepared above that was higher in G' had a G' value in the range of $1.0 \times 10^3$ to $7.0 \times 10^5$ Pa as measured at a temperature of 40° C. and an angular frequency in the range of 0.06 to 314 rad/s. The prepreg had an acceptable level of dry property as evaluated based on measurements of the tackiness between prepreg and metal taken as described in (9). Furthermore, it had particularly good drapability as evaluated by the prepreg drapability evaluation procedure described in (10). The prepreg had a glass transition temperature of 3.2° C. as measured by the prepreg's glass transition temperature measurement procedure described in (4) and the epoxy resin composition in the prepreg had a degree of conversion of 1.1% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 190° C. as measured according to the procedure described in (13). Furthermore, the carbon fiber reinforced material had a 0° tensile strength of 2,810 MPa as measured according to (15).

A polypropylene cover film with a thickness of 50 μm was stuck on the surface of the prepreg's surface resin that was the lower in G' and results showed good sticking property.

Example 46

Except that the resin film 2 was heat-treated for 75 hours instead of 30 hours when producing the resin film 2, the same procedure as in Example 45 was carried out to prepare a prepreg.

As shown in Table 19, the surface resin in the prepreg prepared above that was higher in G' had a G' value in the range of $3.6 \times 10^3$ to $1.6 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 5.5° C. as measured by the prepreg's glass transition temperature measurement procedure described in (4) and the epoxy resin composition in the prepreg had a degree of conversion of 3.3% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 190° C. as measured according to the procedure described in (13). Furthermore, the carbon fiber reinforced material had a 0° tensile strength of 2,820 MPa as measured according to (15).

Here, a polypropylene cover film with a thickness of 50 μm was stuck on the surface of the prepreg's surface resin that was lower in G' and results showed good sticking property.

Example 47

Except that the resin film 2 was heat-treated for 30 hours or 75 hours to prepare two resin films 2' and 2" that differed in the content of the preliminary reaction product and that they were used to sandwich an impregnated first prepreg, the same procedure as in Example 45 was carried out to prepare a prepreg.

As shown in Table 19, the surface resin in the prepreg prepared above that was higher in G' had a G' value in the range of $3.6 \times 10^3$ to $1.6 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 7.5° C. as measured by the prepreg's glass transition temperature measurement procedure described in (4) and the epoxy resin composition in the prepreg had a degree of conversion of 4.3% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 190° C. as measured according to the procedure described in (13). Furthermore, the carbon fiber reinforced material had a 0° tensile strength of 2,820 MPa as measured according to (15).

Here, a polypropylene cover film with a thickness of 50 μm was stuck on the surface of the prepreg's surface resin that was lower in G' and results showed a slight deterioration in sticking property though it is still at an acceptable level.

Example 48

Except for using 5 parts, instead of 30 parts, of GAN and 35 parts, instead of 10 parts, of jER (registered trademark) 825 as the component [B], the same procedure as in Example 43 was carried out to prepare a prepreg.

As shown in Table 19, the surface resin in the prepreg prepared above had a storage elastic modulus G' in the range of $4.8 \times 10^3$ to $2.3 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 9.9° C. as measured by the prepreg's glass transition temperature measurement procedure described in (4) and the epoxy resin composition in the prepreg had a degree of conversion of 7.3% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 204° C. as measured according to the procedure described in (13). Furthermore, the carbon fiber reinforced material had a 0° tensile strength of 2,670 MPa as measured according to (15), which was slightly smaller than in Example 43.

Example 49

Except for using 20 parts, instead of 30 parts, of GAN and 20 parts, instead of 10 parts, of jER (registered trademark) 825 as the component [B], the same procedure as in Example 43 was carried out to prepare a prepreg.

As shown in Table 19, the surface resin in the prepreg prepared above had a storage elastic modulus G' in the range of $4.1 \times 10^3$ to $2.0 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 9.3° C. as measured by the prepreg's glass transition temperature measurement procedure described in (4) and the epoxy resin composition in the prepreg had a degree of conversion of 7.4% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 196° C. as measured according to the procedure described in (13). Furthermore, the carbon fiber reinforced material had a 0° tensile strength of 2,750 MPa as measured according to (15), which was slightly smaller than in Example 43.

Examples 50 and 51

Except for using 15 parts or 20 parts, instead of 10 parts, of Sumikaexcel (registered trademark) PES5003P as the component [D], the same procedure as in Example 43 was carried out to prepare a prepreg.

As shown in Table 20, the prepreg prepared in Example 50, which contained a surface resin having a G' value in the range of $1.1 \times 10^4$ to $5.1 \times 10^6$ Pa as measured at a temperature of 40° C. and an angular frequency in the range of 0.06 to 314 rad/s, and the prepreg prepared in Example 51, which contained a surface resin having a G' value in the range of $2.2 \times 10^4$ to $1.2 \times 10^7$ Pa, had particularly good dry property as evaluated based on measurements of the tackiness between prepreg and metal taken as described in (9) and there was no surface resin remaining on the metal plate after removal by pulling. Furthermore, the prepreg of Example 50 also had good drapability as evaluated by the prepreg drapability evaluation procedure described in (10). On the other hand, the prepreg of Example 51 had slightly deteriorated drapability although it was at an acceptable level. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, in both Examples 50 and 51, the carbon fiber reinforced material cured by the prepreg curing procedure described in (12) had a glass transition temperature of 190° C. as measured according to the procedure described in (13). Furthermore, the carbon fiber reinforced material had a 0° tensile strength of 2,930 MPa or 3,050 MPa as measured according to (15), which were larger than in Example 43.

Example 52

An epoxy resin composition 1 was prepared by mixing 30 parts of GAN, 40 parts of Sumiepoxy (registered trademark) ELM434, and 30 parts of jER (registered trademark) 825 as the component [B], 38 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 75 hours according to the prepreg precursor heat-treatment procedure described in (5) to allow the preliminary reaction product of [B] and [C] to be contained in the prepreg.

As shown in Table 20, the surface resin in the prepreg prepared above had a storage elastic modulus G' in the range of $2.6 \times 10^3$ to $9.0 \times 10^5$ Pa as measured at a temperature of 40° C. and an angular frequency in the range of 0.06 to 314 rad/s. The prepreg had good dry property as evaluated based on measurements of the tackiness between prepreg and metal taken as described in (9) and there was no surface resin remaining on the metal plate after removal by pulling. Furthermore, it had particularly good drapability as evaluated by the prepreg drapability evaluation procedure described in (10). The prepreg had a glass transition temperature of 3.9° C. as measured by the prepreg's glass transition temperature measurement procedure described in (4) and the epoxy resin composition in the prepreg had a degree of conversion of 7.7% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 178° C. as measured according to the procedure described in (13). Furthermore, the carbon fiber reinforced material had a 0° tensile strength of 2,870 MPa as measured according to (15).

Example 53

An epoxy resin composition 1 was prepared by mixing 40 parts of GAN and 60 parts of Sumiepoxy (registered trademark) ELM434 as the component [B], 50 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 75 hours according to the prepreg precursor heat-treatment procedure described in (5) to allow the preliminary reaction product of [B] and [C] to be contained in the prepreg.

As shown in Table 20, the surface resin in the prepreg prepared above had a storage elastic modulus G' in the range of $9.8 \times 10^3$ to $4.2 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had an acceptable level of drapability as evaluated by the prepreg drapability evaluation procedure described in (10). The prepreg had a glass transition temperature of 10.3° C. as measured by the prepreg's glass transition temperature measurement procedure described in (4) and the epoxy resin composition in the prepreg had a degree of conversion of 7.6% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 188° C. as measured according to the procedure described in (13). Furthermore, the carbon fiber reinforced material had a 0° tensile strength of 2,780 MPa as measured according to (15).

Example 54

An epoxy resin composition 1 was prepared by mixing 20 parts of GAN and 80 parts of Sumiepoxy (registered trademark) ELM434 as the component [B], 50 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 75 hours according to the prepreg precursor heat-treatment procedure described in (5) to allow the preliminary reaction product of [B] and [C] to be contained in the prepreg.

As shown in Table 20, the surface resin in the prepreg prepared above had a storage elastic modulus G' in the range of $1.2 \times 10^4$ to $4.7 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had an acceptable level of drapability as evaluated by the prepreg drapability evaluation procedure described in (10). The prepreg had a glass transition temperature of 10.9° C. as measured by the prepreg's glass transition temperature measurement procedure described in (4) and the epoxy resin composition in the prepreg had a degree of conversion of 7.8% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 198° C. as measured according to the procedure described in (13). Furthermore, the carbon fiber reinforced material had a 0° tensile strength of 2,700 MPa as measured according to (15).

Example 55

An epoxy resin composition 1 was prepared by mixing 40 parts of TOREP (registered trademark) A-204E and 60 parts of Sumiepoxy (registered trademark) ELM434 as the component [B], 45 parts of 3,3'-DAS as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 20 hours according to the prepreg precursor heat-treatment procedure described in (5) to allow the preliminary reaction product of [B] and [C] to be contained in the prepreg.

As shown in Table 20, the surface resin in the prepreg prepared above had a storage elastic modulus G' in the range of $1.2 \times 10^3$ to $7.0 \times 10^5$ Pa as measured at a temperature of 40° C. and an angular frequency in the range of 0.06 to 314 rad/s. The prepreg had an acceptable level of dry property as evaluated based on measurements of the tackiness between prepreg and metal taken as described in (9). It had good drapability as evaluated by the prepreg drapability evaluation procedure described in (10). The prepreg had a glass transition temperature of 4.4° C. as measured by the prepreg's glass transition temperature measurement procedure described in (4) and the epoxy resin composition in the prepreg had a degree of conversion of 2.2% as measured by the epoxy resin composition's degree of conversion measurement procedure described in (8).

Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 192° C. as measured according to the procedure described in (13). Furthermore, the carbon fiber reinforced material had a 0° tensile strength of 2,840 MPa as measured according to (15).

Examples 56 and 57

Except for changing the heat-treatment time of the prepreg precursor as specified in Table 4, the same procedure as in Example 55 was carried out to prepare a prepreg.

As shown in Table 20, the prepreg prepared in Example 56, which contained a surface resin having a G' value in the range of $4.7 \times 10^3$ to $2.0 \times 10^6$ Pa as measured at a temperature of 40° C. and an angular frequency in the range of 0.06 to 314 rad/s, had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10).

Furthermore, the prepreg prepared in Example 57, which contained a surface resin having a G' value in the range of $9.2 \times 10^3$ to $2.6 \times 10^7$ Pa as measured at a temperature of 40° C. and an angular frequency in the range of 0.06 to 314 rad/s, had particularly good dry property and there was no surface resin remaining on the metal plate after removal by pulling. In addition, the drapability was at an acceptable level although slightly worse compared with Examples 55 and 56. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Furthermore, in both Examples 56 and 57, the carbon fiber reinforced material had the same level of 0° tensile strength as in Example 55 as measured according to (15). Other measurement results are shown in Table 20.

Example 58

An epoxy resin composition 1 was prepared by mixing 40 parts of TOREP (registered trademark) A-204E and 60 parts of Sumiepoxy (registered trademark) ELM434 as the component [B], 45 parts of 3,3'-DAS as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Using the epoxy resin composition 2 prepared above, a resin film 2 was prepared according to the prepreg precursor preparation procedure described in (3). The resin film 2 prepared above was heat-treated for 20 hours in a similar way to the prepreg precursor heat-treatment procedure described in (5) to provide a resin film 2' that included a preliminary reaction product of [B] and [C].

Furthermore, when a prepreg is prepared using Torayca (registered trademark) T800S-24K-10E as the component [A] according to the prepreg precursor preparation procedure described in (3), an impregnated first prepreg was sandwiched between the resin films 2 and 2' to provide a prepreg having the resin film 2 as one surface resin and the resin film 2' as the other surface resin.

As shown in Table 21, the surface resin in the prepreg prepared above that was higher in G' had a G' value in the range of $1.2 \times 10^3$ to $7.0 \times 10^5$ Pa as measured at a temperature of 40° C. and an angular frequency in the range of 0.06 to 314 rad/s. The prepreg had an acceptable level of dry property as evaluated based on measurements of the tackiness between prepreg and metal taken as described in (9). Furthermore, it had particularly good drapability as evaluated by the prepreg drapability evaluation procedure described in (10). The prepreg had a glass transition temperature of 3.3° C. as measured by the prepreg's glass transition temperature measurement procedure described in (4) and the epoxy resin composition in the prepreg had a degree of conversion of 1.3% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 192° C. as measured according to the procedure described in (13). Furthermore, the carbon fiber reinforced material had a 0° tensile strength of 2,840 MPa as measured according to (15).

A polypropylene cover film with a thickness of 50 μm was stuck on the surface of the prepreg's surface resin that was the lower in G' and results showed good sticking property.

Example 59

Except that the resin film 2 was heat-treated for 50 hours instead of 20 hours when producing the resin film 2, the same procedure as in Example 58 was carried out to prepare a prepreg.

As shown in Table 21, the surface resin in the prepreg prepared above that was higher in G' had a G' value in the range of $4.7 \times 10^3$ to $2.0 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 5.6° C. as measured by the prepreg's glass transition temperature measurement procedure described in (4) and the epoxy resin composition in the prepreg had a degree of conversion of 3.6% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 192° C. as measured according to the procedure described in (13). Furthermore, the carbon fiber reinforced material had a 0° tensile strength of 2,820 MPa as measured according to (15).

Here, a polypropylene cover film with a thickness of 50 μm was stuck on the surface of the prepreg's surface resin that was lower in G' and results showed good sticking property.

Example 60

Except that the resin film 2 was heat-treated for 20 hours or 50 hours to prepare two resin films 2' and 2" that differed in the content of the preliminary reaction product and that they were used to sandwich an impregnated first prepreg, the same procedure as in Example 58 was carried out to prepare a prepreg.

As shown in Table 21, the surface resin in the prepreg prepared above that was higher in G' had a G' value in the range of $4.7 \times 10^3$ to $2.0 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 7.6° C. as measured by the prepreg's glass transition temperature measurement procedure described in (4) and the epoxy resin composition in the prepreg had a degree of conversion of 4.8% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 192° C. as measured according to the procedure described in (13). Furthermore, the carbon fiber reinforced material had a 0° tensile strength of 2,830 MPa as measured according to (15).

Here, a polypropylene cover film with a thickness of 50 μm was stuck on the surface of the prepreg's surface resin that was lower in G' and results showed a slight deterioration in sticking property though it is still at an acceptable level.

Example 61

An epoxy resin composition 1 was prepared by mixing 5 parts of TOREP (registered trademark) A-204E and 60 parts of Sumiepoxy (registered trademark) ELM434 as the component [B], 35 parts of jER (registered trademark) 825 as an epoxy resin other than the components [B] and [C], 45 parts of 3,3'-DAS as the component [C] and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 50 hours according to the prepreg precursor heat-treatment procedure described in (5) to allow the preliminary reaction product of [B] and [C] to be contained in the prepreg.

As shown in Table 21, the prepreg prepared contained a surface resin having a storage elastic modulus G' in the range of $5.3 \times 10^3$ to $2.5 \times 10^6$ Pa as measured at a temperature of 40° C. and an angular frequency in the range of 0.06 to 314 rad/s, had a particularly good dry property as evaluated based on measurements of the tackiness between prepreg and metal taken as described in (9), with no surface resin remaining on the metal plate after removal by pulling, and also had good drapability as evaluated by the prepreg drapability evaluation procedure described in (10). The prepreg had a glass transition temperature of 10.1° C. as measured by the prepreg's glass transition temperature measurement procedure described in (4) and the epoxy resin composition in the prepreg had a degree of conversion of 8.3% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 206° C. as measured according to the procedure described in (13). Furthermore, the carbon fiber reinforced material had a 0° tensile strength of 2,690 MPa as measured according to (15), which was slightly smaller than in Example 56.

Example 62

Except for using 25 parts, instead of 5 parts, of TOREP (registered trademark) A-204E and 15 parts, instead of 35 parts, of jER (registered trademark) 825 as the component [B], the same procedure as in Example 61 was carried out to prepare a prepreg.

As shown in Table 21, the surface resin in the prepreg prepared above had a storage elastic modulus G' in the range of $5.0 \times 10^3$ to $2.3 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 9.6° C. as measured by the prepreg's glass transition temperature measurement procedure described in (4) and the epoxy resin composition in the prepreg had a degree of conversion of 8.4% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 199° C. as measured according to the procedure described in (13). Furthermore, the carbon fiber reinforced material had a 0° tensile strength of 2,780 MPa as measured according to (15), which was slightly smaller than in Example 56.

Examples 63 and 64

Except for using 15 parts or 20 parts, instead of 10 parts, of Sumikaexcel (registered trademark) PES5003P as the component [D], the same procedure as in Example 56 was carried out to prepare a prepreg.

As shown in Table 21, the prepreg prepared in Example 63, which contained a surface resin having a G' value in the range of $1.4 \times 10^4$ to $5.9 \times 10^6$ Pa as measured at a temperature of 40° C. and an angular frequency in the range of 0.06 to 314 rad/s, and the prepreg prepared in Example 64, which contained a surface resin having a G' value in the range of $2.6 \times 10^4$ to $1.4 \times 10^7$ Pa, had particularly good dry property and there was no surface resin remaining on the metal plate after removal by pulling. Furthermore, the prepreg of Example 63 also had good drapability as evaluated by the prepreg drapability evaluation procedure described in (10) above. On the other hand, the prepreg of Example 64 was slightly lower in drapability than in Example 56 although it was at an acceptable level. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 192° C. or 193° C. as measured according to the procedure described in (13). Furthermore, the carbon fiber reinforced material had a 0° tensile strength of 2,960 MPa or 3,110 MPa as measured according to (15), which were larger than in Example 56.

Example 65

An epoxy resin composition 1 was prepared by mixing 40 parts of TOREP (registered trademark) A-204E, 40 parts of Sumiepoxy (registered trademark) ELM434, and 20 parts of jER (registered trademark) 825 as the component [B], 38 parts of 3,3'-DAS as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 50 hours according to the prepreg precursor heat-treatment procedure described in (5) to allow the preliminary reaction product of [B] and [C] to be contained in the prepreg.

As shown in Table 21, the surface resin in the prepreg prepared above had a storage elastic modulus G' in the range of $3.1 \times 10^3$ to $1.1 \times 10^6$ Pa as measured at a temperature of 40° C. and an angular frequency in the range of 0.06 to 314 rad/s. The prepreg had good dry property as evaluated based on measurements of the tackiness between prepreg and metal taken as described in (9) and there was no surface resin remaining on the metal plate after removal by pulling.

Furthermore, it had particularly good drapability as evaluated by the prepreg drapability evaluation procedure described in (10). The prepreg had a glass transition temperature of 4.2° C. as measured by the prepreg's glass transition temperature measurement procedure described in (4) and the epoxy resin composition in the prepreg had a degree of conversion of 8.6% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 181° C. as measured according to the procedure described in (13). Furthermore, the carbon fiber reinforced material had a 0° tensile strength of 2,930 MPa as measured according to (15).

Example 66

An epoxy resin composition 1 was prepared by mixing 50 parts of TOREP (registered trademark) A-204E and 50 parts of Sumiepoxy (registered trademark) ELM434 as the component [B], 45 parts of 3,3'-DAS as the component [C] and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 50 hours according to the prepreg precursor heat-treatment procedure described in (5) to allow the preliminary reaction product of [B] and [C] to be contained in the prepreg.

As shown in Table 22, the surface resin in the prepreg prepared above had a storage elastic modulus G' in the range of $1.2 \times 10^4$ to $5.5 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had an acceptable level of drapability as evaluated by the prepreg drapability evaluation procedure described in (10). The prepreg had a glass transition temperature of 10.5° C. as measured by the prepreg's glass transition temperature measurement procedure described in (4) and the epoxy resin composition in the prepreg had a degree of conversion of 8.6% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 191° C. as measured according to the procedure described in (13). Furthermore, the carbon fiber reinforced material had a 0° tensile strength of 2,900 MPa as measured according to (15).

Example 67

An epoxy resin composition 1 was prepared by mixing 60 parts of TOREP (registered trademark) A-204E and 40 parts of Sumiepoxy (registered trademark) ELM434 as the component [B], 41 parts of 3,3'-DAS as the component [C] and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 50 hours according to the prepreg precursor heat-treatment procedure described in (5) to allow the preliminary reaction product of [B] and [C] to be contained in the prepreg.

As shown in Table 22, the surface resin in the prepreg prepared above had a storage elastic modulus G' in the range of $1.0 \times 10^4$ to $5.3 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 10.1° C. as measured by the prepreg's glass transition temperature measurement procedure described in (4) and the epoxy resin composition in the prepreg had a degree of conversion of 8.1% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 183° C. as measured according to the procedure described in (13). Furthermore, the carbon fiber reinforced material had a 0° tensile strength of 2,960 MPa as measured according to (15).

Example 68

An epoxy resin composition 1 was prepared by mixing 70 parts of Sumiepoxy (registered trademark) ELM434 and 30 parts of EPICLON (registered trademark) HP-7200 as the component [B], 45 parts of Seikacure-S as the component [C], and 20 parts of Virantage (registered trademark) VW-10700RP as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 75 hours according to the prepreg precursor heat-treatment procedure described in (5) to allow the preliminary reaction product of [B] and [C] to be contained in the prepreg.

As shown in Table 22, the surface resin in the prepreg prepared above had a storage elastic modulus G' in the range of $1.5 \times 10^4$ to $1.1 \times 10^7$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had an acceptable level of drapability as evaluated by the prepreg drapability evaluation procedure described in (10). The prepreg had a glass transition temperature of 12.6° C. as measured by the prepreg's glass transition temperature measurement procedure described in (4) and the epoxy resin composition in the prepreg had a degree of conversion of 4.3% as measured by the epoxy resin composition's degree of conversion measurement procedure described in (8). Furthermore, the mass ratio of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 204° C. as measured according to the procedure described in (13).

Example 69

An epoxy resin composition 1 was prepared by mixing 90 parts of Sumiepoxy (registered trademark) ELM434 and 10 parts of EPICLON (registered trademark) HP-7200 as the component [B], 45 parts of Seikacure-S as the component [C], and 20 parts of Virantage (registered trademark) VW-10700RP as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 75 hours according to the prepreg precursor heat-treatment procedure described in (5) to allow the preliminary reaction product of [B] and [C] to be contained in the prepreg.

As shown in Table 22, the surface resin in the prepreg prepared above had a storage elastic modulus G' in the range of $9.4 \times 10^3$ to $9.1 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had good drapability as evaluated by the prepreg drapability evaluation procedure described in (10). The prepreg had a glass transition temperature of 11.5° C. as measured by the prepreg's glass transition temperature measurement procedure described in (4) and the epoxy resin composition in the prepreg had a degree of conversion of 4.0% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 202° C. as measured according to the procedure described in (13).

Example 70

An epoxy resin composition 1 was prepared by mixing 70 parts of Sumiepoxy (registered trademark) ELM434 and 30 parts of jER (registered trademark) YX4000 as the component [B], 45 parts of Seikacure-S as the component [C], and 20 parts of Virantage (registered trademark) VW-10700RP as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 75 hours according to the prepreg precursor heat-treatment procedure described in (5) to allow the preliminary reaction product of [B] and [C] to be contained in the prepreg.

As shown in Table 22, the surface resin in the prepreg prepared above had a storage elastic modulus G' in the range of $1.9 \times 10^4$ to $1.5 \times 10^7$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had an acceptable level of drapability as evaluated by the prepreg drapability evaluation procedure described in (10). The prepreg had a glass transition temperature of 13.1° C. as measured by the prepreg's glass transition temperature measurement procedure described in (4) and the epoxy resin composition in the prepreg had a degree of conversion of 4.8% as measured by the epoxy resin composition's degree of conversion measurement procedure described in (8). Furthermore, the mass ratio of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 206° C. as measured according to the procedure described in (13).

Example 71

An epoxy resin composition 1 was prepared by mixing 90 parts of Sumiepoxy (registered trademark) ELM434 and 10 parts of jER (registered trademark) YX4000 as the component [B], 45 parts of Seikacure-S as the component [C], and 20 parts of Virantage (registered trademark) VW-10700RP as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 75 hours according to the prepreg precursor heat-treatment procedure described in (5) to allow the preliminary reaction product of [B] and [C] to be contained in the prepreg.

As shown in Table 22, the surface resin in the prepreg prepared above had a storage elastic modulus G' in the range of $1.3 \times 10^4$ to $9.5 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had an acceptable level of drapability as evaluated by the prepreg drapability evaluation procedure described in (10). The prepreg had a glass transition temperature of 12.3° C. as measured by the prepreg's glass transition temperature measurement procedure described in (4) and the epoxy resin composition in the prepreg had a degree of conversion of 4.2% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 203° C. as measured according to the procedure described in (13).

Example 72

An epoxy resin composition 1 was prepared by mixing 70 parts of Sumiepoxy (registered trademark) ELM434 and 30 parts of EPICLON (registered trademark) HP-4032 as the component [B], 55 parts of Seikacure-S as the component [C], and 20 parts of Virantage (registered trademark) VW-10700RP as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 60 hours according to the prepreg precursor heat-treatment procedure described in (5) to allow the preliminary reaction product of [B] and [C] to be contained in the prepreg.

As shown in Table 22, the surface resin in the prepreg prepared above had a storage elastic modulus G' in the range of $1.7 \times 10^4$ to $9.4 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had an acceptable level of drapability as evaluated by the prepreg drapability evaluation procedure described in (10). The prepreg had a glass transition temperature of 12.4° C. as measured by the prepreg's glass transition temperature measurement procedure described in (4) and the epoxy resin composition in the prepreg had a degree of conversion of 5.3% as measured by the epoxy resin composition's degree of conversion measurement procedure described in (8). Furthermore, the mass ratio of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 203° C. as measured according to the procedure described in (13).

Example 73

An epoxy resin composition 1 was prepared by mixing 90 parts of Sumiepoxy (registered trademark) ELM434 and 10 parts of EPICLON (registered trademark) HP-4032 as the component [B], 55 parts of Seikacure-S as the component [C], and 20 parts of Virantage (registered trademark) VW-10700RP as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was heat-treated for 60 hours according to the prepreg precursor heat-treatment procedure described in (5) to allow the preliminary reaction product of [B] and [C] to be contained in the prepreg.

As shown in Table 22, the surface resin in the prepreg prepared above had a storage elastic modulus G' in the range of $9.0 \times 10^3$ to $8.3 \times 10^6$ Pa as measured at a temperature of 40° C. and an angular frequency in the range of 0.06 to 314 rad/s. The prepreg had particularly good dry property as evaluated based on measurements of the tackiness between prepreg and metal taken as described in (9) and there was no surface resin remaining on the metal plate after removal by pulling. Furthermore, it also had an acceptable level of drapability as evaluated by the prepreg drapability evaluation procedure described in (10). The prepreg had a glass transition temperature of 11.0° C. as measured by the prepreg's glass transition temperature measurement procedure described in (4) and the epoxy resin composition in the prepreg had a degree of conversion of 5.1% as measured by the epoxy resin composition's degree of conversion measurement procedure described in (8). Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

In addition, the carbon fiber reinforced material cured by the prepreg curing procedure described in (12) had a glass transition temperature of 201° C. as measured according to the procedure described in (13).

Comparative Examples 1 and 2

Except for changing the heat treatment time of the prepreg precursor as specified in Table 10, the same procedure as in Example 1 was carried out to prepare a prepreg.

As shown in Table 23, the prepreg prepared in Comparative example 1, which contained a surface resin having a minimum G' value of less than $1.0 \times 10^3$ as measured at a temperature of 40° C. and an angular frequency in the range of 0.06 to 314 rad/s, had particularly high drapability, but the tackiness between the prepreg and metal was so large that part of the surface resin remained on the metal plate after removal by pulling, indicating that the prepreg was not sufficiently good in dry property. Furthermore, the prepreg prepared in Comparative example 2, which contained a surface resin having a maximum G' value of more than $2.0 \times 10^8$ as measured at a temperature of 40° C. and an angular frequency in the range of 0.06 to 314 rad/s, had good dry property, but the prepreg was so hard that its drapability was low and outside the permissible range. Other measurement results are shown in Table 23. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Examples 3 and 4

Except for changing the heat treatment time of the prepreg precursor as specified in Table 10, the same procedure as in Example 9 was carried out to prepare a prepreg.

As shown in Table 23, the prepreg prepared in Comparative example 3, which contained a surface resin having a minimum G' value of less than $1.0 \times 10^3$ as measured at a temperature of 40° C. and an angular frequency in the range of 0.06 to 314 rad/s, had particularly high drapability, but the tackiness between the prepreg and metal was so large that part of the surface resin remained on the metal plate after removal by pulling, indicating that the prepreg was not sufficiently good in dry property. Furthermore, the prepreg prepared in Comparative example 4, which contained a surface resin having a maximum G' value of more than $2.0 \times 10^8$ as measured at a temperature of 40° C. and an angular frequency in the range of 0.06 to 314 rad/s, had good dry property, but the prepreg was so hard that its drapability was low and outside the permissible range. Other measurement results are shown in Table 23. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Examples 5 and 6

Except for changing the heat treatment time of the prepreg precursor as specified in Table 10, the same procedure as in Example 12 was carried out to prepare a prepreg.

As shown in Table 23, the prepreg prepared in Comparative example 5, which contained a surface resin having a minimum G' value of less than $1.0 \times 10^3$ as measured at a temperature of 40° C. and an angular frequency in the range of 0.06 to 314 rad/s, had particularly high drapability, but the tackiness between the prepreg and metal was so large that part of the surface resin remained on the metal plate after removal by pulling, indicating that the prepreg was not sufficiently good in dry property. Furthermore, the prepreg prepared in Comparative example 6, which contained a surface resin having a maximum G' value more than $2.0 \times 10^8$ as measured at a temperature of 40° C. and an angular frequency in the range of 0.06 to 314 rad/s, had good dry property, but the prepreg was so hard that its drapability was low and outside the permissible range. Other measurement results are shown in Table 23. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Example 7

An epoxy resin composition 1 was prepared by mixing 50 parts of jER (registered trademark) 630 and 50 parts of jER (registered trademark) 1055 as the component [B], 35 parts of Seikacure-S as the component [C], and 35 parts of Virantage (registered trademark) VW-10700RP as the component [D] according to the epoxy resin composition preparation procedure described in (1). Then, 25 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was not heat-treated and the prepreg was free of a preliminary reaction product of [B] and [C].

As shown in Table 23, the surface resin in the prepreg prepared above had a storage elastic modulus G' in the range of $1.0 \times 10^3$ to $2.0 \times 10^8$ Pa as measured at a temperature of 40° C. and an angular frequency in the range of 0.06 to 314 rad/s. The prepreg had an acceptable level of dry property as evaluated based on measurements of the tackiness between prepreg and metal taken as described in (9). It had good drapability as evaluated by the prepreg drapability evaluation procedure described in (10). However, the carbon fiber reinforced material cured by the prepreg curing procedure described in (12) had a glass transition temperature of 170° C., which is outside the permissible range, as measured according to the procedure described in (13) above. Other measurement results are shown in Table 23. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Example 8

Except for using 80 parts, instead of 50 parts, of jER (registered trademark) 630 and 20 parts, instead of 50 parts, of jER (registered trademark) 1055 as the component [B], the same procedure as Comparative Example 7 was carried out to prepare a prepreg.

As shown in Table 23, the carbon fiber reinforced material cured by the prepreg curing procedure described in (12) above had a glass transition temperature of 180° C., which is outside the permissible range, as measured according to the procedure described in (13), above, but the prepreg prepared, which contained a surface resin having a minimum G' value of less than $1.0 \times 10^3$ as measured at a temperature of 40° C. and an angular frequency in the range of 0.06 to 314 rad/s, had particularly high drapability, but the tackiness between the prepreg and metal was so large that part of the surface resin remained on the metal plate after removal by pulling, indicating that the prepreg was not sufficiently good in dry property. Other measurement results are shown in Table 23. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Examples 9 and 10

Except for changing the heat treatment time of the prepreg precursor as specified in Table 11, the same procedure as in Example 18 was carried out to prepare a prepreg.

As shown in Table 24, the prepreg prepared in Comparative example 9, which contained a surface resin having a minimum G' value of less than $1.0 \times 10^3$ as measured at a temperature of 40° C. and an angular frequency in the range of 0.06 to 314 rad/s, had particularly high drapability, but the tackiness between the prepreg and metal was so large that part of the surface resin remained on the metal plate after removal by pulling, indicating that the prepreg was not sufficiently good in dry property. Furthermore, the prepreg prepared in Comparative example 10, which contained a surface resin having a maximum G' value of more than $2.0 \times 10^8$ as measured at a temperature of 40° C. and an angular frequency in the range of 0.06 to 314 rad/s, had good dry property, but the prepreg was so hard that its drapability was low and outside the permissible range. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction. Other measurement results are shown in Table 24. Furthermore, electron microscopic observation showed that the cured prepreg produced by curing the prepreg of Comparative examples 1 and 2 had a sea-island type phase-separated structure.

Comparative Example 11

Except for using 50 parts of jER (registered trademark) 1055 instead of 50 parts of jER (registered trademark) 807 as the component [B], the same procedure as Comparative Example 1 was carried out to prepare a prepreg precursor. The resulting prepreg precursor was not heat-treated and the prepreg was free of a preliminary reaction product of [B] and [C].

As shown in Table 24, the surface resin in the prepreg prepared above had a storage elastic modulus G' in the range of $1.0 \times 10^3$ to $2.0 \times 10^8$ Pa as measured at a temperature of 40° C. and an angular frequency in the range of 0.06 to 314 rad/s. The prepreg had an acceptable level of dry property and high drapability as evaluated based on measurements of the tackiness between prepreg and metal taken as described in (9) and based on the prepreg drapability evaluation procedure described in (10). However, the cured prepreg cured by the prepreg curing procedure described in (12) had a glass transition temperature of 170° C., which was lower by 35° C. than in Comparative example 1, as measured according to the procedure described in (13) above. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction. Other measurement results are shown in Table 4. Furthermore, electron microscopic observation showed that the cured prepreg had a sea-island type phase-separated structure.

Comparative Example 12

Except for using 70 parts, instead of 50 parts, of jER (registered trademark) 630 and 30 parts, instead of 50 parts, of jER (registered trademark) 1055 as the component [B], the same procedure as Comparative Example 11 was carried out to prepare a prepreg precursor. The resulting prepreg precursor was not heat-treated and the prepreg was free of a preliminary reaction product of [B] and [C].

As shown in Table 24, the cured prepreg cured by the prepreg curing procedure described in (12) above had a glass transition temperature of 185° C., which is in the permissible range, as measured according to the procedure described in (13) above, but the prepreg prepared, which contained a surface resin having a minimum G' value of less than $1.0 \times 10^3$ as measured at a temperature of 40° C. and an angular frequency in the range of 0.06 to 314 rad/s, had particularly high drapability, but the tackiness between the prepreg and metal was so large that part of the surface resin remained on the metal plate after removal by pulling, indicating that the prepreg was not sufficiently good in dry property. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction. Other measurement results are shown in Table 24. Furthermore, electron microscopic observation showed that the cured prepreg had a sea-island type phase-separated structure.

Comparative Examples 13 and 14

Except for changing the heat treatment time of the prepreg precursor as specified in Table 11, the same procedure as in Example 29 was carried out to prepare a prepreg.

As shown in Table 24, the prepreg prepared in Comparative example 13, which contained a surface resin having a minimum G' value of less than $1.0 \times 10^3$ as measured at a temperature of 40° C. and an angular frequency in the range of 0.06 to 314 rad/s, had particularly high drapability as evaluated according to the prepreg drapability evaluation procedure described in (10), but the tackiness between the prepreg and metal was so large that part of the surface resin remained on the metal plate after removal by pulling, resulting in a poor prepreg dry property as evaluated based on measurements of the tackiness between prepreg and metal taken as described in (9). Furthermore, the prepreg prepared in Comparative example 14, which contained a surface resin having a maximum G' value of more than $2.0 \times 10^8$ as measured at a temperature of 40° C. and an angular frequency in the range of 0.06 to 314 rad/s, had particularly good dry property, but the prepreg was so hard that its drapability was low and outside the permissible range. Other measurement results are shown in Table 13. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Examples 15 and 16

Except for changing the heat treatment time of the prepreg precursor as specified in Table 11, the same procedure as in Example 42 was carried out to prepare a prepreg.

As shown in Table 24, the prepreg prepared in Comparative example 15, which contained a surface resin having a minimum G' value of less than $1.0 \times 10^3$ as measured at a temperature of 40° C. and an angular frequency in the range of 0.06 to 314 rad/s, had particularly high drapability as evaluated according to the prepreg drapability evaluation procedure described in (10), but the tackiness between the prepreg and metal was so large that part of the surface resin remained on the metal plate after removal by pulling, resulting in a poor prepreg dry property as evaluated based on measurements of the tackiness between prepreg and metal taken as described in (9). Furthermore, the prepreg prepared in Comparative example 16, which contained a surface resin having a maximum G' value of more than $2.0 \times 10^8$ as measured at a temperature of 40° C. and an angular frequency in the range of 0.06 to 314 rad/s, had particularly good dry property, but the prepreg was so hard that its drapability was low and outside the permissible range. Other measurement results are shown in Table 13. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Examples 17 and 18

Except for changing the heat treatment time of the prepreg precursor as specified in Tables 11 and 12, the same procedure as in Example 55 was carried out to prepare a prepreg.

As shown in Tables 24 and 25, the prepreg prepared in Comparative example 17, which contained a surface resin having a minimum G' value of less than $1.0 \times 10^3$ as measured at a temperature of 40° C. and an angular frequency in the range of 0.06 to 314 rad/s, had particularly high drapability as evaluated according to the prepreg drapability evaluation procedure described in (10), but the tackiness between the prepreg and metal was so large that part of the surface resin remained on the metal plate after removal by pulling, resulting in a poor prepreg dry property as evaluated based on measurements of the tackiness between prepreg and metal taken as described in (9). Furthermore, the prepreg prepared in Comparative example 18, which contained a surface resin having a maximum G' value of more than $2.0 \times 10^8$ as measured at a temperature of 40° C. and an angular frequency in the range of 0.06 to 314 rad/s, had particularly good dry property, but the prepreg was so hard that its drapability was low and outside the permissible range. Other measurement results are shown in Table 13. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Example 19

An epoxy resin composition 1 was prepared by mixing 20 parts of Denacol (registered trademark) EX-731, 60 parts of Sumiepoxy (registered trademark) ELM434, and 20 parts of jER (registered trademark) 1055 as the component [B], 40 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was not heat-treated and the prepreg was free of a preliminary reaction product of [B] and [C].

As shown in Table 25, the surface resin in the prepreg prepared above had a storage elastic modulus G' in the range of $4.3 \times 10^3$ to $8.0 \times 10^6$ Pa as measured at a temperature of 40° C. and an angular frequency in the range of 0.06 to 314 rad/s. The prepreg had an acceptable level of dry property and drapability as evaluated based on measurements of the tackiness between prepreg and metal taken as described in (9) and based on the prepreg drapability evaluation procedure described in (10). However, the carbon fiber reinforced material cured by the prepreg curing procedure described in (12) had a glass transition temperature of 163° C., which is outside the permissible range, as measured according to the procedure described in (13) above. Other measurement results are shown in Table 25.

Comparative Example 20

An epoxy resin composition 1 was prepared by mixing 20 parts of GAN, 60 parts of Sumiepoxy (registered trademark) ELM434, and 20 parts of jER (registered trademark) 1055 as the component [B], 45 parts of Seikacure-S as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was not heat-treated and the prepreg was free of a preliminary reaction product of [B] and [C].

As shown in Table 25, the surface resin in the prepreg prepared above had a storage elastic modulus G' in the range of $1.3 \times 10^3$ to $4.9 \times 10^6$ Pa as measured at a temperature of 40° C. and an angular frequency in the range of 0.06 to 314 rad/s.

The prepreg had an acceptable level of dry property as evaluated based on measurements of the tackiness between prepreg and metal taken as described in (9). It had good drapability as evaluated by the prepreg drapability evaluation procedure described in (10). However, the carbon fiber reinforced material cured by the prepreg curing procedure described in (12) had a glass transition temperature of 169° C., which is outside the permissible range, as measured according to the procedure described in (13) above. Other measurement results are shown in Table 25.

Comparative Example 21

An epoxy resin composition 1 was prepared by mixing 20 parts of TOREP (registered trademark) A-204E, 60 parts of Sumiepoxy (registered trademark) ELM434, and 20 parts of jER (registered trademark) 1055 as the component [B], 45 parts of 3,3'-DAS as the component [C], and 10 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was not heat-treated and the prepreg was free of a preliminary reaction product of [B] and [C].

As shown in Table 25, the surface resin in the prepreg prepared above had a storage elastic modulus G' in the range of $1.6\times10^3$ to $5.3\times10^6$ Pa as measured at a temperature of 40° C. and an angular frequency in the range of 0.06 to 314 rad/s. The prepreg had an acceptable level of dry property as evaluated based on measurements of the tackiness between prepreg and metal taken as described in (9). It had good drapability as evaluated by the prepreg drapability evaluation procedure described in (10). However, the carbon fiber reinforced material cured by the prepreg curing procedure described in (12) had a glass transition temperature of 171° C., which is outside the permissible range, as measured according to the procedure described in (13) above. Other measurement results are shown in Table 25.

Comparative Examples 22 and 23

Except for changing the heat treatment time of the prepreg precursor as specified in Table 12, the same procedure as in Example 68 was carried out to prepare a prepreg.

As shown in Table 25, the prepreg prepared in Comparative example 22, which contained a surface resin having a minimum G' value of less than $1.0\times10^3$ as measured at a temperature of 40° C. and an angular frequency in the range of 0.06 to 314 rad/s, had particularly high drapability as evaluated according to the prepreg drapability evaluation procedure described in (10), but the tackiness between the prepreg and metal was so large that some of the surface resin remained on the metal plate after removal by pulling, resulting in a poor prepreg dry property as evaluated based on measurements of the tackiness between prepreg and metal taken as described in (9). Furthermore, the prepreg prepared in Comparative example 23, which contained a surface resin having a maximum G' value of more than $2.0\times10^8$ Pa as measured at a temperature of 40° C. and an angular frequency in the range of 0.06 to 314 rad/s, had particularly good dry property, but the prepreg was so hard that its drapability was low and outside the permissible range. Other measurement results are shown in Table 25. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Examples 24 and 25

Except for changing the heat treatment time of the prepreg precursor as specified in Table 12, the same procedure as in Example 70 was carried out to prepare a prepreg.

As shown in Table 25, the prepreg prepared in Comparative example 24, which contained a surface resin having a minimum G' value of less than $1.0\times10^3$ as measured at a temperature of 40° C. and an angular frequency in the range of 0.06 to 314 rad/s, had particularly high drapability as evaluated according to the prepreg drapability evaluation procedure described in (10), but the tackiness between the prepreg and metal was so large that some of the surface resin remained on the metal plate after removal by pulling, resulting in a poor prepreg dry property as evaluated based on measurements of the tackiness between prepreg and metal taken as described in (9). Furthermore, the prepreg prepared in Comparative example 25, which contained a surface resin having a maximum G' value of more than $2.0\times10^8$ as measured at a temperature of 40° C. and an angular frequency in the range of 0.06 to 314 rad/s, had particularly good dry property, but the prepreg was so hard that its drapability was low and outside the permissible range. Other measurement results are shown in Table 25. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Examples 26 and 27

Except for changing the heat treatment time of the prepreg precursor as specified in Tables 12 and 13, the same procedure as in Example 72 was carried out to prepare a prepreg.

As shown in Tables 25 and 26, the prepreg prepared in Comparative example 26, which contained a surface resin having a minimum G' value of less than $1.0\times10^3$ as measured at a temperature of 40° C. and an angular frequency in the range of 0.06 to 314 rad/s, had particularly high drapability as evaluated according to the prepreg drapability evaluation procedure described in (10), but the tackiness between the prepreg and metal was so large that part of the surface resin remained on the metal plate after removal by pulling, resulting in a poor prepreg dry property as evaluated based on measurements of the tackiness between prepreg and metal taken as described in (9). Furthermore, the prepreg prepared in Comparative example 27, which contained a surface resin having a maximum G' value of more than $2.0\times10^8$ as measured at a temperature of 40° C. and an angular frequency in the range of 0.06 to 314 rad/s, had particularly good dry property, but the prepreg was so hard that its drapability was low and outside the permissible range. Other measurement results are shown in Tables 25 and 26. Furthermore, the mass ratio among the constituents of the component [B] in the prepreg that included a preliminary reaction product as calculated by the procedure described in (7) showed no change from the mass ratio based on the contents of the constituents of the component [B] before the preliminary reaction.

Comparative Example 28

An epoxy resin composition 1 was prepared by mixing 80 parts of Sumiepoxy (registered trademark) ELM434 and 20 parts of jER (registered trademark) 1055 as the component [B], 30 parts of Seikacure-S as the component [C], and 14 parts of Sumikaexcel (registered trademark) PES5003P as the component [D] according to the epoxy resin composition preparation procedure described in (1). Then, 20 parts of Orgasol (registered trademark) 1002D Nat 1 adopted as the component [E] was added to the epoxy resin composition 1 to prepare an epoxy resin composition 2.

Furthermore, using Torayca (registered trademark) T800S-24K-10E as the component [A] and the epoxy resin compositions 1 and 2 prepared above, a prepreg precursor was produced according to the prepreg precursor preparation procedure described in (3). The resulting prepreg precursor was not heat-treated and the prepreg was free of a preliminary reaction product of [C] and [D].

As shown in Table 26, the surface resin in the prepreg prepared above had a storage elastic modulus G' in the range of $3.1 \times 10^4$ to $2.0 \times 10^7$ Pa as measured at a temperature of 40° C. and an angular frequency in the range of 0.06 to 314 rad/s, and the prepreg had good drapability as evaluated by the prepreg drapability evaluation procedure described in (10). Compared to this, the tackiness between the prepreg and metal was slightly large and a small amount of the surface resin remained on the metal plate after removal by pulling. Other measurement results are shown in Table 26.

Comparative Examples 29 and 30

Except for using Sumikaexcel (registered trademark) PES5003P as the component [B] in amounts as specified in Table 7, the same procedure as Comparative example 28 was carried out to prepare a prepreg.

The prepreg of Comparative example 29 had high drapability as evaluated according to the prepreg drapability evaluation procedure described in (10), but the tackiness between the prepreg and metal was slightly large and a small amount of the surface resin remained on the metal plate after removal by pulling.

The prepreg of Comparative example 30 was lower in dry property and drapability as evaluated based on measurements of the tackiness between prepreg and metal taken as described in (9) and based on the prepreg drapability evaluation procedure described in (10) as compared to the prepregs obtained in Examples 29 to 67.

Comparative Example 31

Except for using 60 parts, instead of 80 parts, of Sumiepoxy (registered trademark) ELM434 and 40 parts, instead of 20 parts, of jER (registered trademark) 1055 as the component [B], the same procedure as Comparative example 28 was carried out to prepare a prepreg.

As shown in Table 26, the surface resin in the prepreg prepared above had a storage elastic modulus G' in the range of $1.5 \times 10^5$ to $1.1 \times 10^8$ Pa as measured at a temperature of 40° C. and an angular frequency in the range of 0.06 to 314 rad/s. The prepreg had good dry property and high drapability as evaluated based on measurements of the tackiness between prepreg and metal taken as described in (9) and based on the prepreg drapability evaluation procedure described in (10) above. However, the carbon fiber reinforced material cured by the prepreg curing procedure described in (12) had a glass transition temperature of 180° C., which was lower by 15° C. than in Comparative example 28, as measured according to the procedure described in (13) above. Other measurement results are shown in Table 26.

Comparative Example 32

Except for using 20 parts of jER (registered trademark) 819 instead of 20 parts of jER (registered trademark) 1055 as the component [B], the same procedure as Comparative Example 28 was carried out to prepare a prepreg.

As shown in Table 14, the prepreg prepared, which contained a surface resin having a G' value in the range of $1.5 \times 10^3$ to $9.2 \times 10^5$ Pa as measured at a temperature of prepreg prepared a 40° C. and an angular frequency in the range of 0.06 to 314 rad/s, had particularly high drapability, but the tackiness between the prepreg and metal was so large that part of the surface resin remained on the metal plate after removal by pulling, indicating that the prepreg was not sufficiently good in dry property. Other measurement results are shown in Table 26.

Comparative Example 33

An epoxy resin composition 1 was prepared by mixing 50 parts of Sumiepoxy (registered trademark) ELM434 and 50 parts of jER (registered trademark) 825 as the component [B] and 30 parts of Seikacure-S as the component [C] according to the epoxy resin composition preparation procedure described in (1).

Furthermore, using Torayca (registered trademark) T800S-24K-10E as the component [A] and the epoxy resin composition 1 prepared above, a prepreg precursor was produced according to the prepreg precursor preparation procedure described in (3) above. The resulting prepreg was heat-treated for 190 hours according to the prepreg precursor heat-treatment procedure described in (5) to allow the preliminary reaction product of [C] and [D] to be contained in the prepreg.

As shown in Table 26, the surface resin in the prepreg prepared above had a storage elastic modulus G' in the range of $1.2 \times 10^3$ to $8.5 \times 10^5$ Pa as measured at a temperature of 40° C. and an angular frequency in the range of 0.06 to 314 rad/s. The prepreg had inferior dry property and drapability as evaluated based on measurements of the tackiness between prepreg and metal taken as described in (9) and based on the prepreg drapability evaluation procedure described in (10) as compared to the prepregs obtained in Examples 19 to 67. In addition, this prepreg had a glass transition temperature of 5.8° C. and the epoxy resin composition in the prepreg had a degree of conversion of 25.2%.

In addition, the carbon fiber reinforced material cured by the prepreg curing procedure described in (12) had a glass transition temperature of 190° C. as measured according to the procedure described in (13).

Comparative Example 34

Except for changing the heat treatment time of the prepreg as specified in Table 13, the same procedure as Comparative example 33 was carried out to prepare a prepreg.

As shown in Table 26, the surface resin in the prepreg prepared above had a G' value in the range of $2.6 \times 10^3$ to 1.6×10⁶ Pa as measured at a temperature of 40° C. and an angular frequency in the range of 0.06 to 314 rad/s. The prepreg had good dry property as evaluated based on measurements of the tackiness between prepreg and metal taken as described in (9). Compared to this, the drapability was slightly lower as compared to Examples 33. Other measurement results are shown in Table 26.

It can be seen from the comparisons between Examples 1 to 8 and Comparative examples 1 and 2, between Examples 9 to 11 and Comparative examples 3 and 4, and between Examples 12 to 14 and Comparative examples 5 and 6 that a prepreg including the components [A] to [E] and containing a preliminary reaction product of [B] and [C] has a high drapability but suffers from an excessive tackiness between the prepreg and metal when the surface resin contained has a minimum G' value of less than $1.0×10^3$ Pa as measured at a temperature of 40° C. and an angular frequency in the range of 0.06 to 314 rad/s. It is also seen that a sufficient drapability cannot be realized when the maximum value of G' is more than $2.0×10^8$ Pa although a good tackiness is realized between the prepreg and metal.

It can be seen from the comparison between Examples 1 to 8 and Comparative examples 7 and 8 that when the G' value is controlled by increasing the molecular weight of the bisphenol A epoxy, instead of controlling the G' value by including a preliminary reaction product, the carbon fiber reinforced material necessarily suffers a decrease in glass transition temperature if an attempt is made to obtain a prepreg that has both good dry property and high drapability.

It can be seen from the comparison between Examples 1 to 17 and Comparative examples 28 to 32 that when the G' value is controlled by eliminating the aminophenol epoxy resin, increasing the molecular weight of the bisphenol A epoxy, changing the content of the thermoplastic resin, or adopting a combination thereof, instead of controlling the G' value by including a preliminary reaction product, realizing both good dry property and high drapability at levels similar to those in Examples 1 to 17 is difficult without undergoing a decrease in glass transition temperature of the carbon fiber reinforced material.

It can be seen from the comparison between Examples 1 to 17 and Comparative examples 33 and 34 that if the prepreg does not contain a thermoplastic resin, the inclusion of a preliminary reaction product alone, which is realized by heat treatment, cannot serve to realize good dry property unless the epoxy resin composition in the prepreg has a degree of conversion of 20% or more and it is difficult to realize a high drapability at a level similar to that in Examples 1 to 17.

It can be seen from the comparisons between Examples 18 to 28 and Comparative examples 9 and 10 that a prepreg including the components [A] to [D] and containing a preliminary reaction product of components [B] and [C] has a high drapability but suffers from an excessive tackiness between the prepreg and metal when the surface resin contained has a minimum G' value of less than $1.0×10^3$ Pa as measured at a temperature of 40° C. and an angular frequency in the range of 0.06 to 314 rad/s. It is also seen that a sufficient drapability cannot be realized when the maximum value of G' is more than $2.0×10^8$ Pa although a good tackiness is realized between the prepreg and metal.

It can be seen from the comparison between Examples 18 to 28 and Comparative examples 11 and 12 that when the G' value is controlled by increasing the molecular weight of the bisphenol A epoxy resin, instead of controlling the G' value by including a preliminary reaction product, the cured prepreg necessarily suffers a decrease in glass transition temperature if an attempt is made to obtain a prepreg that has both good dry property and high drapability.

It can be seen from the comparison between Examples 18 to 28 and Comparative examples 28 to 32 that when the G' value is controlled by eliminating the aminophenol epoxy resin, increasing the molecular weight of the bisphenol A epoxy resin, changing the content of the thermoplastic resin, or adopting a combination thereof, instead of controlling the G' value by including a preliminary reaction product, realizing both good dry property and high drapability at levels similar to those in Examples 18 to 28 is difficult without undergoing a decrease in glass transition temperature of the cured prepreg.

It can be seen from the comparison between Examples 18 to 28 and Comparative examples 33 and 34 that if the prepreg does not contain a thermoplastic resin, the inclusion of a preliminary reaction product alone, which is realized by heat treatment, cannot serve to realize good dry property unless the epoxy resin composition in the prepreg has a degree of conversion of 20% or more and it is difficult to realize a high drapability at a level similar to that in Examples 18 to 28.

It can be seen from the comparisons between Examples 29 to 41 and Comparative examples 31 and 32, between Examples 42 to 54 and Comparative examples 33 and 34, and between Examples 55 to 67 and Comparative examples 17 and 18 that a prepreg including the components [A] to [E] and containing a preliminary reaction product of [B] and [C] has a high drapability but suffers from an excessive tackiness between the prepreg and metal when the surface resin contained has a minimum G' value of less than $1.0×10^3$ Pa as measured at a temperature of 40° C. and an angular frequency in the range of 0.06 to 314 rad/s. It is also seen that a sufficient drapability cannot be realized when the maximum value of G' is more than $2.0×10^8$ Pa although a good tackiness is realized between the prepreg and metal.

It can be seen from the comparison between Examples 29 to 41 and Comparative example 19, between Examples 42 to 54 and Comparative example 20, and between Examples 55 to 67 and Comparative example 20 that when the G' value is controlled by adding a high molecular weight type bisphenol A epoxy, instead of controlling the G' value by including a preliminary reaction product, the carbon fiber reinforced material necessarily suffers a large decrease in glass transition temperature if an attempt is made to obtain a prepreg that has both good dry property and high drapability.

It can be seen from the comparison between Examples 29 to 67 and Comparative examples 28 to 32 that when the G' value is controlled by eliminating the component [B], adding a high molecular weight type bisphenol A epoxy, changing the content of the thermoplastic resin, or adopting a combination thereof, instead of controlling the G' value by including a preliminary reaction product, it is difficult to realize both good dry property and high drapability at levels similar to those in Examples 29 to 67 while maintaining both high heat resistance and high low-temperature mechanical strength.

It can be seen from the comparison between Examples 29 to 67 and Comparative examples 33 and 34 that if the prepreg does not contain a thermoplastic resin, the inclusion of a preliminary reaction product alone cannot serve to realize both good dry property unless the epoxy resin composition in the prepreg has a degree of conversion of 20% or more and it is difficult to realize good dry property and high drapability at levels similar to those in Examples 29 to 67.

The present investigation provides a prepreg and a carbon fiber reinforced material having high fire retardance and heat resistance as well as good mechanical property which can serve for aerospace applications including, for instance, primary structural members of aircraft such as main wing, and fuselage; secondary structural members such as tail unit, floor beam, flap, aileron, cowl, fairing, and other interior materials; and others such as rocket motor case and structural members of artificial satellites. Their preferred applications for general industrial uses include structural members of vehicles such as automobiles, ships, and railroad vehicles; and civil engineering and construction materials such as drive shafts, plate springs, windmill blades, various turbines, pressure vessels, flywheels, rollers for paper manufacture, roofing materials, cables, reinforcing bars, and mending/reinforcing materials. Preferred applications in the sporting goods industry include golf shafts, fishing poles, rackets for tennis, badminton, squash, etc., hockey sticks, and skiing poles.

The invention claimed is:

1. A prepreg comprising the components [A] to [D] below and a preliminary reaction product of the component [B] and the component [C],
wherein the component [B] comprises a m- or p-aminophenol epoxy resin [b1] and either a glycidyl ether epoxy resin or a glycidyl amine epoxy resin [b2] that has two or more glycidyl groups in a molecule, and the component [b1] in the prepreg including the preliminary reaction product accounts for 10 to 60 parts by mass, whereas the component [b2] in the prepreg including the preliminary reaction product accounts for 40 to 90 parts by mass relative to the total quantity, which accounts for 100 parts by mass, of the component [B] in the prepreg including the preliminary reaction product,
wherein the epoxy resin composition is the remainder of the prepreg deprived of the component [A] and has a degree of conversion of 1% or more and 20% or less and a glass transition temperature in the range of −5° C. to 20° C. as measured by differential scanning calorimetry (DSC), and
wherein at least one surface resin in the prepreg has a storage elastic modulus G' in the range of $1.0 \times 10^3$ to $2.0 \times 10^8$ Pa as measured at a temperature of 40° C. and an angular frequency in the range of 0.06 to 314 rad/s:
[A] carbon fiber,
[B] an epoxy resin,
[C] a curing agent, and
[D] a thermoplastic resin.

2. The prepreg as set forth in claim 1, wherein one surface and the other surface of the prepreg differ in the storage elastic modulus G' of the prepreg surface resin measured at a temperature of 40° C. and an angular frequency in the range of 0.06 to 314 rad/s.

3. The prepreg as set forth in claim 2, wherein the prepreg surface having the surface resin that is the smaller in storage elastic modulus G' is in contact with a cover film.

4. A slit tape prepreg produced by slitting the prepreg as set forth in claim 1.

5. A method of producing the prepreg as set forth in claim 1 comprising a step of performing heat treatment or energy irradiation of a prepreg precursor comprising at least the components [A] to [D] to provide the prepreg.

6. A method of producing the prepreg as set forth in claim 1 comprising a step of performing heat treatment or energy irradiation of an epoxy resin composition comprising at least the components [B] to [D] and a subsequent step of impregnating the component [A] therewith to provide the prepreg.

7. A method of producing the prepreg as set forth in claim 6, wherein the prepreg has a phase-separated structure in which there is phase separation between a phase containing the reaction product of the component [B] and the component [C] as main component and a phase containing the component [D] as main component.

8. The prepreg as set forth in claim 1, wherein the epoxy resin composition is the remainder of the prepreg deprived of the component [A] and has a degree of conversion of 2% or more and 20% or less.

9. The prepreg as set forth in claim 1, wherein the component [D] is a thermoplastic resin having a polyaryl ether skeleton.

10. The prepreg as set forth in claim 1, wherein the component [b1] is at least one selected from the group consisting of epoxy resins having structures as represented by the formula (2) below:

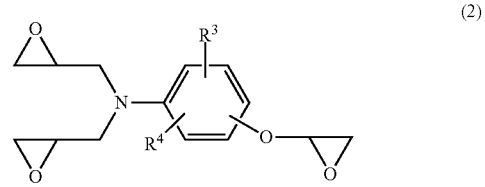

(2)

wherein $R^3$ and $R^4$ in formula (2) represent at least one selected from the group consisting of a hydrogen atom, an aliphatic hydrocarbon group containing 1 to 4 carbon atoms, an alicyclic hydrocarbon group containing 4 or less carbon atoms, and a halogen atom, and
wherein the glycidyl ether group is at a meta or para position with respect to the glycidyl amine group.

11. The prepreg as set forth in claim 1, wherein the component [D] comprises a polyethersulfone.

12. The prepreg as set forth in claim 1, wherein the cured product of the prepreg when cured in an autoclave for 2 hours at a temperature of 180° C. and a pressure of 6 kg/cm$^2$ and stained by either $OsO_4$ or $RuO_4$ has no phase-separated structure by electron microscopic observation at 50,000 times magnification.

13. The prepreg as set forth in claim 1, wherein the component [D] consists of a polyethersulfone.

* * * * *